(12) United States Patent
Bailey et al.

(10) Patent No.: US 10,975,172 B2
(45) Date of Patent: Apr. 13, 2021

(54) OLEFIN POLYMERIZATION CATALYST

(71) Applicant: Dow Global Technologies LLC, Midland, MI (US)

(72) Inventors: Brad C. Bailey, Midland, MI (US); Matthew D. Christianson, Midland, MI (US); Anna V. Davis, Midland, MI (US); Andrew M. Camelio, Midland, MI (US); Robert D. J. Froese, Midland, MI (US); Jessica L. Klinkenberg, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 271 days.

(21) Appl. No.: 16/089,525

(22) PCT Filed: Mar. 30, 2017

(86) PCT No.: PCT/US2017/025009
§ 371 (c)(1),
(2) Date: Sep. 28, 2018

(87) PCT Pub. No.: WO2017/173074
PCT Pub. Date: Oct. 5, 2017

(65) Prior Publication Data
US 2020/0299420 A1 Sep. 24, 2020

Related U.S. Application Data

(60) Provisional application No. 62/316,003, filed on Mar. 31, 2016.

(51) Int. Cl.
*C08F 4/64* (2006.01)
*C08F 2/38* (2006.01)
(Continued)

(52) U.S. Cl.
CPC ............ *C08F 4/64168* (2013.01); *C08F 2/38* (2013.01); *C08F 210/02* (2013.01);
(Continued)

(58) Field of Classification Search
CPC .... C08F 4/64168; C08F 2/38; C08F 2410/01; C08F 210/04; C08F 210/14; C08F 210/02
See application file for complete search history.

(56) References Cited

U.S. PATENT DOCUMENTS

| 3,709,853 A | 1/1973 | Karapinka |
| 4,003,712 A | 1/1977 | Miller |

(Continued)

FOREIGN PATENT DOCUMENTS

| BE | 839380 A | 9/1976 |
| CN | 102585054 A | 7/2012 |

(Continued)

OTHER PUBLICATIONS

Chen et al., Dimeric zirconium complex bearing a dianionic ansa-bis(aminopyridinato) ligand, Mendeleev Commun., (2014), 24, pp. 114-116 (Year: 2014).*

(Continued)

*Primary Examiner* — Robert D Harlan
(74) *Attorney, Agent, or Firm* — Dinsmore & Shohl LLP

(57) ABSTRACT

An olefin polymerization catalyst system comprising: a procatalyst component comprising a metal-ligand complex of Formula (I) wherein each X is independently a monodentate or polydentate ligand that is neutral, monoanionic, or dianionic, wherein n is an integer, and wherein X and n are chosen such that the metal-ligand complex of Formula (I) is overall neutral; wherein each R1 and R5 independently is selected from (C1-C40)hydrocarbyls, substituted (C1-C40) hydrocarbyls; (C1-C40)heterohydrocarbyls and substituted (C1-C40)heterohydrocarbyls; wherein each R2 and R4 inde- (Continued)

pendently is selected from (C1-C40)hydrocarbyls and substituted (C1-C40)hydrocarbyls; wherein R3 is selected from the group consisting of a (C3-C40)hydrocarbylene, substituted (C3-C40)hydrocarbylene, [(C+Si)3-(C+Si)40]organosilylene, substituted [(C+Si)3-(C+Si)40]organosilylene, [(C+Ge)3-(C+Ge)40]organogermylene, or substituted [(C+Ge)3-(C+Ge)40]organogermylene; wherein each N independently is nitrogen; and optionally, two or more R1-5 groups each independently can combine together to form mono-aza ring structures, with such ring structures having from 5 to 16 atoms in the ring excluding any hydrogen atoms.

19 Claims, 1 Drawing Sheet

(51) Int. Cl.
    *C08F 210/02*     (2006.01)
    *C08F 210/04*     (2006.01)
    *C08F 210/14*     (2006.01)

(52) U.S. Cl.
    CPC .......... *C08F 210/04* (2013.01); *C08F 210/14* (2013.01); *C08F 2410/01* (2013.01)

(56) References Cited

U.S. PATENT DOCUMENTS

| | | | |
|---|---|---|---|
| 4,011,382 A | 3/1977 | Levine et al. | |
| 4,302,566 A | 11/1981 | Karol et al. | |
| 4,543,399 A | 9/1985 | Jenkins, III et al. | |
| 4,613,484 A | 9/1986 | Ayres et al. | |
| 4,882,400 A | 11/1989 | Dumain et al. | |
| 5,064,802 A | 11/1991 | Stevens et al. | |
| 5,153,157 A | 10/1992 | Hlatky et al. | |
| 5,296,433 A | 3/1994 | Siedle et al. | |
| 5,321,106 A | 6/1994 | LaPointe | |
| 5,350,723 A | 9/1994 | Neithamer et al. | |
| 5,352,749 A | 10/1994 | DeChellis et al. | |
| 5,425,872 A | 6/1995 | Devore et al. | |
| 5,541,270 A | 7/1996 | Chinh et al. | |
| 5,625,087 A | 4/1997 | Neithamer et al. | |
| 5,721,185 A | 2/1998 | LaPointe et al. | |
| 5,783,512 A | 7/1998 | Jacobsen et al. | |
| 5,883,204 A | 3/1999 | Spencer et al. | |
| 5,919,983 A | 7/1999 | Rosen et al. | |
| 6,103,657 A | 8/2000 | Murray | |
| 6,515,155 B1 | 2/2003 | Klosin et al. | |
| 6,696,379 B1 | 2/2004 | Carnahan et al. | |
| 7,163,907 B1 | 1/2007 | Canich et al. | |
| 2013/0131294 A1* | 5/2013 | Hagadorn ............. | C08F 210/16 526/170 |

FOREIGN PATENT DOCUMENTS

| | | |
|---|---|---|
| DE | 10130229 A1 | 1/2003 |
| EP | 802202 A1 | 10/1997 |

OTHER PUBLICATIONS

Westmoreland et al., Chiral Titanium Bis(aminopyridinates) Based on a Biaryl Backbone, Organometallics 2003, 22, 2972-2976 (Year: 2003).*

Babcock et al., "Double Heterocumulene Metathesis of Cyclic Bis(trimethylsilylamido)stannylenes and Tethered Bimetallic Bisamidinates from the Resulting α,ω-Biscarbodiimides†." Organometallics, 1999, 18(26): 5729-5732.

Chen et al., "Synthesis and catalytic properties of oxalic amidinato complexes." Journal of the Chemical Society, 2001 Dalton Transactions(11): 1761-1767.

Chen et al., "Dimeric Zirconium Complex Bearing a Dianionic ansa-bis(aminopyridinato) Ligand", Mendeleev Commun., 2014, 24: 114-116.

Grundy et al., "Ambiphilic ligands from the 1,4-benzenebis(amidine) framework." New Journal of Chemistry, 2004, 28(10): 1195-1197.

Hagadorn, J. R., "New binucleating ligands to support dizirconium organometallics." Chemical Communications, 2001, (20): 2144-2145.

Hagadorn et al., "Tethered Bis-Amidinates as Supporting Ligands: A Concerted Elimination/σ—π Rearrangement Reaction Forming an Unusual Titanium Arene Complex." Angewandte Chemie International Edition, 1998, 37(12): 1729-1731.

Hagadorn et al., "Dizirconium Complexes Supported by Preorganized Binucleating Bis(amidinates)." Organometallics, 2003, 22(23): 4818-4824.

Kincaid et al., "Synthesis, Structure, and Coordination Chemistry of a Tridentate, Six-Electron-Donor Amidinate Ligand." Organometallics, 1999, 18(25): 5360-5366.

Littke et al., "Bulky Bis(alkylamidinate) Complexes of Group 4. Syntheses and Characterization of M(CyNC(R')NCy) 2Cl2 and Zr(CyNC(Me)NCy)2Me2 (R'=Me, M=Ti, Zr, Hf; R'=tBu, M=Zr)." Organometallics, 1998, 17(3): 446-451.

McNevin et al., "Dititanium Complexes of Preorganized Binucleating Bis(amidinates)." Inorganic Chemistry, 2004, 43 (26): 8547-8554.

Ong et al., "Catalytic C[double bond, length as m-dash]N bond metathesis of carbodiimides by group 4 and 5 imido complexes supported by guanidinate ligands." Chemical Communications, 2003, (20): 2612-2613.

Ong et al., "Redefining the Coordination Geometry and Reactivity of Guanidinate Complexes by Covalently Linking the Guanidinate Ligands. Synthesis and Reactivity of [RN{NH(R)}CN(CH2)2NC{NH(R)}NR]M(CH2Ph)2 (R=iPr; M=Ti, Zr)." Organometallics, 2003, 22(3): 387-389.

Otten et al., "Zirconium Bisamidinate Complexes with Sterically Demanding Ligands: Structure, Solution Dynamics, and Reactivity." Organometallics, 2005, 24(18): 4374-4386.

Theilmann et al., "[Cp2TiIII(NCy)2C☐TiIIICp2]: A Transient Titanocene Carbene Complex?" Angewandte Chemie International Edition, 2010, 49(48): 9282-9285.

Ward et al., "2-Aminopyrrolines: New Chiral Amidinate Ligands with a Rigid Well-Defined Molecular Structure and Their Coordination to TiIV." Inorganic Chemistry, 2006, 45(19): 7777-7787.

Westmoreland et al., "Chiral Titanium Bis(aminopyridinates) Based on a Biaryl Backbone", Organomettalics, 2003, 22, 2972-2976.

Zhang et al., "Investigation of Dynamic Intra- and Intermolecular Processes within a Tether-Length Dependent Series of Group 4 Bimetallic Initiators for Stereomodulated Degenerative Transfer Living Ziegler—Natta Propene Polymerization." Advanced Synthesis & Catalysis, 2008, 350(3): 439-447.

International Search Report and Written Opinion pertaining to PCT/US2017/025009 dated Jun. 29, 2017.

Communication Pursuant to Article 94(3) EPC, dated Dec. 13, 2019 pertaining to European Patent Application No. 17719065.9.

* cited by examiner

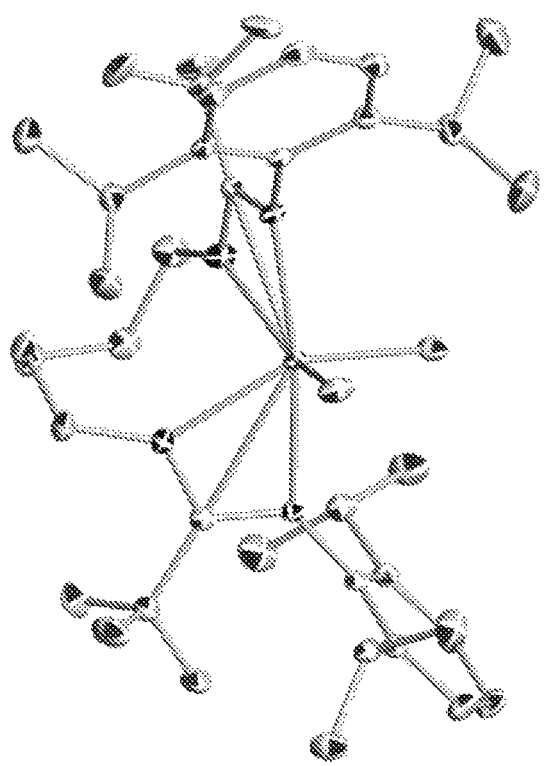

OLEFIN POLYMERIZATION CATALYST

CROSS REFERENCE TO RELATED APPLICATIONS

This application claims priority to U.S. Provisional Application Ser. No. 62/316,003, filed Mar. 31, 2016, which is hereby incorporated by reference in its entirety.

FIELD OF DISCLOSURE

The instant disclosure relates to an olefin polymerization catalyst system.

BACKGROUND OF THE DISCLOSURE

Olefin based polymers such as polyethylene are produced via various catalyst systems and polymerization processes. Selection of such catalyst systems used in the polymerization process of the olefin based polymers is an important factor contributing to the characteristics and properties of such olefin based polymers.

The polyolefin polymerization process can be varied in a number of ways to produce a wide variety of resultant polyolefin resins having different physical properties suitable for use in different applications. It is generally known that polyolefin can be produced in solution phase polymerization process, gas phase polymerization process, and/or slurry phase polymerization process in one or more reactors, for example, connected in series or parallel, in the presence of one or more catalyst systems.

Despite the currently available olefin polymerization catalyst systems, there is a need for an olefin polymerization catalyst system having improved properties facilitating the production of high molecular weight ($M_w$) polyolefins with narrow polydispersities and especially low octene incorporation, particularly at high temperatures.

SUMMARY OF THE DISCLOSURE

The disclosure provides an olefin polymerization catalyst system comprising: a procatalyst component comprising a metal-ligand complex of Formula (I):

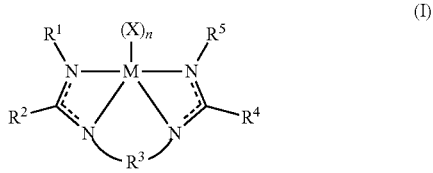

wherein M is titanium, zirconium, or hafnium;

wherein each X is independently a monodentate or polydentate ligand that is neutral, monoanionic, or dianionic, wherein n is an integer, and wherein X and n are chosen in such a way that the metal-ligand complex of Formula (I) is overall neutral;

wherein each $R^1$ and $R^5$ independently is selected from the group consisting of ($C_1$-$C_{40}$)hydrocarbyls, substituted ($C_1$-$C_{40}$)hydrocarbyls, ($C_1$-$C_{40}$)heterohydrocarbyls, and substituted ($C_1$-$C_{40}$)heterohydrocarbyls;

wherein each $R^2$ and $R^4$ independently is selected from a group consisting of ($C_1$-$C_{40}$)hydrocarbyls and substituted ($C_1$-$C_{40}$)hydrocarbyls;

wherein $R^3$ is selected from the group consisting of a ($C_3$-$C_{40}$)hydrocarbylene, substituted ($C_3$-$C_{40}$)hydrocarbylene, [(C+Si)$_3$-(C+Si)$_{40}$]organosilylene, substituted [(C+Si)$_3$-(C+Si)$_{40}$]organosilylene, [(C+Ge)$_3$-(C+Ge)$_{40}$]organogermylene, or substituted [(C+Ge)$_3$-(C+Ge)$_{40}$] organogermylene such that there are at least three atoms in the shortest $R^3$ chain connecting the bridged N atoms of Formula (I);

wherein each N independently is nitrogen; and optionally, two or more $R^{1-5}$ groups each independently can combine together to form mono-aza ring structures, with such ring structures having from 5 to 16 atoms in the ring excluding any hydrogen atoms.

In one embodiment, the instant invention provides an olefin-based composition comprising the polymerization reaction product of one or more olefin monomers in the presence of the olefin polymerization catalyst system, as described above.

In an alternative embodiment, the instant invention further provides an olefin polymerization process comprising polymerizing one or more olefin monomers in the presence of the olefin polymerization catalyst, as described above.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 1 is a single crystal X-ray structure (hydrogen atoms are omitted for clarity) of Inventive Procatalyst 2 illustrating pseudo octahedral coordination stereochemistry.

DETAILED DESCRIPTION OF THE DISCLOSURE

The disclosure provides an olefin polymerization catalyst system comprising: a procatalyst component comprising a metal-ligand complex of Formula (I):

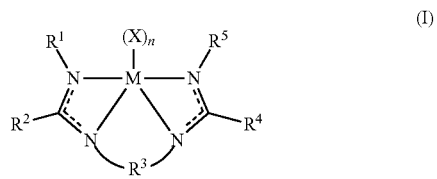

wherein M is titanium, zirconium, or hafnium;

wherein each X is independently a monodentate or polydentate ligand that is neutral, monoanionic, or dianionic, wherein n is an integer, and wherein X and n are chosen in such a way that the metal-ligand complex of Formula (I) is overall neutral;

wherein each $R^1$ and $R^5$ independently is selected from the group consisting of ($C_1$-$C_{40}$)hydrocarbyls, substituted ($C_1$-$C_{40}$)hydrocarbyls, ($C_1$-$C_{40}$)heterohydrocarbyls, and substituted ($C_1$-$C_{40}$)heterohydrocarbyls;

wherein each $R^2$ and $R^4$ independently is selected from a group consisting of ($C_1$-$C_{40}$)hydrocarbyls and substituted ($C_1$-$C_{40}$)hydrocarbyls;

wherein $R^3$ is selected from the group consisting of a ($C_3$-$C_{40}$)hydrocarbylene, substituted ($C_3$-$C_{40}$)hydrocarbylene, [(C+Si)$_3$-(C+Si)$_{40}$]organosilylene, substituted [(C+Si)$_3$-(C+Si)$_{40}$]organosilylene, [(C+Ge)$_3$-(C+Ge)$_{40}$]organogermylene, or substituted [(C+Ge)$_3$-(C+Ge)$_{40}$]

organogermylene such that there are at least three atoms in the shortest $R^3$ chain connecting the bridged N atoms of Formula (I); and wherein each N independently is nitrogen;

optionally, two or more $R^{1-5}$ groups each independently can combine together to form mono-aza ring structures, with such ring structures having from 5 to 16 atoms in the ring excluding any hydrogen atoms.

The metal ligand complex of Formula (I) above, and all specific embodiments thereof herein, is intended to include every possible stereoisomer, including coordination isomers, thereof.

Common abbreviations are listed below:
R, N, M, and X: as defined above;
Me: methyl; Et: ethyl; Ph: phenyl; Bn: benzyl; i-Pr: isopropyl; t-Bu: tert-butyl; t-Oct: tert-octyl; Ts: toluene sulfonate; THF: tetrahydrofuran; $Et_2O$: diethyl ether; DMA: dimethylacetamide; DME: dimethoxyethane; $CH_2Cl_2$: dichloromethane; $CCl_4$: carbon tetrachloride; EtOH: ethanol; $CH_3CN$: acetonitrile; MeCN: acetonitrile; EtOAc: ethyl acetate; $C_6D_6$: deuterated benzene; Benzene-$d_6$: deuterated benzene; $CDCl_3$: deuterated chloroform; DMSO-$d_6$: deuterated dimethylsulfoxide; dba: dibenzylideneacetone; $PPh_3$: triphenylphosphine; $PCy_3$: tricyclohexylphosphine; CyPF-t-Bu (Josiphos), having the structure:

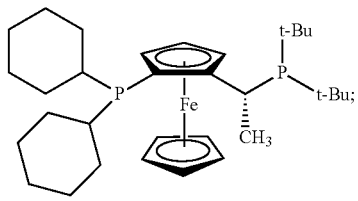

$NEt_3$: Triethylamine; $NH_2Pr$: Propylamine; $NaHSO_3$: sodium bisulfite; $SiO_2$: silica gel; $Me_4Si$: Tetramethylsilane; MeI: methyl iodide; NaOH: sodium hydroxide; $NaHCO_3$: sodium bicarbonate; $NaO^tBu$: sodium tert-butoxide; $K_3PO_4$: potassium phosphate tribasic; brine: saturated aqueous sodium chloride; $Na_2SO_4$: sodium sulfate; $MgSO_4$: magnesium sulfate; HCl: hydrogen chloride; $NH_4OH$: ammonium hydroxide; KHMDS: potassium hexamethyldisilazide; $PCl_5$: phosphorous pentachloride; $SOCl_2$: Thionylchloride; n-BuLi: n-butyllithium; $AlMe_3$: trimethylaluminum; CuI: copper(I) iodide; $Cs_2CO_3$: cesium carbonate; $AgNO_3$: silver nitrate; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $NiBr_2(DME)$: nickel(II) bromide ethylene glycol dimethyl ether complex; $N_2$: nitrogen gas; PhMe: toluene; MAO: methylaluminoxane; MMAO: modified methylaluminoxane; PTFE: polytetrafluoroethylene; GC: gas chromatography; LC: liquid chromatography; NMR: nuclear magnetic resonance; HRMS: high resolution mass spectrometry; mmol: millimoles; mL: milliliters; M: molar; min: minutes; h: hours; d: days.

In an alternative embodiment, each of the $(C_1-C_{40})$hydrocarbyl and $(C_1-C_{40})$heterohydrocarbyl of any one or more of $R^1$, $R^2$, $R^4$ and $R^5$ independently is unsubstituted or substituted with one or more $R^S$ substituents, and wherein each $R^S$ independently is a halogen atom, polyfluoro substitution, perfluoro substitution, unsubstituted $(C_1-C_{18})$alkyl, $(C_6-C_{18})$aryl, $(C_3-C_{18})$heteroaryl, $F_3C$, $FCH_2O$, $F_2HCO$, $F_3CO$, $(R^C)_3Si$, $(R^C)_3Ge$, $(R^C)O$, $(R^C)S$, $(R^C)S(O)$, $(R^C)S(O)_2$, $(R^C)_2P$, $(R^C)_2N$, $(R^C)_2C=N$, NC, $NO_2$, $(R^C)C(O)O$, $(R^C)OC(O)$, $(R^C)C(O)N(R^C)$, or $(R^C)_2NC(O)$, or two of the $R^S$ are taken together to form an unsubstituted $(C_1-C_{18})$alkylene, wherein each $R^S$ independently is an unsubstituted $(C_1-C_{18})$alkyl.

Optionally, two or more $R^{1-5}$ groups each independently can combine together to form mono-aza ring structures, with such ring structures having from 5 to 16 atoms in the ring excluding any hydrogen atoms. The term mono-aza ring describes ring structures containing only one nitrogen atom.

The disclosure further provides the olefin polymerization catalyst system according to any embodiment described herein except that $R^1$ and $R^5$ are each independently a $(C_6-C_{40})$aryl or substituted $(C_6-C_{40})$aryl group.

The disclosure further provides the olefin polymerization catalyst system according to any embodiment described herein except that $R^3$ is an optionally substituted 5 atom bridge and $R^1$ and $R^5$ are each independently a $(C_6-C_{40})$aryl or substituted $(C_6-C_{40})$aryl group. The disclosure further provides the olefin polymerization catalyst system according to any embodiment described herein except that $R^2$ and $R^4$ are each independently a methyl group.

The disclosure further provides the olefin polymerization catalyst system according to any embodiment described herein except that $R^2$ is a methyl group, $R^3$ is a 5 atom bridge and $R^1$ and $R^5$ is a $(C_6-C_{40})$aryl or substituted $(C_6-C_{40})$aryl group.

As used in defining $R^3$, the term $(C_3-C_{40})$hydrocarbylene is also defined by having the two radical bearing atoms of the diradical unit spaced apart by one or more intervening carbon atoms such that a three or more carbon linkage is created between the bridged N atoms of Formula (I). The disclosure further provides the olefin polymerization catalyst system according to any embodiment described herein except that $R^3$ is selected from the group consisting of 1,4-, 1,5-, or 1,6-diradicals. In a specific embodiment, $R^3$ is selected from the group consisting of 1,5-diradicals. In yet another embodiment, $R^3$ is selected from the group consisting of 1,4-diradicals, 1,5-diradicals, and 1,6-diradicals of $(C_6-C_{18})$arylene; 1,4-diradicals, 1,5-diradicals, and 1,6-diradicals of $(C_4-C_{20})$cycloalkylene; 1,4-diradicals, 1,5-diradicals, and 1,6-diradicals of $(C_3-C_{20})$alkylene; 2,6-heptylene (e.g.,

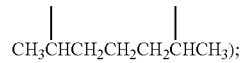

2,6-(2,6-dimethyl)heptylene; 3,3-dimethylpentylene; and ortho-xylylene. In yet another embodiment, $R^3$ is selected from the group consisting of ($-CH_2CH_2Si(Me)_2CH_2CH_2-$); ($-CH_2CH_2Si(^iPr)_2CH_2CH_2-$); ($-CH_2CH_2Si(Oct)_2CH_2CH_2-$); ($-CH_2CH_2Ge(Me)_2CH_2CH_2-$); ($-CH_2CH_2Ge(^iPr)_2CH_2CH_2-$); and ($-CH_2CH_2Ge(Oct)_2CH_2CH_2-$).

When used to describe certain carbon atom-containing chemical groups (e.g., $(C_1-C_{40})$alkyl), the parenthetical expression $(C_1-C_{40})$ can be represented by the form "$(C_x-C_y)$," which means that the unsubstituted version of the chemical group comprises from a number x carbon atoms to a number y carbon atoms, wherein each x and y independently is an integer as described for the chemical group. The $R^S$ substituted version of the chemical group can contain more than y carbon atoms depending on nature of $R^S$. Thus, for example, an unsubstituted $(C_1-C_{40})$alkyl contains from 1 to 40 carbon atoms (x=1 and y=40). When the chemical group is substituted by one or more carbon atom-containing $R^S$ substituents, the substituted $(C_x-C_y)$ chemical group may comprise more than y total carbon atoms; i.e., the total number of carbon atoms of the carbon atom-containing substituent(s)-substituted ($C_x$-$C_y$) chemical group is equal to y plus the sum of the number of carbon atoms of each of the carbon atom-containing substituent(s). Any atom of a chemical group that is not specified herein is understood to be a hydrogen atom.

In some embodiments, each of the chemical groups (e.g. $R^{1-5}$) of the metal-ligand complex of Formula (I) may be unsubstituted, that is, can be defined without use of a substituent $R^S$, provided the above-mentioned conditions are satisfied. In other embodiments, at least one of the chemical groups of the metal-ligand complex of Formula (I) independently contain one or more of the substituents $R^S$. Where the invention compound contains two or more substituents $R^S$, each $R^S$ independently is bonded to a same or different substituted chemical group. When two or more $R^S$ are bonded to a same chemical group, they independently are bonded to a same or different carbon atom or heteroatom, as the case may be, in the same chemical group up to and including persubstitution of the chemical group.

The term "persubstitution" means each hydrogen atom (H) bonded to a carbon atom or heteroatom of a corresponding unsubstituted compound or functional group, as the case may be, is replaced by a substituent (e.g., $R^S$). The term "polysubstitution" means each of at least two, but not all, hydrogen atoms (H) bonded to carbon atoms or heteroatoms of a corresponding unsubstituted compound or functional group, as the case may be, is replaced by a substituent (e.g., $R^S$). The term "monosubstitution" means that only one hydrogen atom (H) bonded to a carbon atom or heteroatom of a corresponding unsubstituted compound or functional group, as the case may be, is replaced by a substituent (e.g., $R^S$). The ($C_1$-$C_{18}$)alkylene and ($C_1$-$C_8$)alkylene substituents are especially useful for forming substituted chemical groups that are bicyclic or tricyclic analogs, as the case may be, of corresponding monocyclic or bicyclic unsubstituted chemical groups.

As used herein, the definitions of the terms hydrocarbyl, heterohydrocarbyl, hydrocarbylene, heterohydrocarbylene, alkyl, alkylene, heteroalkyl, heteroalkylene, aryl, arylene, heteroaryl, heteroarylene, cycloalkyl, cycloalkylene, heterocycloalkyl, heterocycloalkylene, organosilylene, organogermylene are intended to include every possible stereoisomer.

Heteroalkyl and heteroalkylene groups are saturated straight or branched chain radicals or diradicals, respectively, containing ($C_1$-$C_{40}$)carbon atoms, and one or more of the heteroatoms or heteroatomic groups O; S; N; S(O); S(O)$_2$; S(O)$_2$N; Si($R^C$)$_2$; Ge($R^C$)$_2$; P($R^C$); P(O)($R^C$); and N($R^C$), as defined above, wherein each of the heteroalkyl and heteroalkylene groups independently are unsubstituted or substituted by one or more $R^S$. Examples of substituted and unsubstituted heteroalkyl groups are methoxyl; ethoxyl; trimethylsilyl; dimethylphenylsilyl; tert-butyldimethylsilyl; and dimethylamino.

As used herein, the term "($C_1$-$C_{40}$)hydrocarbyl" means a hydrocarbon radical of from 1 to 40 carbon atoms and the term "($C_1$-$C_{40}$)hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and polycyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

Preferably, a ($C_1$-$C_{40}$)hydrocarbyl independently is an unsubstituted or substituted ($C_1$-$C_{40}$)alkyl, ($C_3$-$C_{40}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene. More preferably, each of the aforementioned ($C_1$-$C_{40}$)hydrocarbyl groups independently has a maximum of 20 carbon atoms (i.e., ($C_1$-$C_{20}$)hydrocarbyl), and still more preferably a maximum of 15 carbon atoms.

The term "($C_1$-$C_{40}$)alkyl" means a saturated straight or branched hydrocarbon radical of from 1 to 40 carbon atoms, that is unsubstituted or substituted by one or more $R^S$. Examples of unsubstituted ($C_1$-$C_{40}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 2,2-dimethylpropyl, 1-butyl; 2-butyl; 2-methylpropyl; 1,1-dimethylethyl; 1-pentyl; 1-hexyl; 2-ethylhexyl, 1-heptyl; 1-nonyl; 1-decyl; 2,2,4-trimethylpentyl; Examples of substituted ($C_1$-$C_{40}$)alkyl are substituted ($C_1$-$C_{20}$)alkyl; substituted ($C_1$-$C_{10}$) alkyl; trifluoromethyl; trimethylsilylmethyl; methoxymethyl; dimethylaminomethyl; trimethylgermylmethyl; phenylmethyl (benzyl); 2-phenyl-2,2-methylethyl; 2-(dimethylphenylsilyl)ethyl; and dimethyl(t-butyl)silylmethyl.

The term "($C_6$-$C_{40}$)aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein one ring is aromatic and the optional second and third rings independently are fused or non-fused and the second and third rings are each independently optionally aromatic. Examples of unsubstituted ($C_6$-$C_{40}$)aryl are unsubstituted ($C_6$-$C_{20}$)aryl; unsubstituted ($C_6$-$C_{18}$)aryl; phenyl; biphenyl; ortho-terphenyl; meta-terphenyl; fluorenyl; tetrahydrofluorenyl; indacenyl; hexahydroindacenyl; indenyl; dihydroindenyl; naphthyl; tetrahydronaphthyl; phenanthrenyl and triptycenyl. Examples of substituted ($C_6$-$C_{40}$)aryl are substituted ($C_6$-$C_{20}$)aryl; substituted ($C_6$-$C_{18}$)aryl; 2,6-bis[($C_1$-$C_{20}$)alkyl]-phenyl; 2-($C_1$-$C_5$)alkyl-phenyl; 2,6-bis($C_1$-$C_5$)alkyl-phenyl; 2,4,6-tris($C_1$-$C_5$)alkyl-phenyl; polyfluorophenyl; pentafluorophenyl; 2,6-dimethylphenyl, 2,6-diisopropylphenyl; 2,4,6-triisopropylphenyl; 2,4,6-trimethylphenyl; 2-methyl-6-trimethylsilylphenyl; 2-methyl-4,6-diisopropylphenyl; 4-methoxyphenyl; and 4-methoxy-2,6-dimethylphenyl.

The term "($C_3$-$C_{40}$)cycloalkyl" means a saturated cyclic or polycyclic (i.e. fused or unfused) hydrocarbon radical of from 3 to 40 carbon atoms that is unsubstituted or substituted by one or more $R^S$. Other cycloalkyl groups (e.g., ($C_3$-$C_{12}$)alkyl)) are defined in an analogous manner. Examples of unsubstituted ($C_3$-$C_{40}$)cycloalkyl are unsubstituted ($C_3$-$C_{20}$) cycloalkyl, unsubstituted ($C_3$-$C_{10}$)cyclo alkyl; cyclopropyl; cyclobutyl; cyclopentyl; cyclohexyl; cycloheptyl; cyclooctyl; cyclononyl; cyclodecyl; octahydroindenyl; bicyclo [4.4.0]decyl; bicyclo[2.2.1]heptyl; and tricyclo[3.3.1.1] decyl. Examples of substituted ($C_3$-$C_{40}$)cycloalkyl are substituted ($C_3$-$C_{20}$)cycloalkyl; substituted ($C_3$-$C_{10}$)cycloalkyl; 2-methylcyclohexyl; and perfluorocyclohexyl.

Examples of ($C_1$-$C_{40}$)hydrocarbylene are unsubstituted or substituted ($C_3$-$C_{40}$)hydrocarbylene; ($C_6$-$C_{40}$)arylene, ($C_3$-$C_{40}$)cycloalkylene, and ($C_3$-$C_{40}$)alkylene (e.g., ($C_3$-$C_{20}$)alkylene). In some embodiments, the diradicals are on the terminal atoms of the hydrocarbylene as in a 1,3-alpha, omega diradical (e.g., —CH$_2$CH$_2$CH$_2$—) or a 1,5-alpha, omega diradical with internal substitution (e.g., —CH$_2$CH$_2$CH(CH$_3$)CH$_2$CH$_2$—). In other embodiments, the diradicals are on the non-terminal atoms of the hydrocarbylene as in a C$_7$ 2,6-diradical (e.g.,

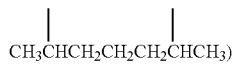
(CH$_3$CHCH$_2$CH$_2$CH$_2$CHCH$_3$)

or a C$_7$ 2,6-diradical with internal substitution (e.g.,

CH$_3$CHCH$_2$CH(CH$_3$)CH$_2$CHCH$_3$).

The terms [(C+Si)$_3$-(C+Si)$_{40}$] organosilylene and [(C+Ge)$_3$-(C+Ge)$_{40}$] organogermylene are defined as diradicals in which the two radical bearing atoms of the diradical unit are spaced apart by one or more intervening carbon, silicon and/or germanium atoms such that there are at least three atoms in the shortest chain connecting the bridged N atoms of Formula (I). Such [(C+Si)$_3$-(C+Si)$_{40}$] organosilylene and [(C+Ge)$_3$-(C+Ge)$_{40}$] organogermylene groups can be substituted or unsubstituted. In some embodiments the diradicals are on the terminal atoms of the organosilylene or organogermylene as in a 1,5 alpha, omega diradical (e.g. —CH$_2$CH$_2$Si(C$_2$H$_5$)$_2$CH$_2$CH$_2$— and —CH$_2$CH$_2$Ge(C$_2$H$_5$)$_2$CH$_2$CH$_2$—). In other embodiments, the diradicals are on the non-terminal atoms of the organosilylene or organogermylene as in a substituted (C+Si)$_7$ 2,6-diradical

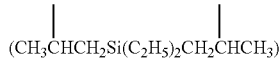
(CH$_3$CHCH$_2$Si(C$_2$H$_5$)$_2$CH$_2$CHCH$_3$)

and a substituted (C+Ge)$_7$ 2,6-diradical

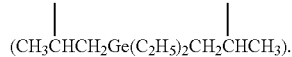
(CH$_3$CHCH$_2$Ge(C$_2$H$_5$)$_2$CH$_2$CHCH$_3$).

The term "(C$_1$-C$_{40}$)alkylene" means a saturated or unsaturated straight chain or branched chain diradical of from 1 to 40 carbon atoms that is unsubstituted or substituted by one or more R$^S$. Examples of unsubstituted (C$_1$-C$_{40}$)alkylene are unsubstituted (C$_3$-C$_{20}$)alkylene, including unsubstituted 1,3 (C$_3$-C$_{10}$)alkylene; 1,4(C$_4$-C$_{10}$)alkylene; —(CH$_2$)$_3$—; —(CH$_2$)$_4$—; —(CH$_2$)$_5$—; —(CH$_2$)$_6$—; —(CH$_2$)$_7$—; —(CH$_2$)$_8$—; and —(CH$_2$)$_4$CH(CH$_3$)—. Examples of substituted (C$_1$-C$_{40}$)alkylene are substituted (C$_3$-C$_{20}$)alkylene; —CF$_2$CF$_2$CF$_2$—; and —(CH$_2$)$_{14}$C(CH$_3$)$_2$(CH$_2$)$_5$— (i.e., a 6,6-dimethyl substituted normal-1,20-eicosylene). Since as mentioned previously two R$^S$ may be taken together to form a (C$_1$-C$_{40}$)alkylene, examples of substituted (C$_1$-C$_{40}$)alkylene also include 1,2-bis(methylene)cyclopentane; 1,2-bis(methylene)cyclohexane; 2,3-bis(methylene)-7,7-dimethylbicyclo[2.2.1]heptane; and 2,3-bis(methylene)bicyclo[2.2.2]octane.

The term "(C$_3$-C$_{40}$)cycloalkylene" means a cyclic diradical (i.e., the radicals are on ring atoms) of from 3 to 40 carbon atoms that is unsubstituted or substituted by one or more R$^S$. Connection of the chelating substituents to a cycloalkylene R$^3$ group of Formula (I) must also satisfy the requirement that there be at least three atoms in the shortest chain connecting the bridged N atoms of Formula (I).

Examples of unsubstituted (C$_3$-C$_{40}$)cycloalkylene are 1,3-cyclobutylene, 1,3-cyclopentylene, and 1,4-cyclohexylene. Examples of substituted (C$_3$-C$_{40}$)cycloalkylene are 2-trimethylsilyl-1,4-cyclohexylene and 1,2-dimethyl-1,3-cyclohexylene.

The terms "(C$_1$-C$_{40}$)heterohydrocarbyl" and "(C$_1$-C$_{40}$)heterohydrocarbylene" mean a heterohydrocarbon radical or diradical, respectively, of from 1 to 40 carbon atoms, and each heterohydrocarbon independently has one or more heteroatoms or heteroatomic groups O; S; N; S(O); S(O)$_2$; S(O)$_2$N; Si(R$^C$)$_2$; Ge(R$^C$)$_2$; P(R$^C$); P(O)(R$^C$); and N(R$^C$), wherein independently each R$^C$ is hydrogen, unsubstituted (C$_1$-C$_{18}$)hydrocarbyl or an unsubstituted (C$_1$-C$_{18}$)heterohydrocarbyl, or absent (e.g., absent when N comprises —N=). Each (C$_1$-C$_{40}$)heterohydrocarbyl and (C$_1$-C$_{40}$)heterohydrocarbylene independently is unsubstituted or substituted (by one or more R$^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

Preferably, the (C$_1$-C$_{40}$)heterohydrocarbyl independently is unsubstituted or substituted (C$_1$-C$_{40}$)heteroalkyl, (C$_1$-C$_{40}$)hydrocarbyl-O—, (C$_1$-C$_{40}$)hydrocarbyl-S—, (C$_1$-C$_{40}$)hydrocarbyl-S(O)—, (C$_1$-C$_{40}$)hydrocarbyl-S(O)$_2$—, (C$_1$-C$_{40}$)hydrocarbyl-Si(R$^C$)$_2$—, (C$_1$-C$_{40}$)hydrocarbyl-Ge(R$^C$)$_2$—, (C$_1$-C$_{40}$)hydrocarbyl-N(R$^C$)—, (C$_1$-C$_{40}$)hydrocarbyl-P(R$^C$)—, (C$_2$-C$_{40}$)heterocycloalkyl, (C$_2$-C$_{19}$)heterocycloalkyl-(C$_1$-C$_{20}$)alkylene, (C$_3$-C$_{20}$)cycloalkyl-(C$_1$-C$_{19}$)heteroalkylene, (C$_2$-C$_{19}$)heterocycloalkyl-(C$_1$-C$_{20}$)heteroalkylene, (C$_1$-C$_{40}$)heteroaryl, (C$_1$-C$_{19}$)heteroaryl-(C$_1$-C$_{20}$)alkylene, (C$_6$-C$_{20}$)aryl-(C$_1$-C$_{19}$)heteroalkylene, or (C$_1$-C$_{19}$)heteroaryl-(C$_1$-C$_{20}$)heteroalkylene. The term "(C$_1$-C$_{40}$)heteroaryl" means an unsubstituted or substituted (by one or more R$^S$) mono-, bi- or tricyclic heteroaromatic hydrocarbon radical of from 1 to 40 total carbon atoms and from 1 to 6 heteroatoms, and the mono-, bi- or tricyclic radical comprises 1, 2 or 3 rings, respectively, wherein one ring is heteroaromatic and the optional second and third rings independently are fused or non-fused; and the second or third rings are each independently optionally heteroaromatic. Other heteroaryl groups (e.g., (C$_1$-C$_{12}$)heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P, and preferably O, S, or N. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 3 to 5 carbon atoms and 1 to 3 heteroatoms, the heteroatoms being N or P, and preferably N. Examples of 6-membered ring heteroaromatic hydrocarbon radical are pyridine-2-yl; pyrimidin-2-yl; and pyrazin-2-yl. The bicyclic heteroaromatic hydrocarbon radical preferably is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical preferably is a fused 5,6,5-; 5,6,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol- 1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

In some embodiments the $(C_2-C_{40})$heteroaryl is 2,7-disubstituted carbazolyl or 3,6-disubstituted carbazolyl, more preferably wherein each $R^S$ independently is phenyl, methyl, ethyl, isopropyl, or tertiary-butyl, still more preferably 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-azacyclodecyl.

The term "halogen atom" means fluorine atom (F), chlorine atom (Cl), bromine atom (Br), or iodine atom (I) radical. Preferably each halogen atom independently is the Br, F, or Cl radical, and more preferably the F or Cl radical. The term "halide" means fluoride (F⁻), chloride (Cl⁻), bromide (Br⁻), or iodide (I⁻) anion.

Preferably, there are no O—O, S—S, or O—S bonds, other than O—S bonds in an S(O) or S(O)₂ diradical functional group, in the metal-ligand complex of Formula (I). More preferably, there are no O—O, P—P, S—S, or O—S bonds, other than O—S bonds in an S(O) or S(O)₂ diradical functional group, in the metal-ligand complex of Formula (I).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, carbon-silicon double bonds, and carbon-nitrogen triple bonds, not including any such double bonds that may be present in substituents $R^S$, if any, or in (hetero)aromatic rings, if any.

M is titanium, zirconium, or hafnium. In one embodiment, M is titanium. In another embodiment, M is zirconium. In another embodiment, M is hafnium. In some embodiments, M is in a formal oxidation state of +2, +3, or +4. Each X independently is a monodentate or polydentate ligand that is neutral, monoanionic, or dianionic. X and n are chosen in such a way that the metal-ligand complex of Formula (I) is, overall, neutral. In some embodiments each X independently is the monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, borate, borohydride, sulfate, HC(O)O⁻, alkoxide or aryloxide (RO⁻), $(C_1-C_{40})$hydrocarbylC(O)O⁻, HC(O)N(H)⁻, $(C_1-C_{40})$hydrocarbylC(O)N(H)⁻, $(C_1-C_{40})$hydrocarbylC(O)N($(C_1-C_{20})$hydrocarbyl)⁻, $R^KR^LB^-$, $R^KR^LN^-$, $R^KO^-$, $R^KS^-$, $R^KR^LP^-$, or $R^MR^KR^LSi^-$, wherein each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{40})$heterohydrocarbylene and $R^M$ is as defined above.

In some embodiments at least one monodentate ligand of X independently is the neutral ligand. In one embodiment, the neutral ligand is a neutral Lewis base group that is $R^XNR^KR^L$, $R^KOR^L$, $R^KSR^L$, or $R^XPR^KR^L$, wherein each $R^X$ independently is hydrogen, $(C_1-C_{40})$hydrocarbyl, $[(C_1-C_{10})$hydrocarbyl]$_3$Si, $[(C_1-C_{10})$hydrocarbyl]$_3$Si$(C_1-C_{10})$hydrocarbyl, or $(C_1-C_{40})$heterohydrocarbyl and each $R^K$ and $R^L$ independently is as defined above.

In some embodiments, each X is a monodentate ligand that independently is a halogen atom, unsubstituted $(C_1-C_{20})$hydrocarbyl, unsubstituted $(C_1-C_{20})$hydrocarbylC(O)O—, or $R^KR^LN$— wherein each of $R^K$ and $R^L$ independently is an unsubstituted $(C_1-C_{20})$hydrocarbyl. In some embodiments each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^KR^LN$— wherein each of $R^K$ and $R^L$ independently is an unsubstituted $(C_1-C_{10})$hydrocarbyl.

In some embodiments there are at least two Xs and the two Xs are taken together to form the bidentate ligand. In some embodiments the bidentate ligand is a neutral bidentate ligand. In one embodiment, the neutral bidentate ligand is a diene of formula $(R^D)_2C=C(R^D)—C(R^D)=C(R^D)_2$, wherein each $R^D$ independently is H, unsubstituted $(C_1-C_6)$ alkyl, phenyl, or naphthyl. In some embodiments the bidentate ligand is a monoanionic-mono(Lewis base) ligand. The monoanionic-mono(Lewis base) ligand may be a 1,3-dionate of formula (D): $R^E—C(O^-)=CH—C(=O)—R^E$ (D), wherein each $R^D$ independently is H, unsubstituted $(C_1-C_6)$ alkyl, phenyl, or naphthyl. In some embodiments the bidentate ligand is a dianionic ligand. The dianionic ligand has a net formal oxidation state of −2. In one embodiment, each dianionic ligand independently is carbonate, oxalate (i.e., ⁻O₂CC(O)O⁻), $(C_2-C_{40})$hydrocarbylene dicarbanion, $(C_1-C_{40})$ heterohydrocarbylene dicarbanion, phosphate, or sulfate.

As previously mentioned, number and charge (neutral, monoanionic, dianionic) of X are selected depending on the formal oxidation state of M such that the metal-ligand complex of Formula (I) is, overall, neutral.

In some embodiments each X is the same, wherein each X is methyl; isobutyl; neopentyl; neophyl; trimethylsilylmethyl; phenyl; benzyl; or chloro. In some embodiments n is 2 and each X is the same.

In some embodiments at least two X are different. In some embodiments, each X is a different one of methyl; isobutyl; neopentyl; neophyl; trimethylsilylmethyl; phenyl; benzyl; and chloro.

In one embodiment, the metal-ligand complex of Formula (I) is a mononuclear metal complex. In another embodiment the metal-ligand complex of Formula (I) comprises a tetradentate bis-amidine ligand. In another embodiment, with bridging units attached to the central nitrogen donors, the tethered structures enforce metal complex geometries most amenable to catalysis. Bridge lengths greater than three atoms are required, and four to six atom bridges are most preferred to achieve the desired complexes. In one embodiment, the olefin polymerization catalyst system comprises a tetradentate bis-amidinate procatalyst component facilitating the production of high molecular weight ($M_w$) polyolefins with narrow polydispersities and especially low octene incorporation. In another embodiment, olefin polymerization catalyst systems of the present invention demonstrate reversible chain transfer indicative of chain shuttling behavior in the presence of appropriate chain shuttling agents. Such combination of attributes is particularly of interest in the preparation of olefin block copolymers. In general, the ability to tune alpha-olefin incorporation and thus short-chain branching distribution is critical to accessing materials with performance differentiation.

In some embodiments the metal-ligand complex of Formula (I) is a metal-ligand complex of the following Formula (II):

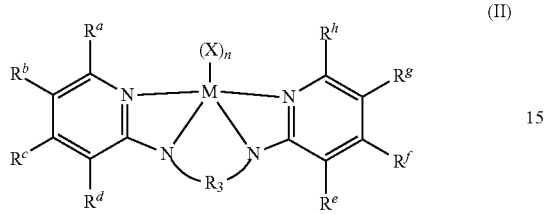

(II)

wherein the $R^S$ substituents $R^a$-$R^h$ are selected from the group consisting of ($C_1$-$C_{20}$)hydrocarbyls, substituted ($C_1$-$C_{20}$)hydrocarbyls, ($C_1$-$C_{20}$)heterohydrocarbyls, substituted ($C_1$-$C_{20}$)heterohydrocarbyls, ($C_6$-$C_{20}$)aryls, ($C_2$-$C_{20}$)heteroaryls, ($C_1$-$C_{20}$)alkyls, substituted ($C_1$-$C_{20}$)alkyls, perfluoro ($C_1$-$C_{20}$)alkyls, ($C_1$-$C_{20}$)organosilyls, halogen atoms and hydrogen atoms. In particular embodiments, each $R^a$ and $R^h$ are independently unsubstituted or substituted aryl groups such as 2,6-dimethylphenyl, 2,6-diethylphenyl, 2,6-diisopropylphenyl, 2,4,6-trimethylphenyl, 2,4,6-triethylphenyl, 2,4,6-triisopropylphenyl.

Structures exemplifying metal-ligand complexes described by Formula (I) are shown below:

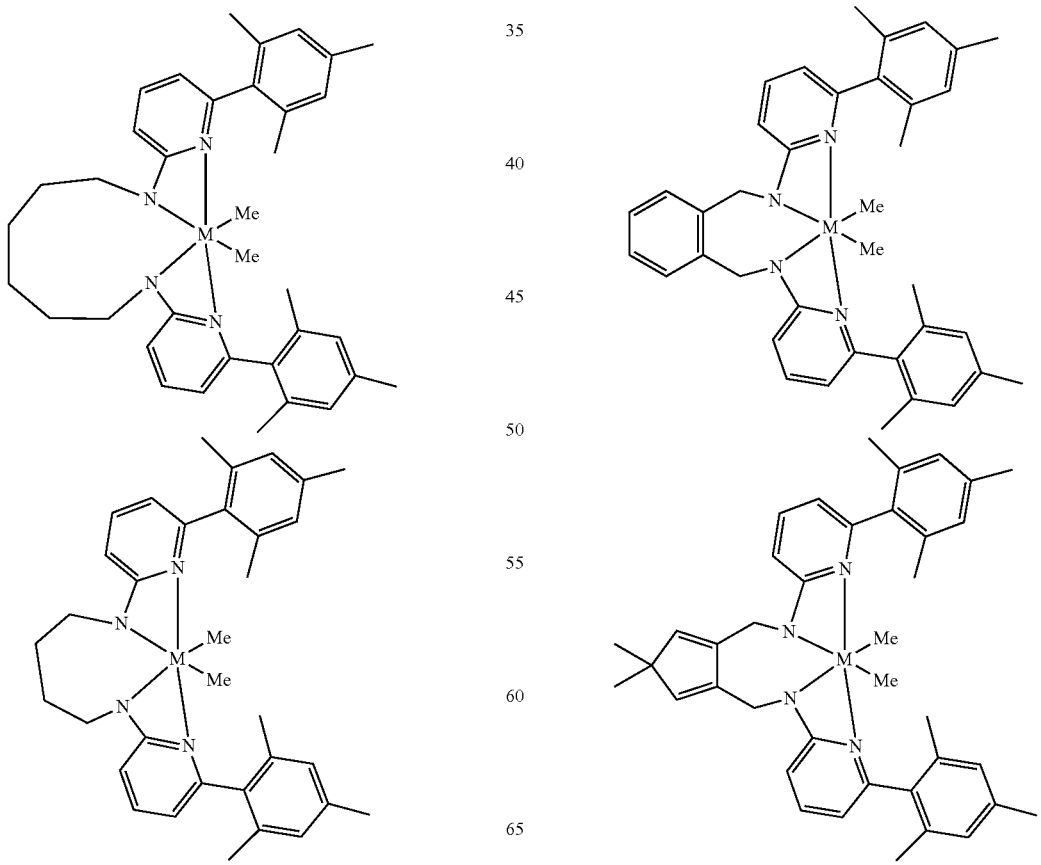

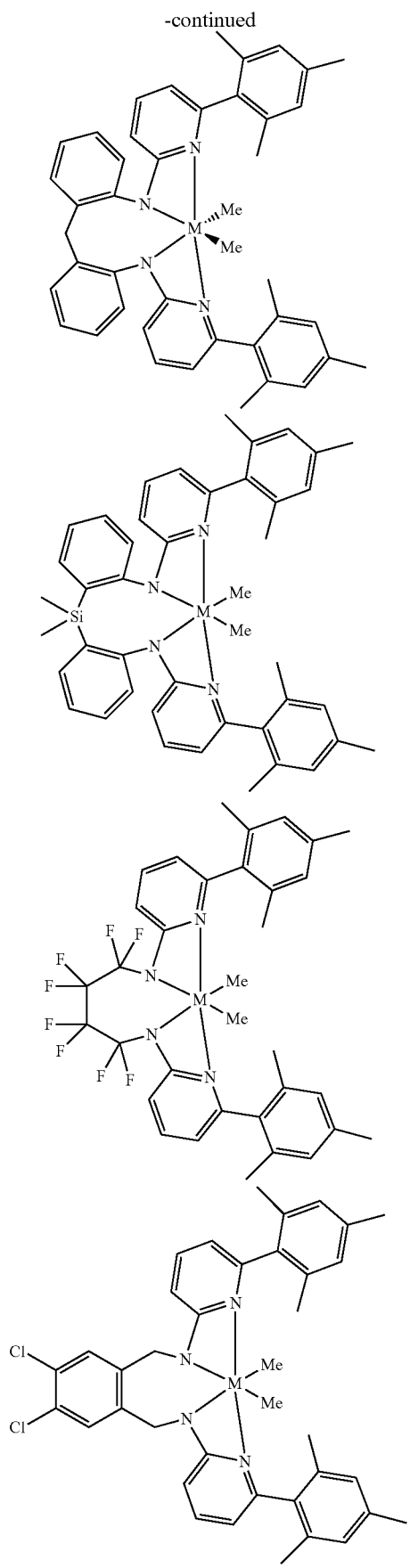

-continued
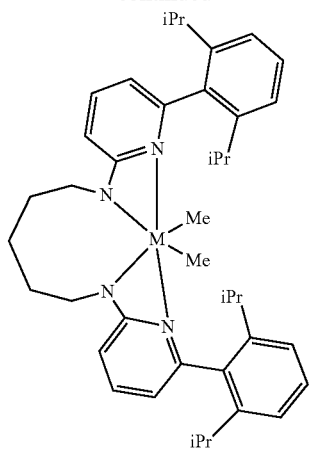
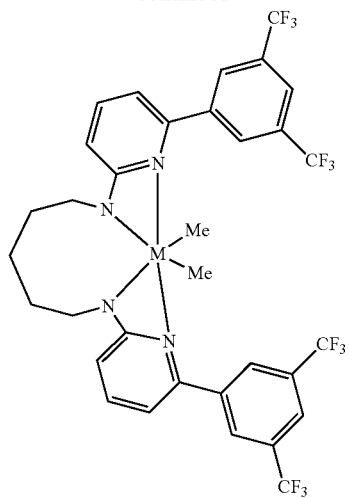
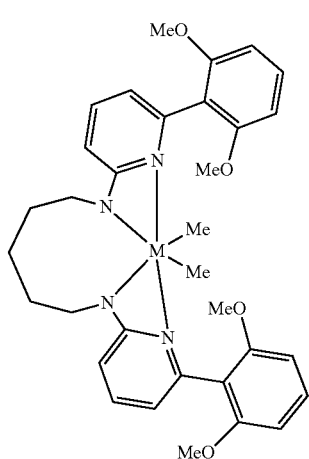
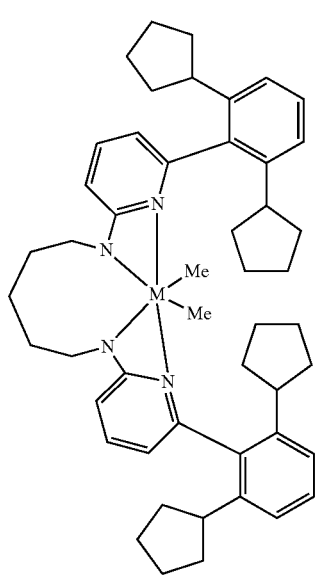
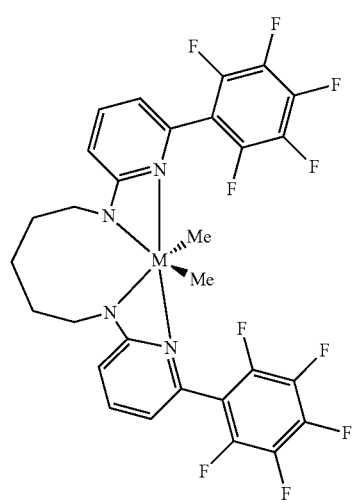
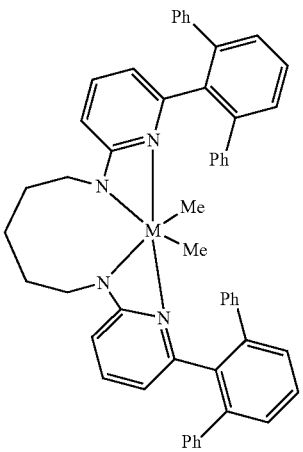

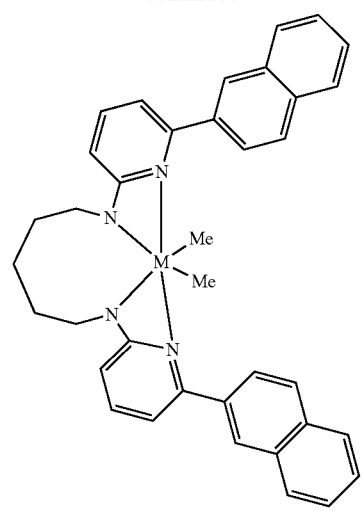
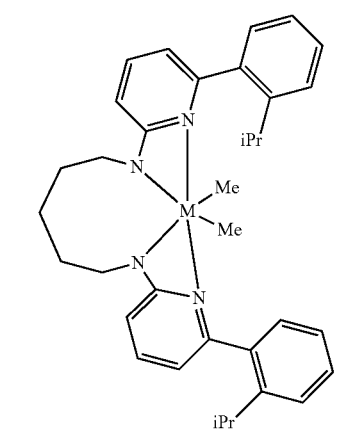
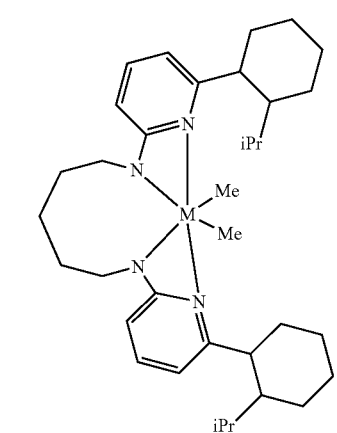
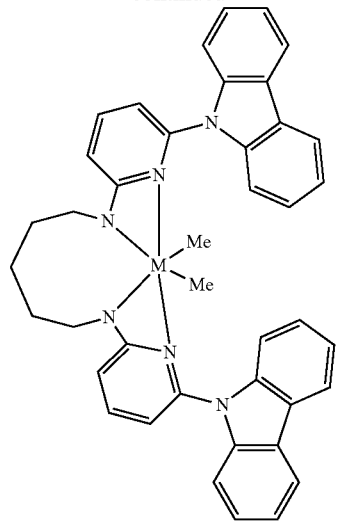
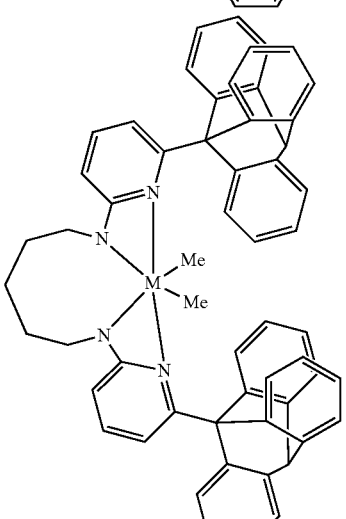
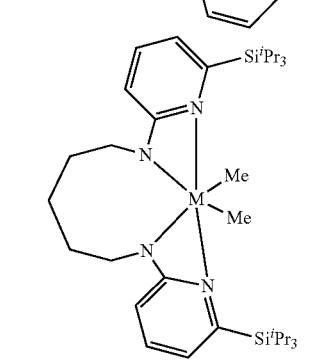
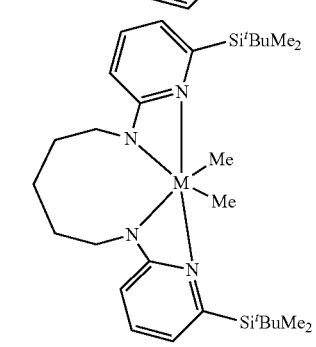

-continued
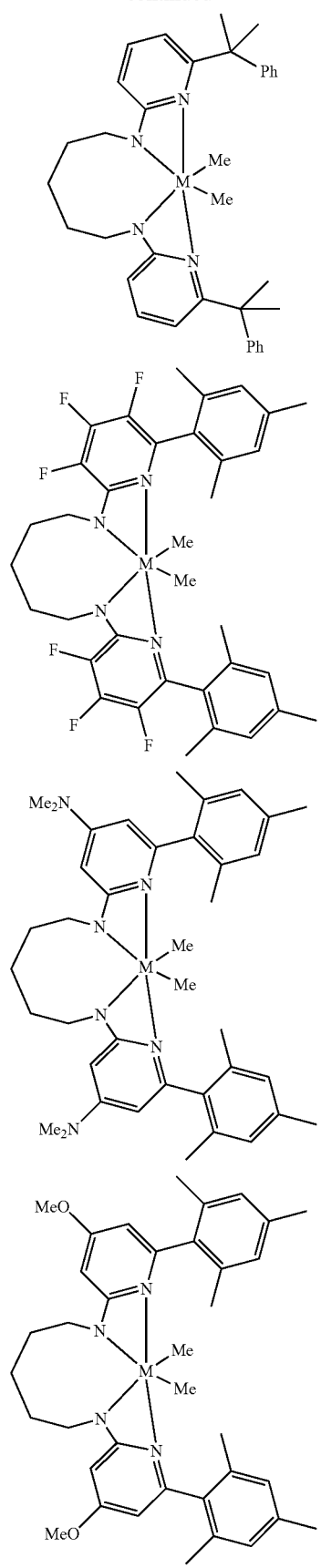
-continued
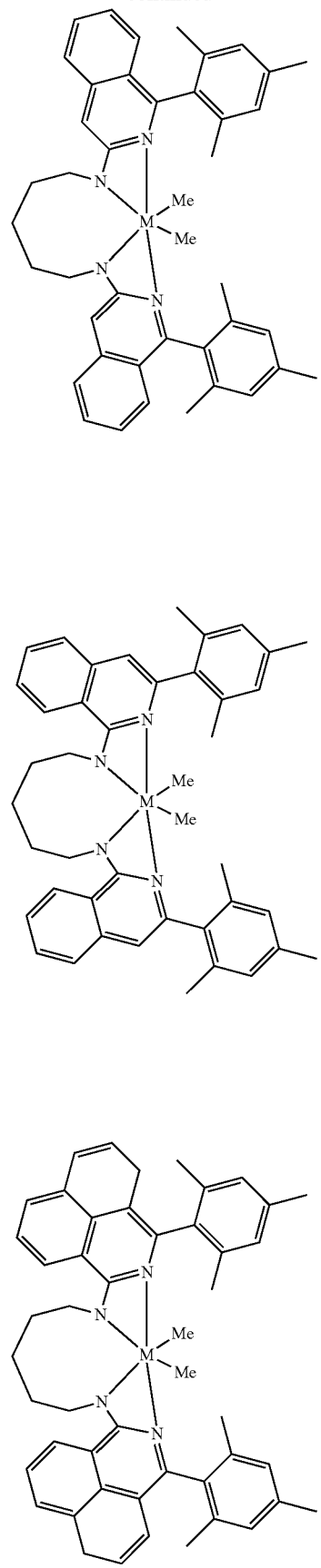

-continued
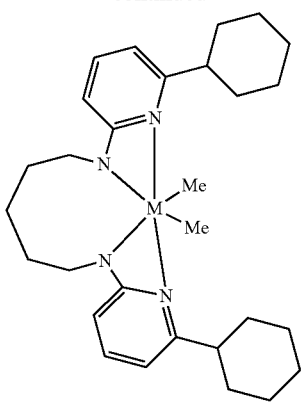
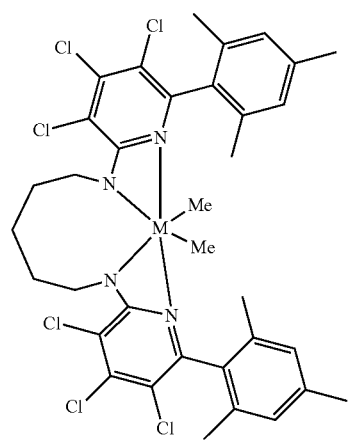
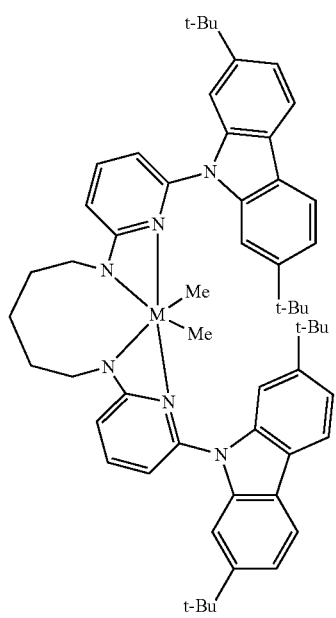
-continued
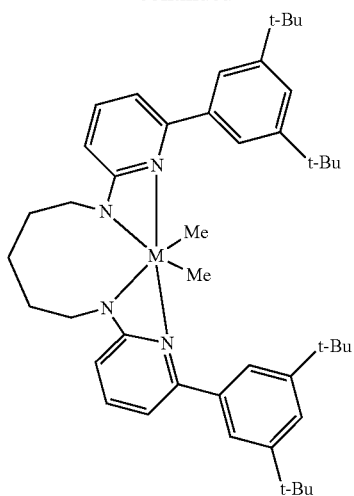
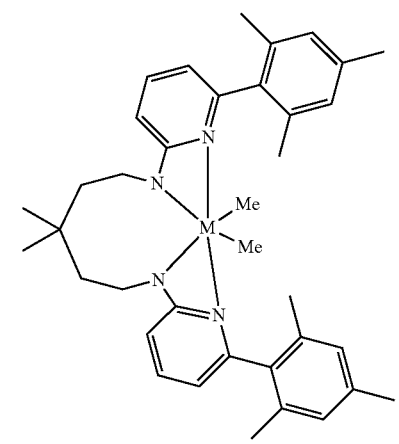
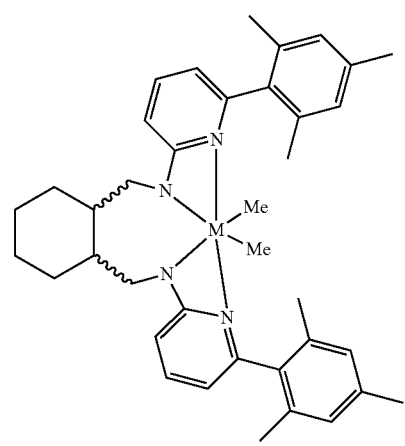

-continued
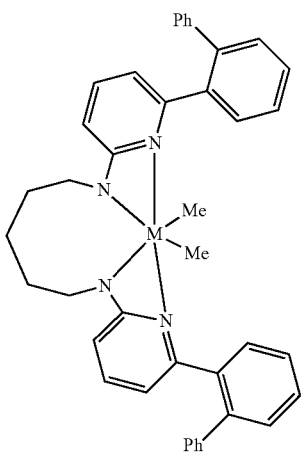
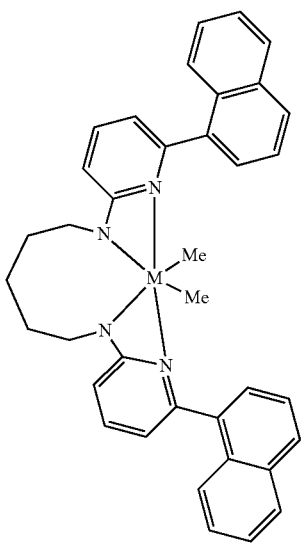
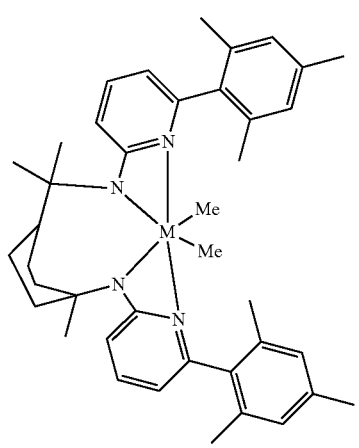
-continued
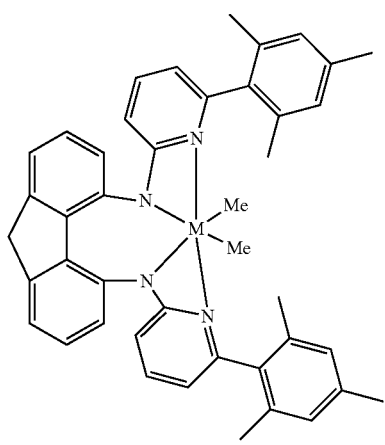
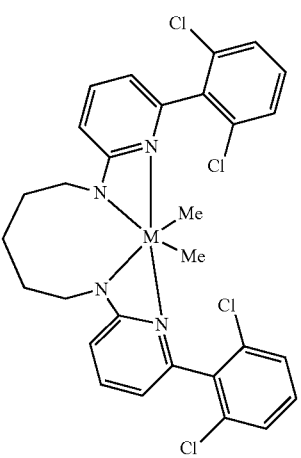
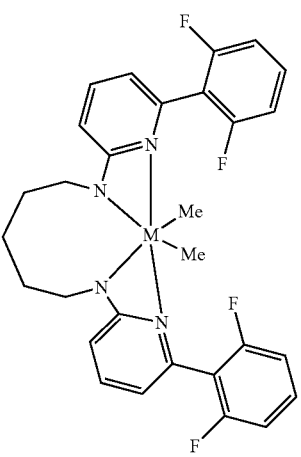

25
-continued
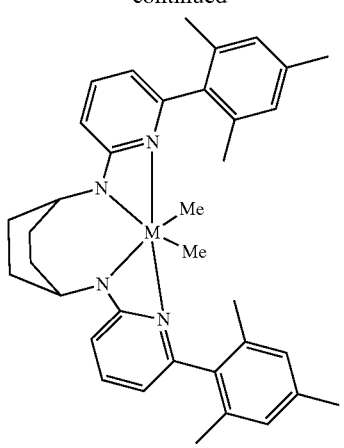
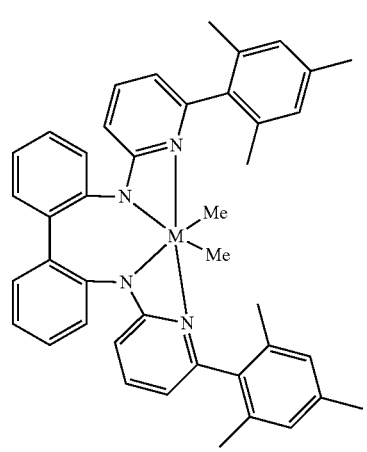
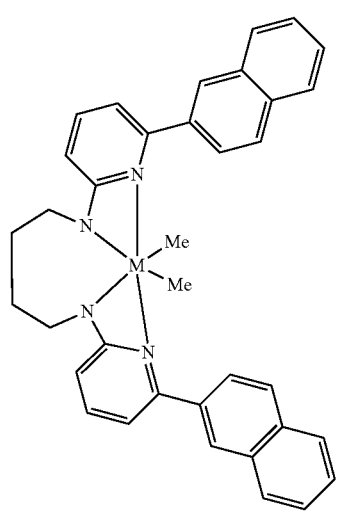
26
-continued
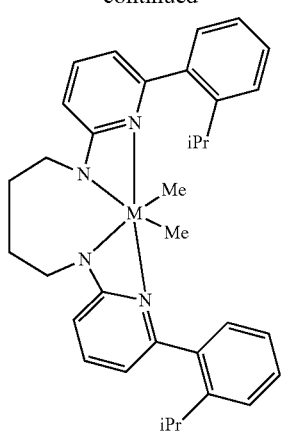
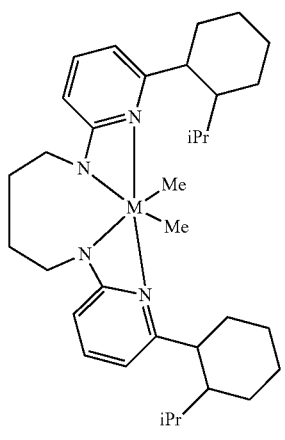
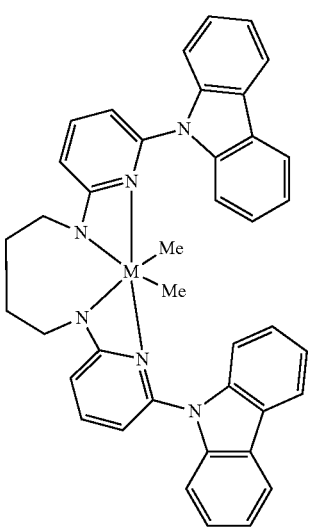

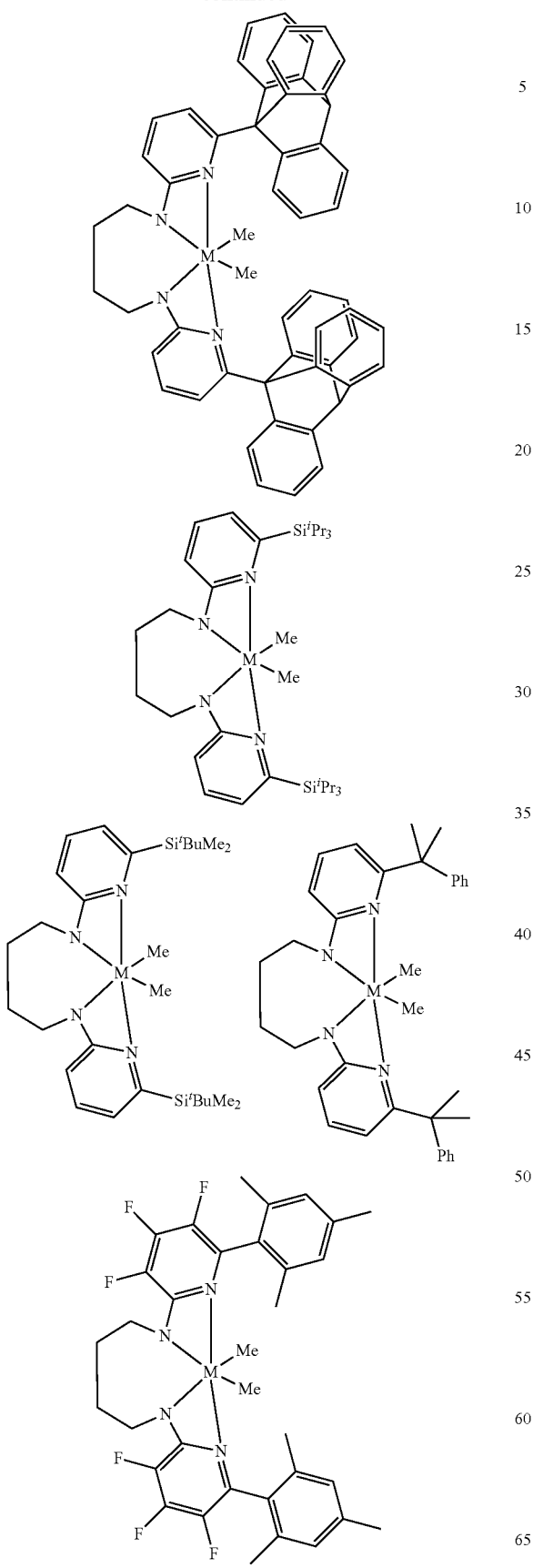
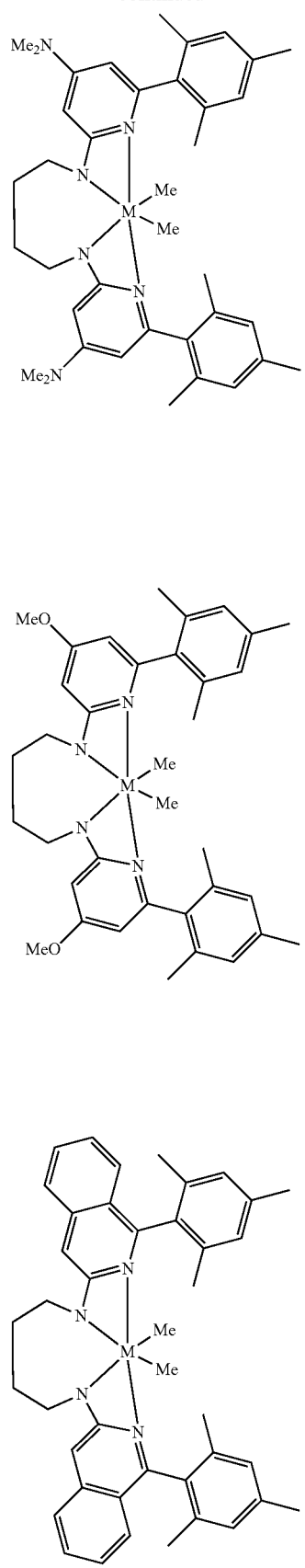

-continued
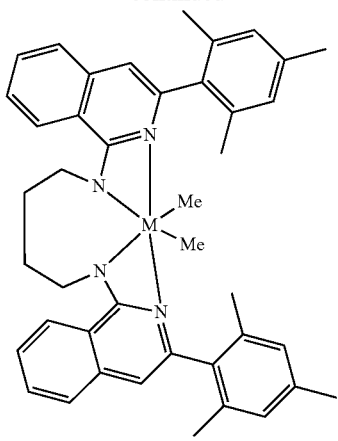
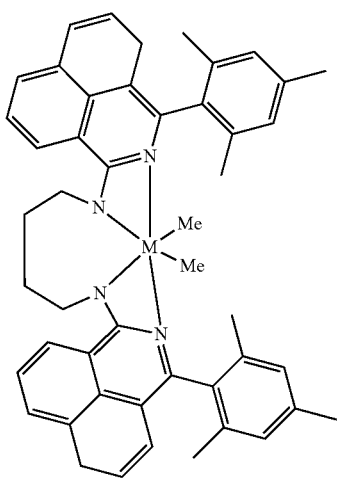
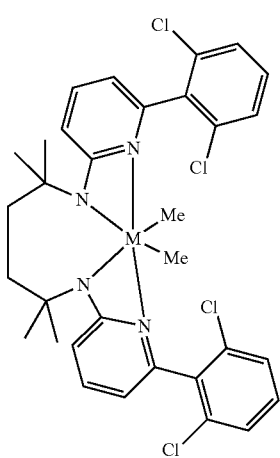
-continued
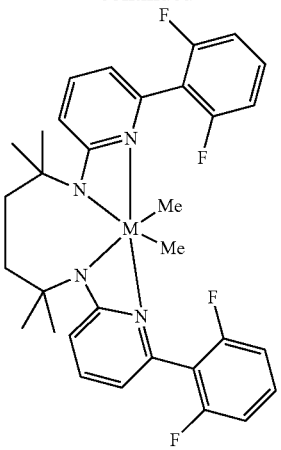
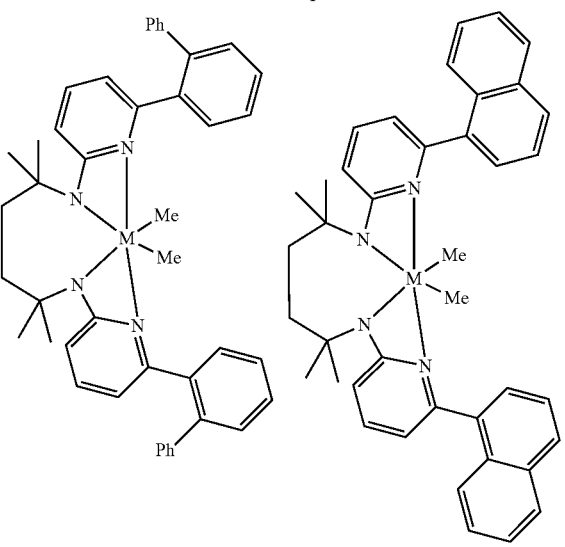
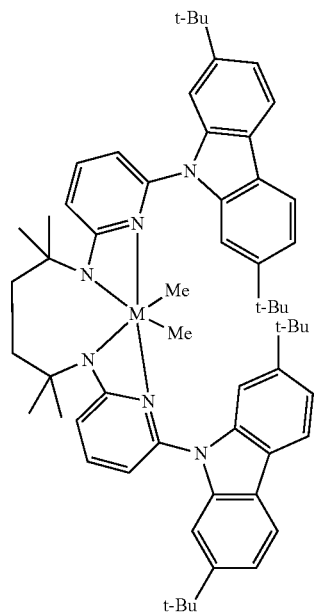

31
-continued
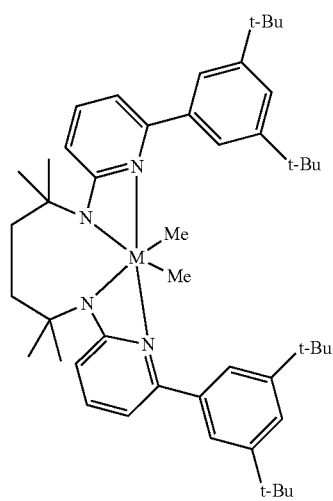
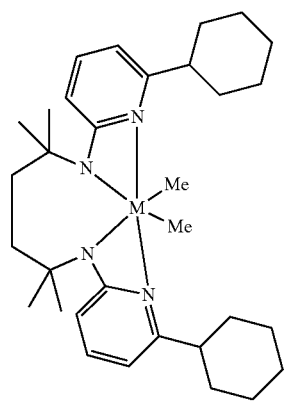
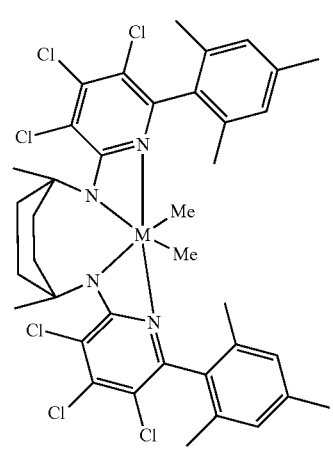
32
-continued
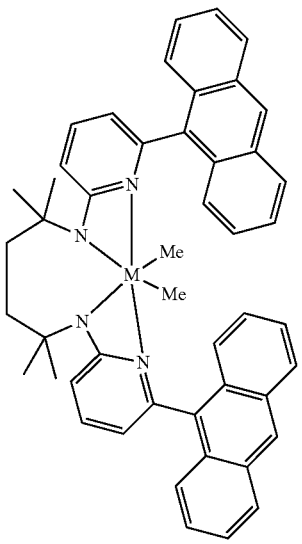
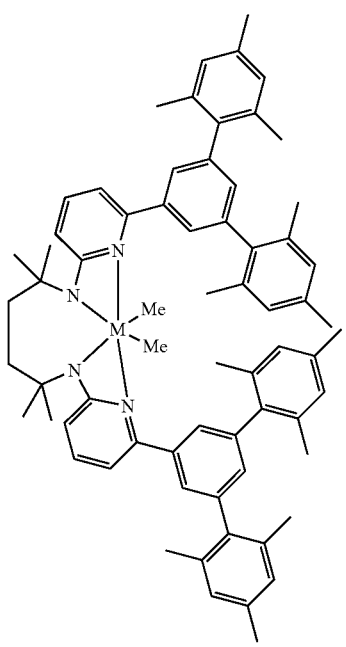
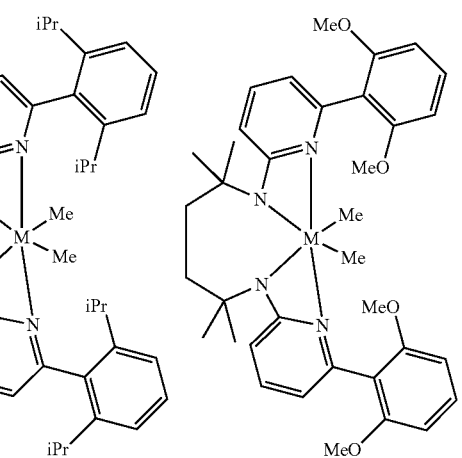

33
-continued
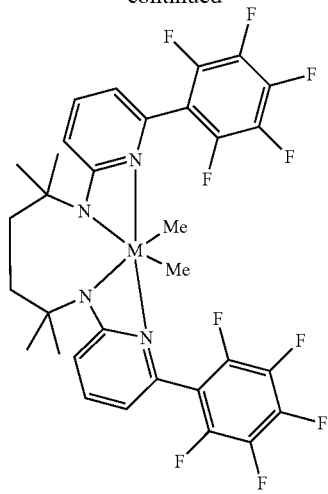
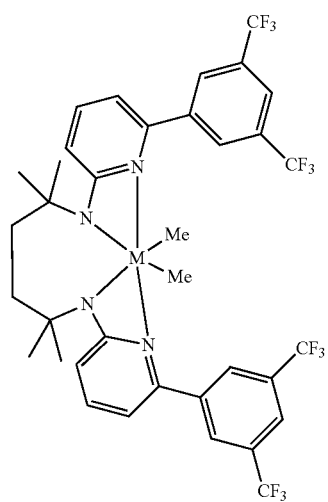
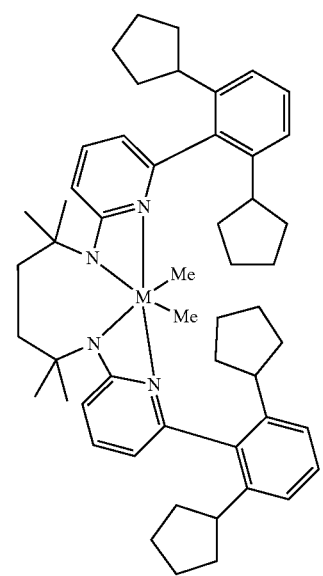
34
-continued
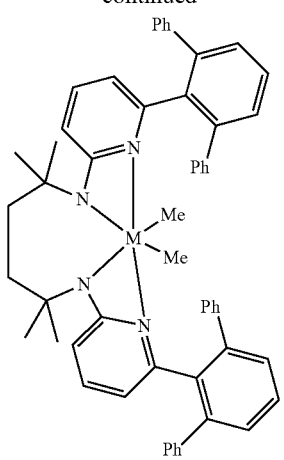
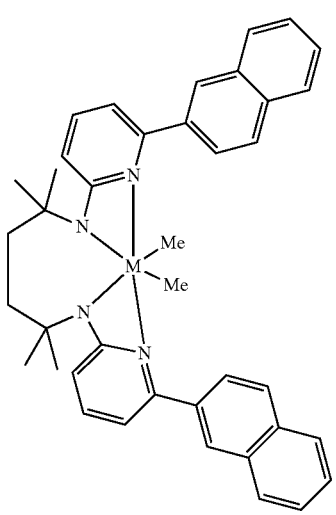
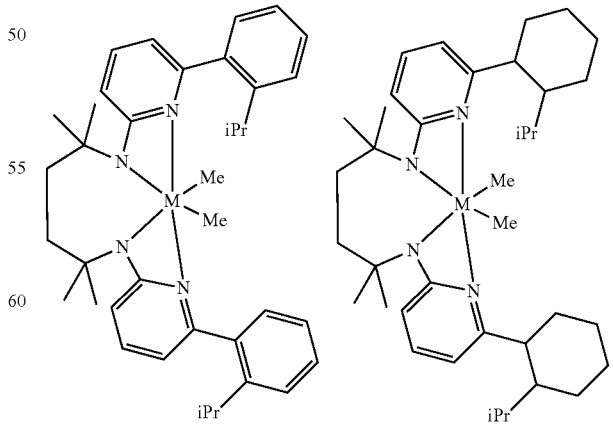

35
-continued
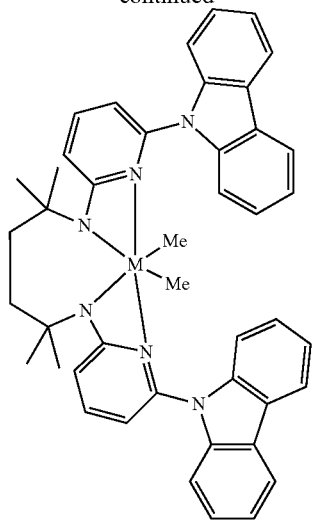
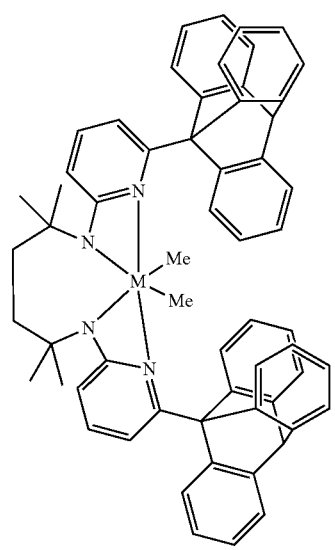
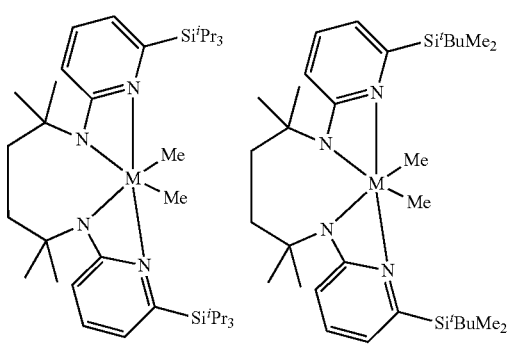
36
-continued
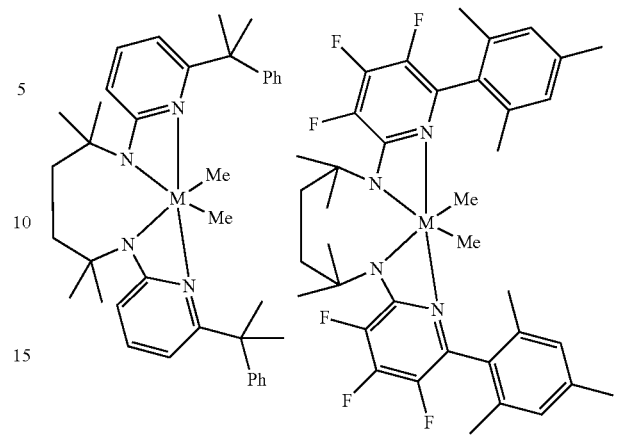
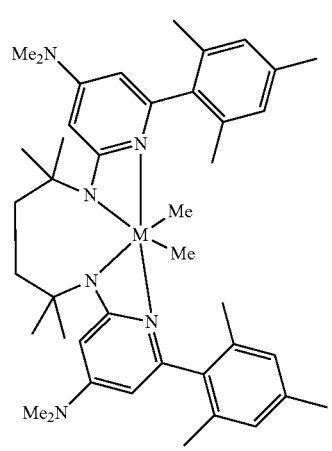
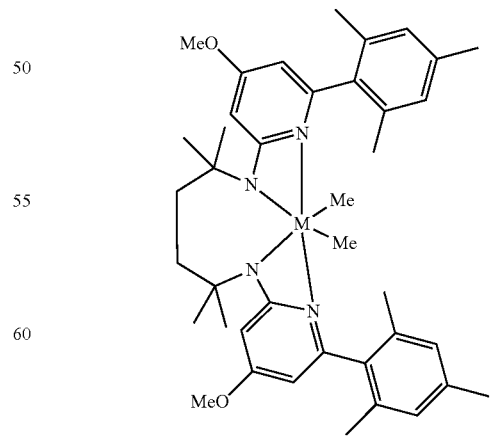

37
-continued
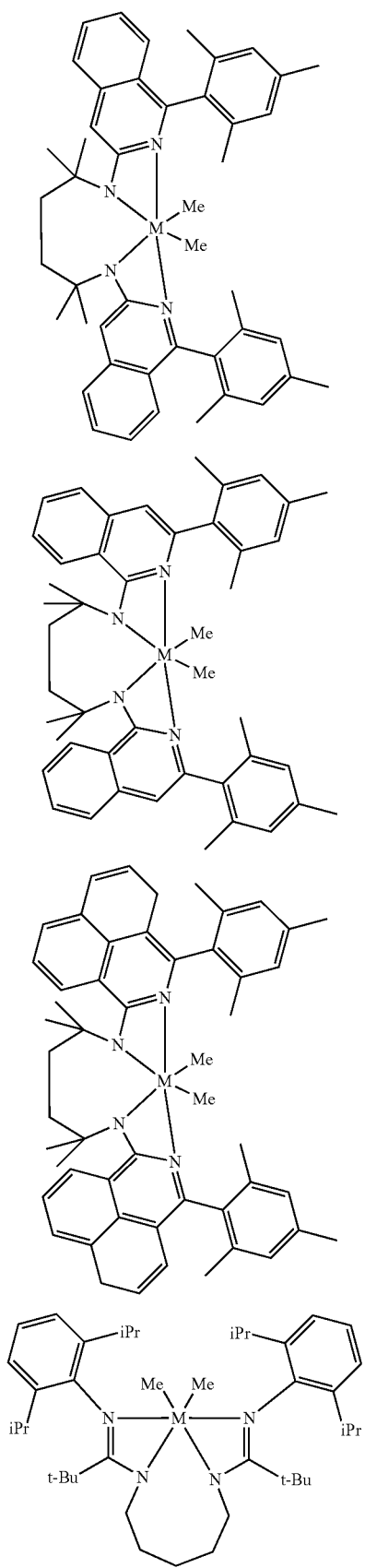
38
-continued
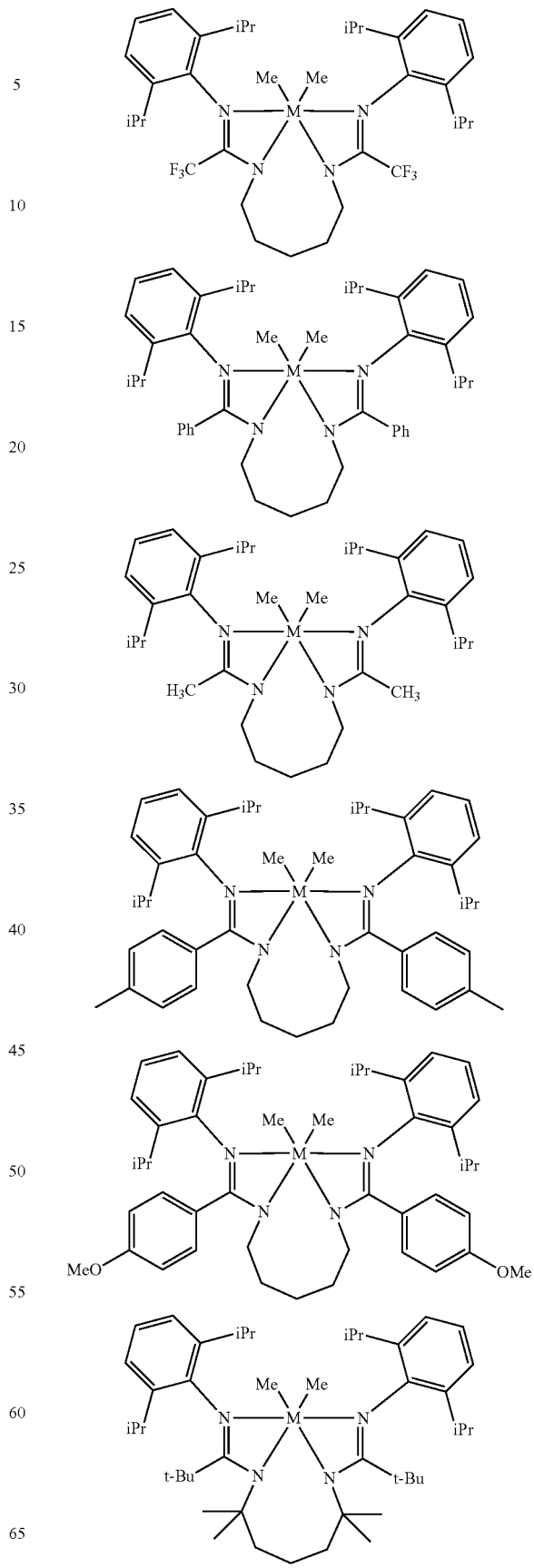

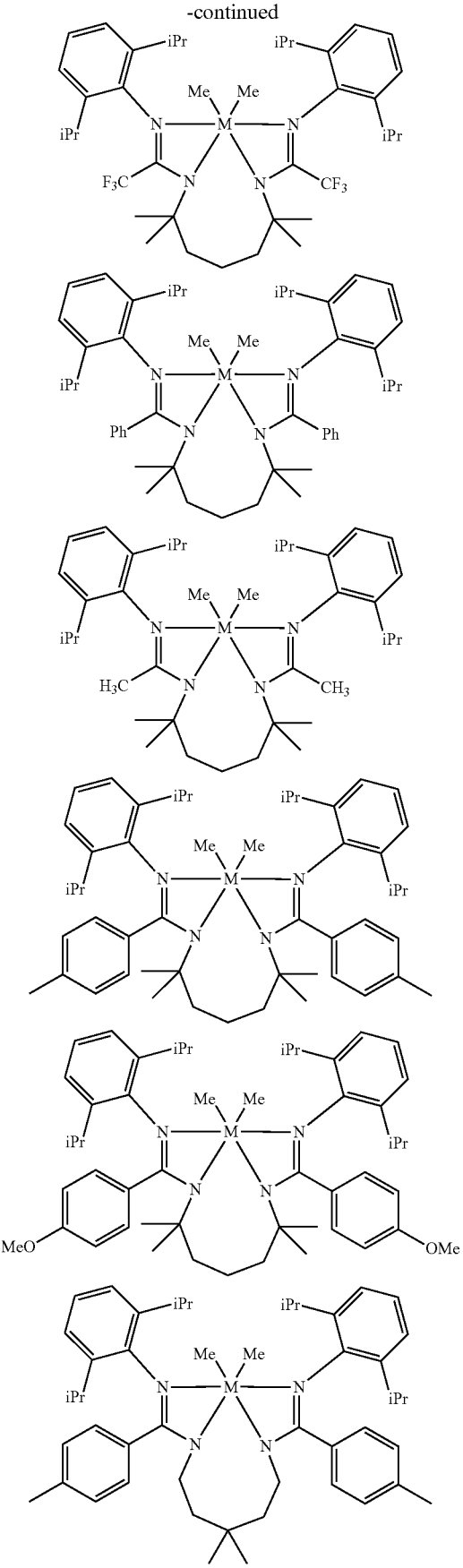
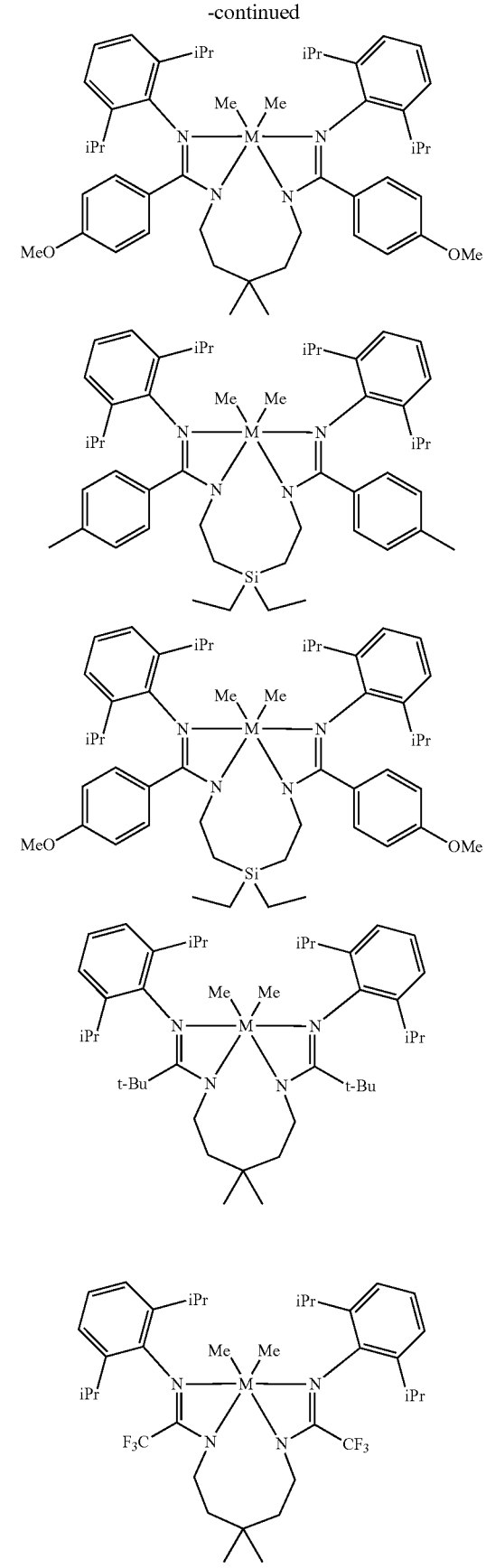

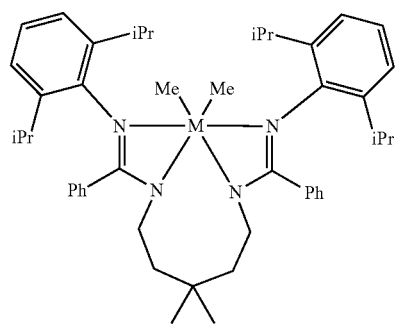
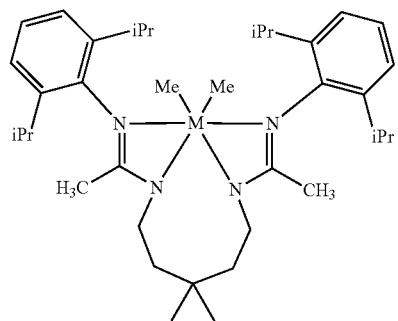
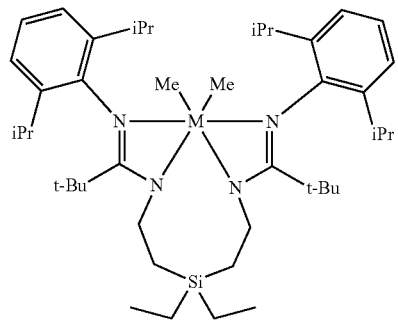
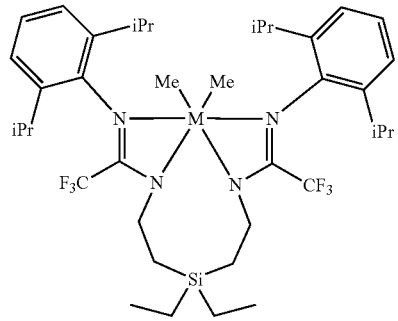
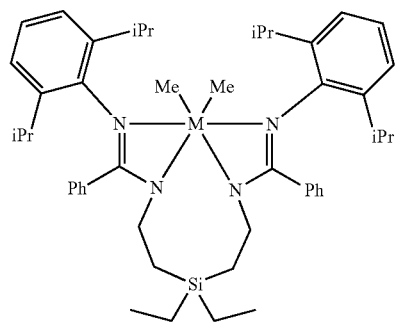
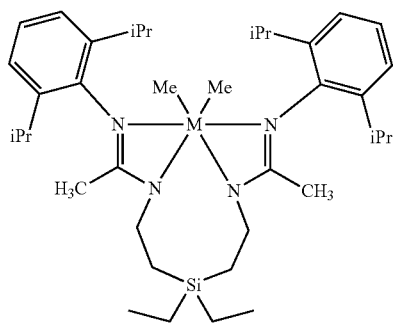
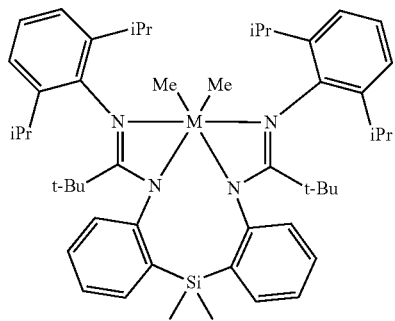
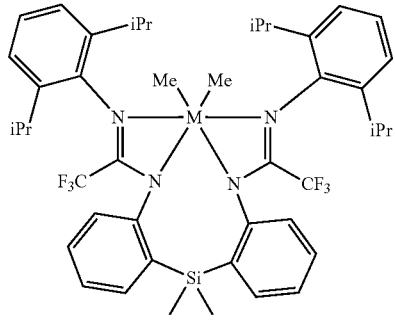
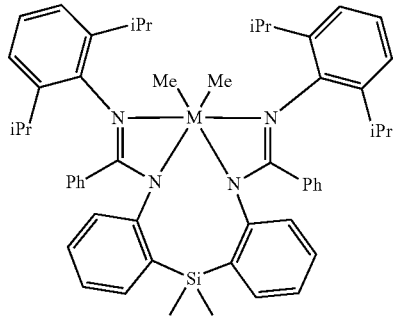
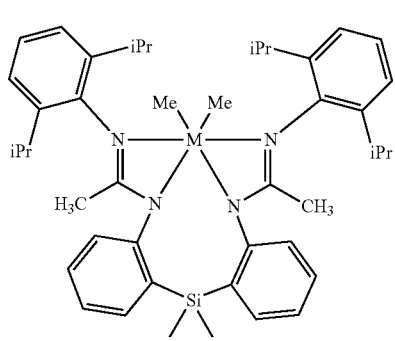

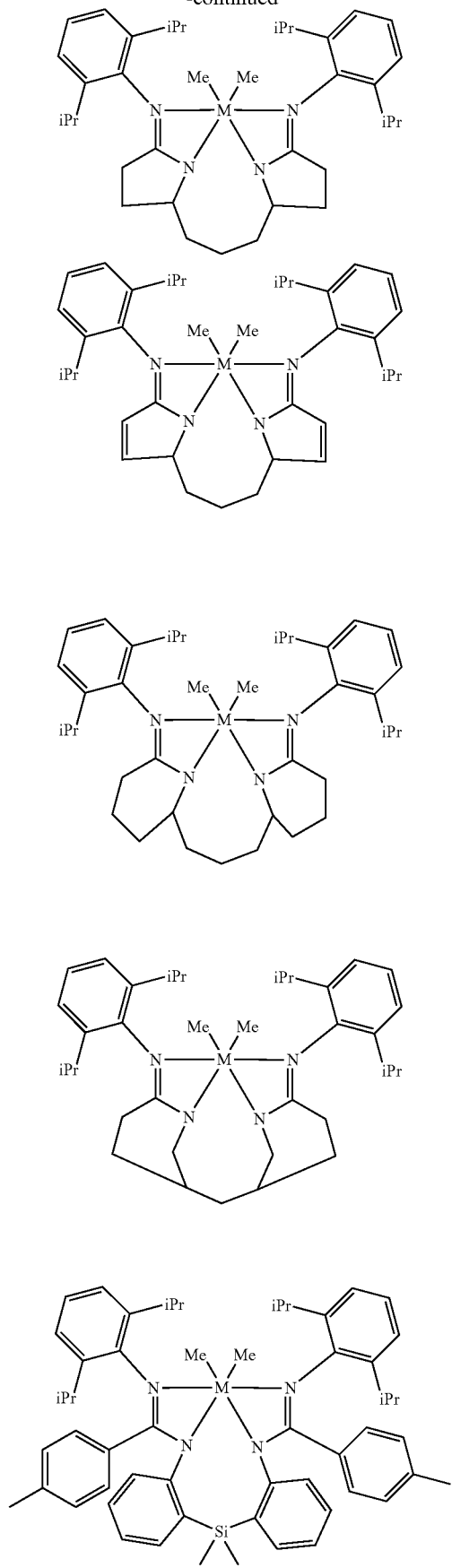
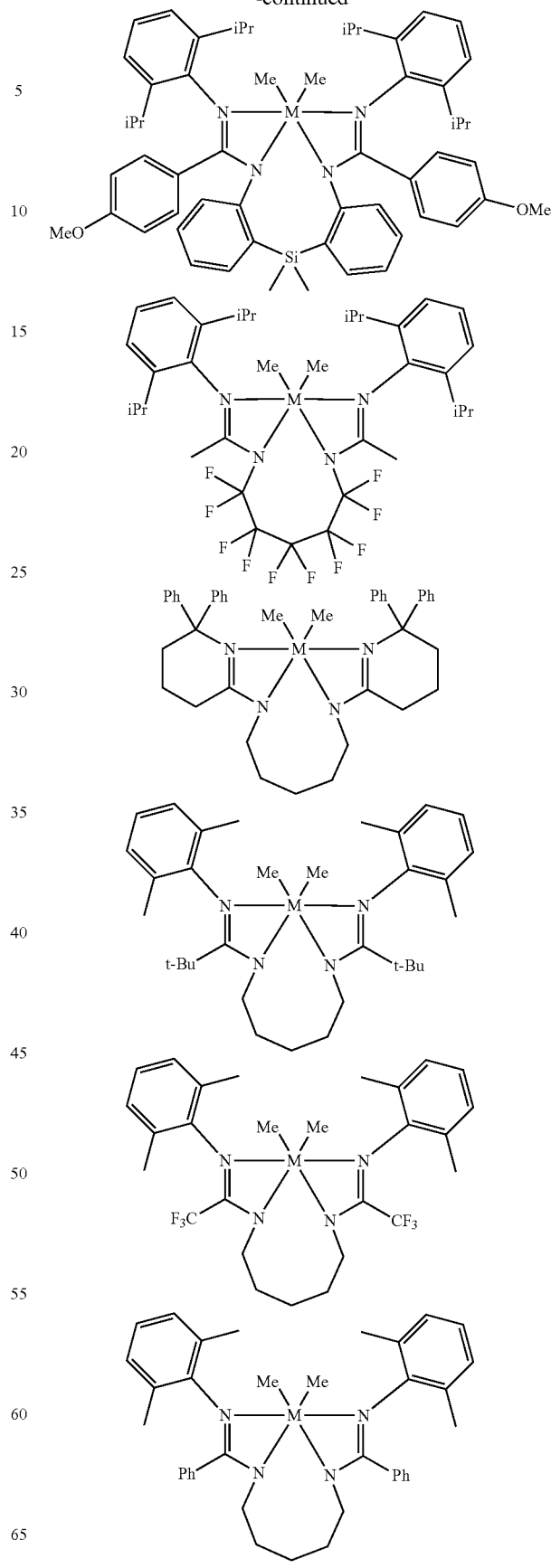

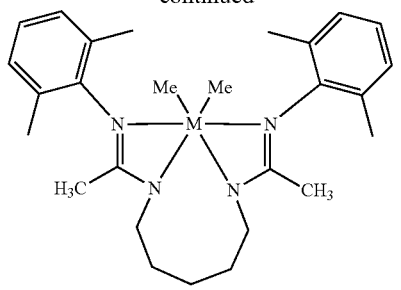
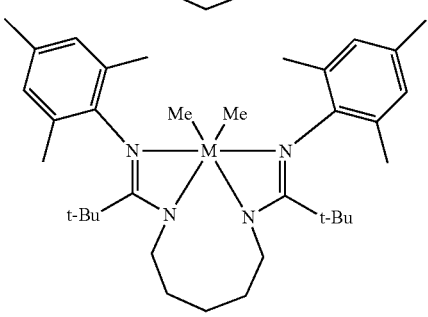
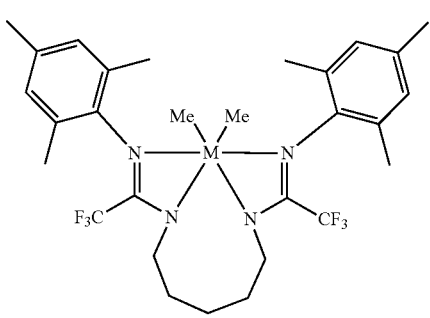
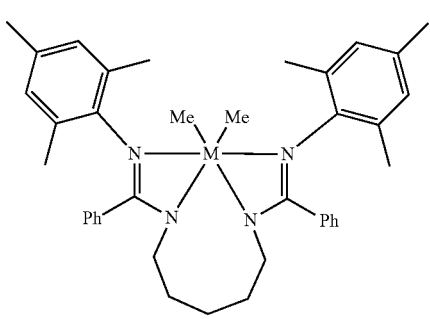
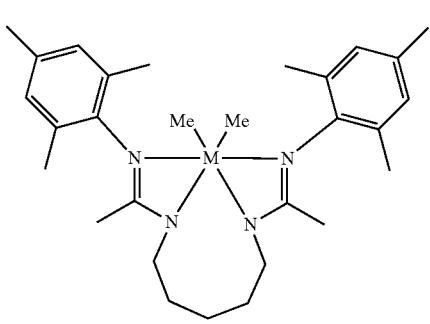
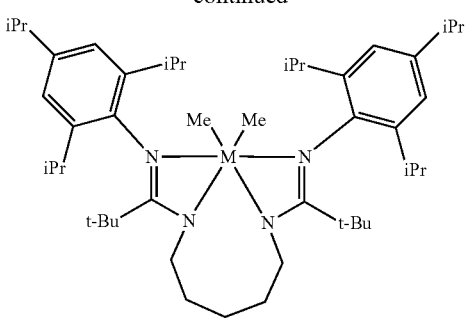
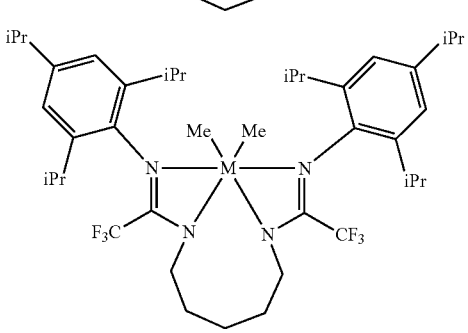
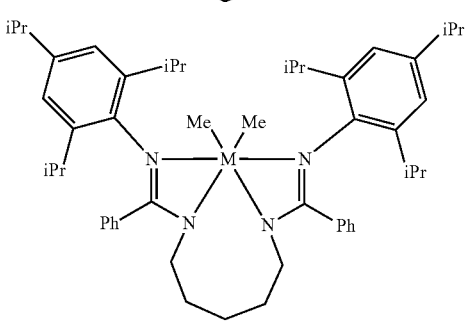
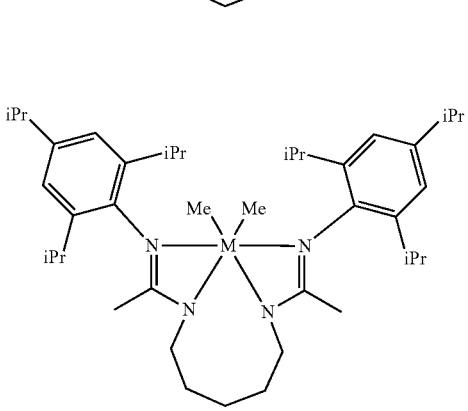
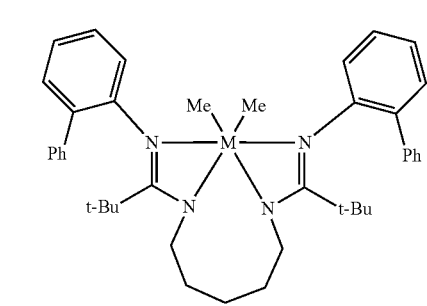

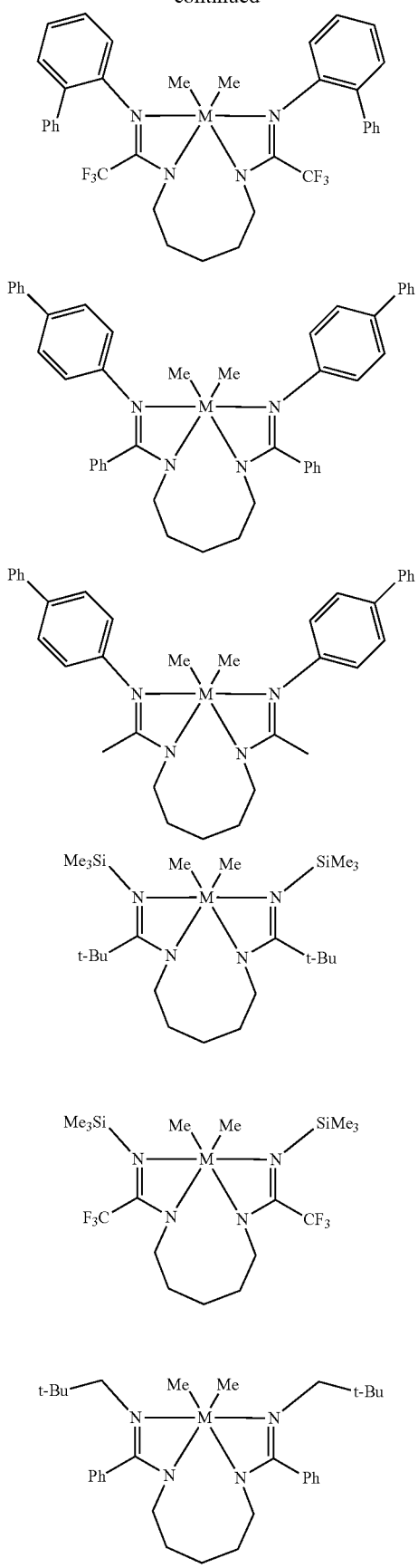

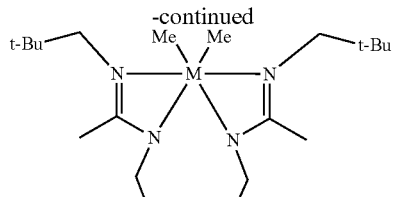

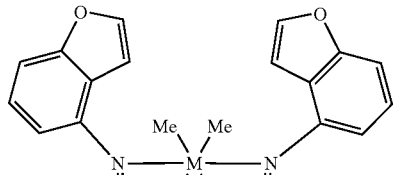

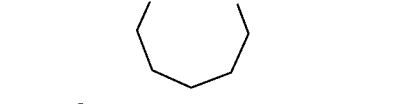

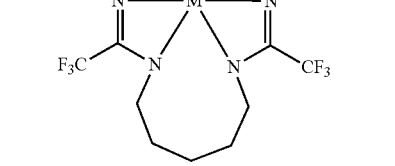

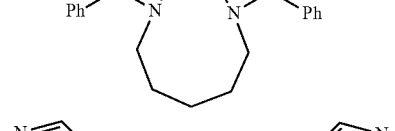

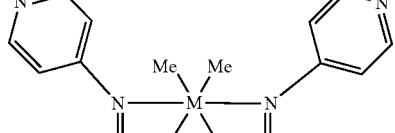

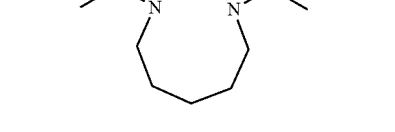

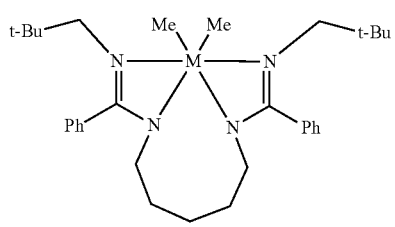

In one embodiment, the instant invention provides an olefin-based composition comprising the polymerization reaction product of one or more olefin monomers in the presence of the olefin polymerization catalyst system, as described above.

In an alternative embodiment, the instant invention further provides an olefin polymerization process comprising polymerizing one or more olefin monomers in the presence of the olefin polymerization catalyst, as described above.

Co-Catalyst Component

The procatalyst comprising the metal-ligand complex of Formula (I) is rendered catalytically active by contacting it to, or combining it with, the activating co-catalyst or by using an activating technique such as those that are known in the art. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, United States Patent Number (USPN) U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri($C_1$-$C_{10}$)alkyl)aluminum or tri(($C_6$-$C_{18}$)aryl)boron compounds and halogenated (including per-halogenated) derivatives thereof. In some other embodiments, exemplary Group 13 metal compounds are tris (fluoro-substituted phenyl)boranes, in other embodiments, tris(pentafluorophenyl)borane. In some embodiments, the activating co-catalyst is a tris(($C_1$-$C_{20}$)hydrocarbyl)methane borate (e.g., trityl tetrakis(pentafluorophenyl)borate) or a tri(($C_1$-$C_{20}$)hydrocarbyl)ammonium tetra(($C_1$-$C_{20}$)hydrocarbyl)borate (e.g., bis(octadecyl)methylammonium tetrakis (pentafluorophenyl)borate). As used herein, the term "ammonium" means a nitrogen cation that is a (($C_1$-$C_{20}$) hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl may be the same or different.

Exemplary combinations of neutral Lewis acid activating co-catalysts include mixtures comprising a combination of a tri(($C_1$-$C_4$)alkyl)aluminum and a halogenated tri(($C_6$-$C_{18}$) aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane): (alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques previously have been taught with respect to different metal-ligand complexes in the following USPNs: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst comprising the metal-ligand complex of Formula (I) may be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO); bis(hydrogenated tallow alkyl)methylammonium tetrakis(pentafluorophenyl)borate; triethyl aluminum (TEA); and any combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl) borane, or an ammonium borate with an oligomeric or polymeric alumoxane compound.

The ratio of total number of moles of one or more metal-ligand complexes of Formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of Formula (I). When tris (pentafluorophenyl)borane alone is used as the activating co-catalyst, in some other embodiments, the number of moles of the tris(pentafluorophenyl)borane that are employed to the total number of moles of one or more metal-ligand complexes of Formula (I) form 1:0.5 to 1:10, in some other embodiments, from 1:1 to 1:6, in some other embodiments, from 1:1 to 1:5. The remaining activating co-catalysts are generally employed in approximately mole quantities equal to the total mole quantities of one or more metal-ligand complexes of Formula (I).

Polyolefin Compositions

The polyolefin composition according to the present invention comprises the reaction product of one or more olefinic monomers with the olefin polymerization catalyst system according to the present invention under polymerization conditions and in the presence of one or more co-catalysts and/or scavengers.

The polyolefin composition according to the present invention can, for example, be an ethylene-based polymer, for example homopolymers and/or interpolymers (including copolymers) of ethylene and optionally one or more comonomers such as α-olefins. Such ethylene-based polymers can have a density in the range of 0.860 to 0.973 g/cm$^3$.

All individual values and subranges from 0.860 to 0.973 g/cm³ are included herein and disclosed herein; for example, the density can be from a lower limit of 0.860, 0.880, 0.885, 0.900, 0.905, 0.910, 0.915, or 0.920 g/cm³ to an upper limit of 0.973, 0.963, 0.960, 0.955, 0.950, 0.925, 0.920, 0.915, 0.910, or 0.905 g/cm³.

As used herein, the term "ethylene-based polymer" means a polymer having greater than 50 mol % units derived from ethylene monomer.

In one embodiment, the ethylene-based polymers can have a long chain branching frequency in the range of from 0.0 to 3 long chain branches (LCB) per 1000 carbon atoms. In one embodiment, the ethylene-based polymers can have a molecular weight distribution ($M_w/M_n$) (measured according to the conventional GPC method) in the range of from greater than or equal to 2.0. All individual values and subranges from greater than or equal to 2 are included herein and disclosed herein; for example, the ethylene/α-olefin copolymer may have a molecular weight distribution ($M_w/M_n$) in the range of from 2 to 20; or in the alternative, the ethylene/α-olefin interpolymer may have a molecular weight distribution ($M_w/M_n$) in the range of from 2 to 5.

In another embodiment, the ethylene-based polymers may have molecular weight distribution, $M_w/M_n$, of less than 2, e.g., when chain transfer agents are used in the polymerization. All individual values and subranges less than 2 are included and disclosed herein. For example, the $M_w/M_n$ of the ethylene-based polymers may be less than 2, or in the alternative, less than 1.9, or in the alternative, less than 1.8, or in the alternative, less than 1.5. In a particular embodiment, the ethylene-based polymer has a molecular weight distribution from 0.5 to 2.

In one embodiment, the ethylene-based polymers can have a molecular weight ($M_w$) in the range of from equal to or greater than 20,000 g/mole, for example, in the range of from 20,000 to 1,000,000 g/mole, or in the alternative, from 20,000 to 350,000 g/mole, or in the alternative, from 100,000 to 750,000 g/mole.

In one embodiment, the ethylene-based polymers can have a melt index ($I_2$) in the range of 0.02 to 200 g/10 minutes. All individual values and subranges from 0.02 to 200 g/10 minutes are included herein and disclosed herein; for example, the melt index ($I_2$) can be from a lower limit of 0.1, 0.2, 0.5, 0.6, 0.8, 1, 1.5, 2.0, 2.5, 3.0, 3.5, 4.0, 4.5, 5.0, 10, 15, 20, 30, 40, 50, 60, 80, 90, 100, or 150 g/10 minutes, to an upper limit of 0.9, 1, 1.5, 2.0, 2.5, 3.0, 3.5, 4.0, 4.5, 5.0, 10, 15, 20, 30, 40, 50, 60, 80, 90, 100, 150, or 200 g/10 minutes.

In one embodiment, the ethylene-based polymers can have a melt flow ratio ($I_{10}/I_2$) in the range of from 5 to 30. All individual values and subranges from 5 to 30 are included herein and disclosed herein; for example, the melt flow ratio ($I_{10}/I_2$) can be from a lower limit of 5, 5.5, 6, 6.5, 8, 10, 12, 15, 20, or 25 to an upper limit of 5.5, 6, 6.5, 8, 10, 12, 15, 20, 25, or 30.

The ethylene-based polymers may comprise less than 50 mole percent of units derived from one or more α-olefin comonomers. All individual values and subranges from less than 50 mole percent are included herein and disclosed herein; for example, the ethylene-based polymers may comprise from less than 30 mole percent of units derived from one or more α-olefin comonomers; or in the alternative, less than 20 mole percent of units derived from one or more α-olefin comonomers; or in the alternative, from 1 to 20 mole percent of units derived from one or more α-olefin comonomers; or in the alternative, from 1 to 10 mole percent of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene-based polymers may comprise greater than 50 mole percent of units derived from ethylene. All individual values and subranges from greater than 50 mole percent are included herein and disclosed herein; for example, the ethylene-based polymers may comprise at least 52 mole percent of units derived from ethylene; or in the alternative, at least 65 percent by weight of units derived from ethylene; or in the alternative, at least 85 mole percent of units derived from ethylene; or in the alternative, from 50 to 100 mole percent of units derived from ethylene; or in the alternative, from 80 to 100 mole percent of units derived from ethylene.

In one embodiment, the ethylene-based polymer comprises an olefin block copolymer prepared according to an aforementioned chain-shuttling polymerization process. The olefin block copolymer or poly(ethylene alpha-olefin) block copolymer comprises an ethylene-derived hard segment (i.e., polyethylene hard segment) and a soft segment comprising residuals from the alpha-olefin and ethylene. The residuals of the alpha-olefin and ethylene typically are approximately randomly distributed in the soft segment. Preferably, the polyethylene hard segment is characterizable as having less than 5 mole percent (mol %) of a residual of the alpha-olefin covalently incorporated therein. Preferably, the poly(ethylene alpha-olefin) block copolymer is characterizable as having a melting temperature of greater than 100 degrees Celsius, and more preferably greater than 120° C., as determined by Differential Scanning calorimetry using the procedure described later. The poly(ethylene alpha-olefin) block copolymers comprise ethylene residuals and one or more copolymerizable α-olefin comonomer residuals (i.e., ethylene and one or more copolymerizable α-olefin comonomers in polymerized form). The poly(ethylene alpha-olefin) block copolymers are characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula: (AB)n, where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion.

"Hard" segments refer to blocks of polymerized units in which ethylene residuals are present in an amount greater than 95 weight percent, and preferably greater than 98 weight percent in the poly(ethylene alpha-olefin) block copolymers. In other words, the comonomer (i.e., alpha-olefin) residuals content in the hard segments is less than 5 weight percent, and preferably less than 2 weight percent. In some embodiments, the hard segments comprise all or substantially all ethylene residuals. The phrases "polyethylene hard segment" and "ethylene-derived hard segment" are synonymous and mean the hard segment portion of a poly (ethylene alpha-olefin) block copolymer.

"Soft" segments refer to blocks of polymerized units in which the comonomer i.e., alpha-olefin) residuals content is greater than 5 weight percent, preferably greater than 8 weight percent, greater than 10 weight percent, or greater than 15 weight percent in the poly(ethylene alpha-olefin) block copolymers. In some embodiments, the comonomer residuals content in the soft segments can be greater than 20 weight percent, greater than 25 eight percent, greater than 30 weight percent, greater than 35 weight percent, greater than 40 weight percent, greater than 45 weight percent, greater than 50 weight percent, or greater than 60 weight percent.

Polymerization Process

Any conventional polymerization processes may be employed to produce the polyolefin composition according to the present invention. Such conventional polymerization processes include, but are not limited to, solution polymerization process, particle forming polymerization process, and combinations thereof using one or more conventional reactors e.g. loop reactors, isothermal reactors, fluidized bed reactors, stirred tank reactors, batch reactors in parallel, series, and/or any combinations thereof.

In one embodiment, the polyolefin composition according to the present invention may, for example, be produced via solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 120 to 300° C.; for example, from 160 to 215° C., and at pressures in the range of from 300 to 1500 psi; for example, from 400 to 750 psi. The residence time in solution phase polymerization process is typically in the range of from 2 to 30 minutes; for example, from 5 to 15 minutes. Ethylene, one or more solvents, one or more high temperature olefin polymerization catalyst systems, one or more co-catalysts and/or scavengers, and optionally one or more comonomers are fed continuously to the one or more reactors. Exemplary solvents include, but are not limited to, isoparaffins. For example, such solvents are commercially available under the name ISOPAR E from ExxonMobil Chemical Co., Houston, Tex. The resultant mixture of the ethylene-based polymer and solvent is then removed from the reactor and the ethylene-based polymer is isolated. Solvent is typically recovered via a solvent recovery unit, i.e. heat exchangers and vapor liquid separator drum, and is then recycled back into the polymerization system.

In one embodiment, the ethylene-based polymer may be produced via solution polymerization in a single reactor system, for example a single loop reactor system, wherein ethylene and optionally one or more α-olefins are polymerized in the presence of one or more high temperature olefin polymerization catalyst systems, optionally one or more other catalysts, and optionally one or more co-catalysts. In one embodiment, the ethylene-based polymer may be produced via solution polymerization in a dual reactor system, for example a dual loop reactor system, wherein ethylene and optionally one or more α-olefins are polymerized in the presence of one or more an olefin polymerization catalyst systems, optionally one or more other catalysts, and optionally one or more co-catalysts. In one embodiment, the ethylene-based polymer may be produced via solution polymerization in a dual reactor system, for example a dual loop reactor system, wherein ethylene and optionally one or more α-olefins are polymerized in the presence of one or more high temperature olefin polymerization catalyst systems, as described herein, in both reactors.

In one embodiment, the ethylene-based polymer may be made using a gas phase polymerization process, e.g., utilizing a fluidized bed reactor. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

A polymerization process may be effected as a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may optionally be removed in a cyclone and/or fine filter. The gas is passed through a heat exchanger wherein the heat of polymerization is removed, compressed in a compressor and then returned to the reaction zone.

The reactor temperature of the fluid bed process herein preferably ranges from 30° C. or 40° C. or 50° C. to 90 or 100° C. or 110° C., or 120° C. In general, the reactor temperature is operated at the highest temperature that is feasible taking into account the sintering temperature of the polymer product within the reactor. In this fluid bed process, the polymerization temperature, or reaction temperature should be below the melting or "sintering" temperature of the polymer to be formed. Thus, the upper temperature limit in one embodiment is the melting temperature of the polyolefin produced in the reactor.

A slurry polymerization process can also be used. A slurry polymerization process generally uses pressures in the range of from 1 to 50 atmospheres and even greater and temperatures in the range of 0 to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

Also useful is particle form polymerization, a process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and Metallocene-Based Polyolefins Vol. 2 pp. 322-332 (2000), the disclosure of which are incorporated herein to the extent permitted.

In one embodiment, the procatalyst comprising the metal-ligand complex of Formula (I) may be combined with one or more additional catalysts in a polymerization process. Suitable catalysts for use include any compound or combination of compounds that is adapted for preparing polymers of the desired composition or type. Both heterogeneous and homogeneous catalysts may be employed. Examples of heterogeneous catalysts include the well known Ziegler-Natta compositions, especially Group 4 metal halides supported on Group 2 metal halides or mixed halides and alkoxides and the well known chromium or vanadium based catalysts. Preferably however, for ease of use and for production of narrow molecular weight polymer segments in solution, the catalysts for use herein are homogeneous catalysts comprising a relatively pure organometallic compound or metal complex, especially compounds or complexes based oil metals selected from Groups 3-10 or the Lanthanide series of the Periodic Table of the Elements. It is preferred that any catalyst employed herein, not significantly detrimentally affect the performance of the other catalyst under the conditions of the present polymerization. Desirably, no catalyst is reduced in activity by greater than 25 percent, more preferably greater than 10 percent under the conditions of the present polymerization.

In one embodiment, the procatalyst comprising the metal-ligand complex of Formula (I) may be combined with one or more additional catalysts and a chain shuttling agent in a chain-shuttling polymerization process to prepare the aforementioned olefin block copolymer. Suitable catalysts for use include any compound or combination of compounds that is adapted for preparing polymers of the desired composition or type and are capable of chain shuttling. Nonlimiting examples of such catalysts include:

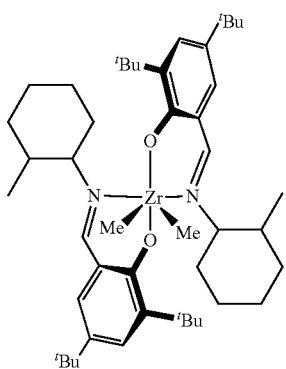

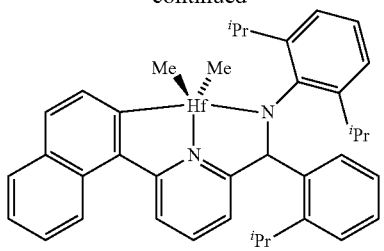

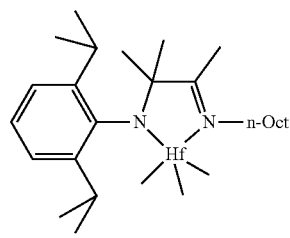

Nonlimiting examples of chain shuttling agents include dialkylzinc reagents and trialkylaluminum reagents.

procatalyst comprising the metal-ligand complex of Formula (I) may be activated to form an active catalyst composition by combination with one or more co-catalysts, as described above.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The inventive ethylene-based polymers may contain any amounts of additives. The ethylene-based polymers may compromise from about 0 to about 10 percent by the combined weight of such additives, based on the weight of the ethylene-based polymers and the one or more additives. The ethylene-based polymers may further compromise fillers, which may include, but are not limited to, organic or inorganic fillers. Such fillers, e.g. calcium carbonate, talc, $Mg(OH)_2$, can be present in levels from about 0 to about 20 percent, based on the weight of the inventive ethylene-based polymers and the one or more additives and/or fillers. The ethylene-based polymers may further be blended with one or more polymers to form a blend.

Examples

The following examples illustrate the present invention but are not intended to limit the scope of the invention. The examples of the instant invention demonstrate that the olefin polymerization catalyst systems according to the present invention possess improved properties facilitating the production of high molecular weight ($M_w$) polyolefins with narrow polydispersities and especially low octene incorporation.

Pro-Catalyst Components

Comparative Pro-catalysts, C1 and C2, have the structures shown below:

Comparative Procatalysts
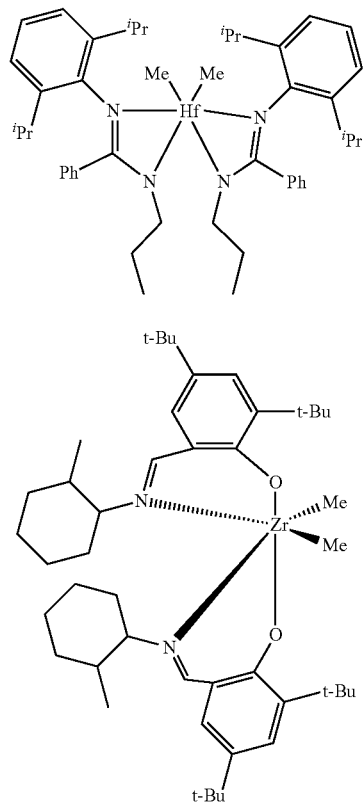
C1
C2
Inventive Procatalysts 1-13 are shown in the structures below:
Inventive Procatalysts
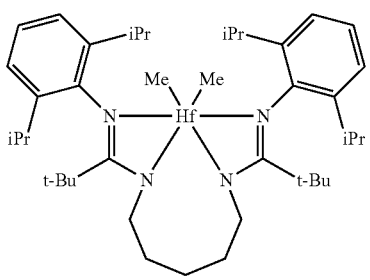
1
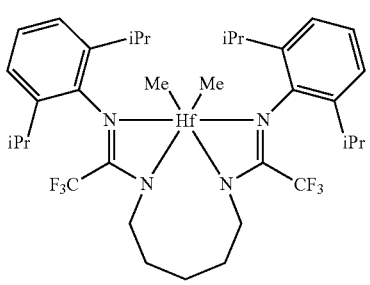
2
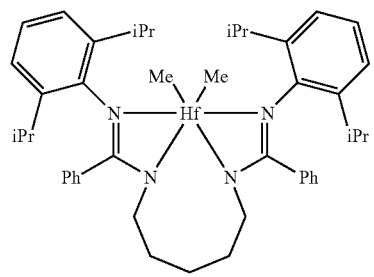
3
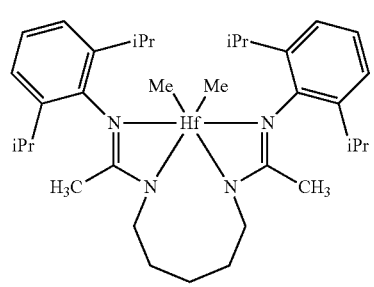
4
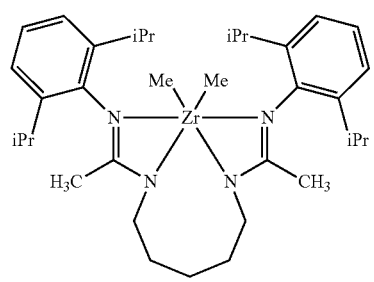
5
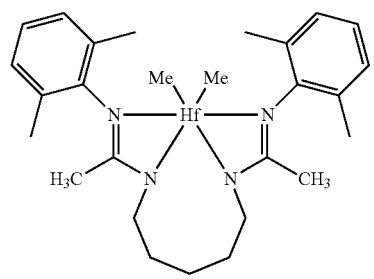
6
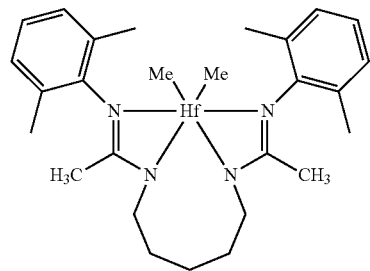
7

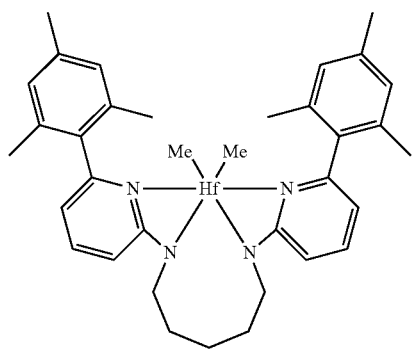

8

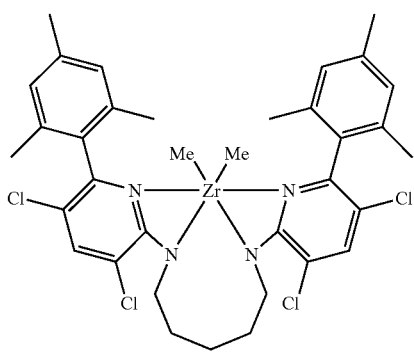

9

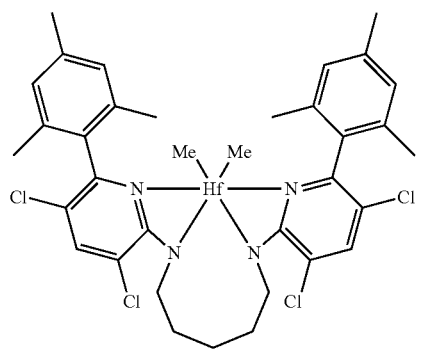

10

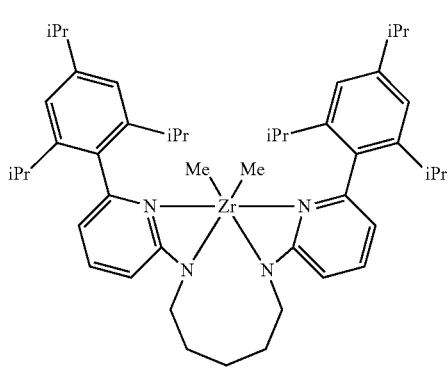

11

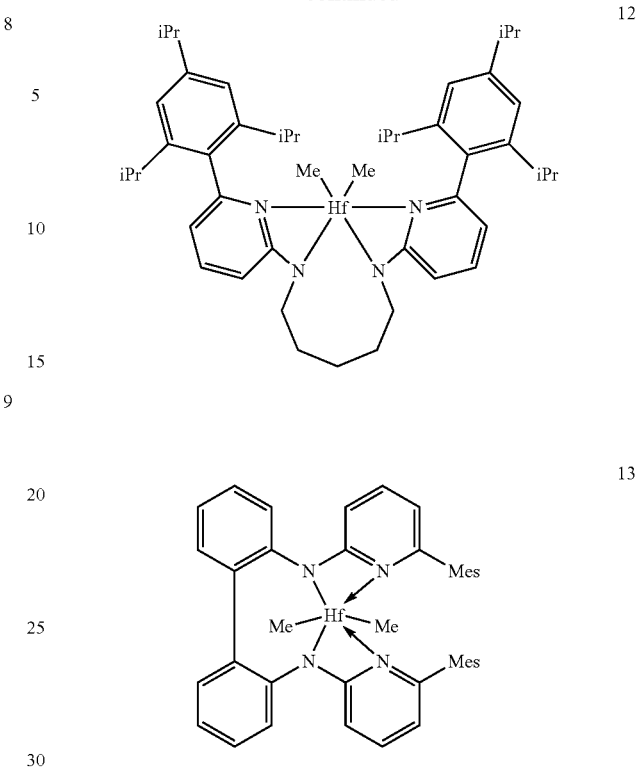

12

13

General Synthesis of Amides

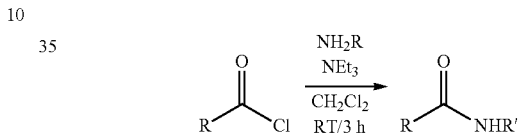

In a 500 mL round bottom flask is added $CH_2Cl_2$ (200 mL), $NEt_3$ (1.1 equiv., 16.5 mmol), and the desired aniline/amine (1.1 equiv., 16.5 mmol). To the solution is added the acyl-chloride (1 equiv., 15 mmol) from a syringe dropwise. The solution warms upon addition of the acyl chloride and the reaction was stirred for 2 h. After stirring, the solution is washed with brine, and dried over $MgSO_4$. Solids are filtered off with a disposable frit and all volatiles are removed. The crude product is used without further purification.

General Synthesis of Imidoyl Chlorides

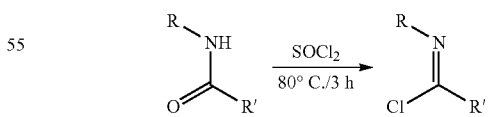

In a 100 mL round bottom flask is added the amide (1 equiv., 14 mmol) and thionyl chloride (4 equiv., 56 mmol). The heterogeneous mixture is heated to 80° C. for 3 h under a nitrogen purge. Volatiles are purged through an aqueous NaOH scrubber during the reaction. After the reaction, all volatiles are removed via a high vacuum Schlenk line. The products are distilled if possible or otherwise used without further purification.

General Synthesis of Amidines

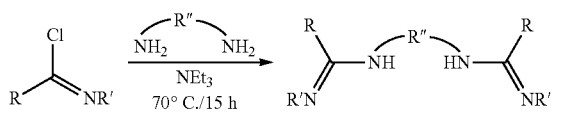

A 100 mL round bottom flask is charged with the diamine (1 equiv., 4 mmol) or the monoamine (2 equiv., 8 mmol), NEt$_3$ (2.1 equiv., 8.4 mmol), and toluene (40 mL). To the stirring solution is added the imidoyl chloride (2 equiv., 8 mmol) dropwise. The solution is heated to 70° C. overnight and a white precipitate forms. All volatiles are removed and CH$_2$Cl$_2$ is added and washed with water in a separatory funnel. The organic layer is dried over MgSO$_4$, filtered, then and all volatiles are removed again. Column chromatography is performed on the crude product eluting with 90:10 Hexanes:EtOAc to give the purified product.

General Synthesis of Amidinate Complexes

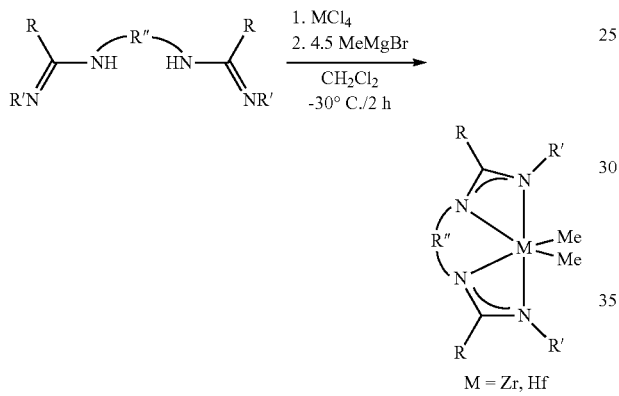

All manipulations are performed inside a glove box. A 20 mL vial is charged with HfCl$_4$ or ZrCl$_4$ (1 equiv., 0.38 mmol) and CH$_2$Cl$_2$ (10 mL). The suspension is cooled to −30° C., then MeMgBr (4.5 equiv., 1.69 mmol) is added dropwise to the solution and allowed to stir for 1 min. A cold (−30° C.) CH$_2$Cl$_2$ (4 mL) solution of the amidine ligand (1 equiv., 0.38 mmol) is then added and allowed to stir for 2 h. After 2 h, the dark suspension is filtered through a disposable fritted filter and all volatiles are removed. Hexanes (10 mL) are added, and the resulting solution is evacuated to dryness again. The solid is taken up in a minimal amount of CH$_2$Cl$_2$ and filtered again through a disposable fritted filter. All volatiles are removed to provide the crude product which is used without further purification.

General Procedure for Metallation of [4,2] Pyridine-Amidine Ligands.

Inside a glove box a vial is charged with HfCl$_4$ or ZrCl$_4$ (0.23 mmol) and toluene (5 mL). The solution is cooled to −30° C. then MeMgBr (0.35 mL, 1.04 mmol) is added. The solution is allowed to stir for 2 min then a cold toluene (5 mL) suspension of the ligand (0.23 mmol) is added. The solution quickly changes to a yellow color and is allowed to stir at room temperature for 2 h. All volatiles are removed and the residue is triturated with hexanes. The residue is taken up in hexanes and filtered through a disposable frit. The yellow solution is evacuated to dryness, then dissolved in ether. The yellow solution is concentrated and cooled to −30° C. to give yellow crystals of the product.

Synthesis of Comparative Procatalyst C1

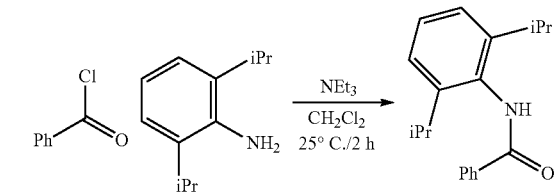

N-(2,6-diisopropylphenyl)benzamide is synthesized using the General Synthesis of Amides procedure. The product is used without further purification and taken on to the next step (13.1 g, 88% yield).

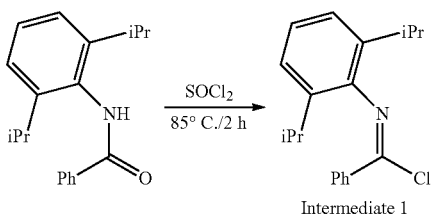

N-(2,6-diisopropylphenyl)benzimidoyl chloride (Intermediate 1) is synthesized using the General Synthesis of Imidoyl Chlorides procedure (8.20 g, 96% yield). $^1$H NMR (400 MHz, CDCl$_3$) δ 8.31-8.18 (m, 2H), 7.63-7.56 (m, 1H), 7.56-7.50 (m, 2H), 7.22 (d, J=2.8 Hz, 3H), 2.85 (p, J=6.8 Hz, 2H), 1.22 (dd, J=24.1, 6.8 Hz, 12H). $^{13}$C NMR (101 MHz, CDCl$_3$) δ 143.87, 143.50, 136.72, 135.07, 132.08, 129.43, 128.57, 124.90, 123.10, 28.71, 23.35, 22.91.

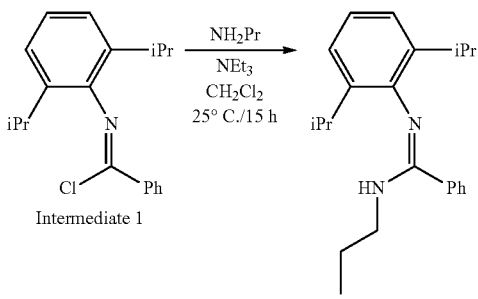 [SMILES: CC(C)c1cccc(C(C)C)c1/N=C(\Cl)c1ccccc1 ; CCCN/C(=N\c1c(C(C)C)cccc1C(C)C)c1ccccc1 ; "NH2Pr"]

N'-(2,6-diisopropylphenyl)-N-propylbenzimidamide is synthesized using the General Synthesis of Amidines procedure (Yield: 25%). $^1$H NMR (400 MHz, CDCl$_3$) δ 8.08-6.53 (m, 8H), 5.22-3.90 (m, 1H), 3.90-2.41 (m, 4H), 2.05-1.52 (m, 1H), 1.52-1.11 (m, 12H), 1.09-0.28 (m, 5H). $^{13}$C NMR (101 MHz, CDCl$_3$) δ 170.99, 157.58, 139.44, 136.11, 129.20, 128.36, 127.83, 127.02, 123.20, 60.33, 46.39, 31.62, 28.11, 24.50, 23.72, 22.68, 20.99, 14.46, 14.22, 14.15, 11.09.

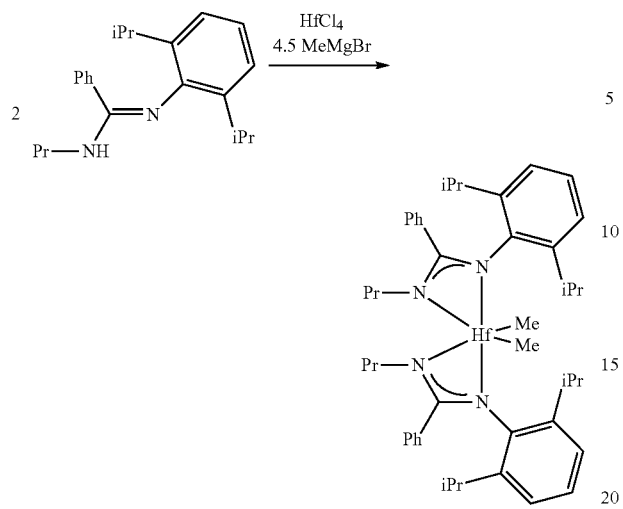

Comparative Procatalyst C1 was prepared using the General Synthesis of Amidinate Complexes procedure. 0.289 g, 55% yield. A 56:44 ratio of two isomers are present by NMR. The aryl region is indistinguishable, however the remaining portion is designated as either the major (~56%) or minor species (44%). $^1$H NMR (400 MHz, Benzene-$d_6$) δ 7.22-7.14 (m, 2H), 7.01-6.93 (m, 4H), 6.84-6.72 (m, 4H), 3.70 (minor, hept, J=6.7 Hz, 2H), 3.37 (minor, s, 2H), 3.31 (major, h, J=6.8 Hz, 2H), 3.24-3.12 (major, m, 2H), 1.67 (minor, h, J=7.4 Hz, 2H), 1.54-1.40 (major, m, 2H), 1.36 (minor, d, J=6.7 Hz, 5H), 1.24 (major, d, J=6.7 Hz, 6H), 1.04 (minor, d, J=6.8 Hz, 5H), 0.92 (major, d, J=6.8 Hz, 6H), 0.81-0.71 (minor, m, 3H), 0.68 (major, s, 9H), 0.66-0.58 (major, m, 3H), 0.55 (minor, d, J=0.7 Hz, 2H). $^{13}$C NMR (101 MHz, $C_6D_6$) δ 178.71, 178.35, 143.55, 143.13, 141.68, 140.77, 130.70, 129.65, 129.51, 129.21, 127.99, 127.72, 127.66, 125.60, 125.31, 123.19, 123.08, 64.67, 53.92, 50.04, 49.74, 28.51, 28.12, 25.71, 25.62, 25.42, 25.05, 23.58, 23.09, 11.50, 11.30.

The synthesis of Comparative Procatalyst C2 has been described in Makio, E.; Ochiai, T.; Mohri, J.; Takeda, K.; Shimazaki, T.; Usui, Y.; Matsuura, S.; Fujita, T *J. Am. Chem. Soc.* 2013, 135, 8177.

Synthesis of Inventive Procatalyst 1

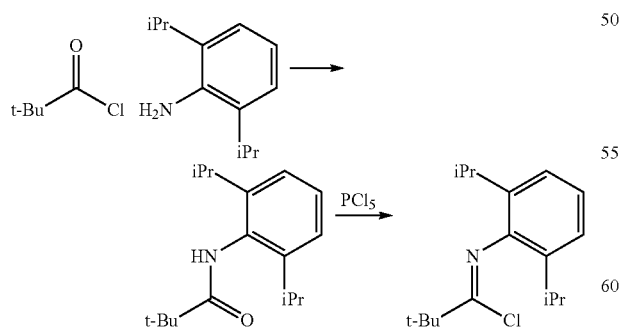

N-(2,6-diisopropylphenyl)pivalimidoyl chloride is synthesized according to reported literature procedure: Budzelaar, P. H. M.; Van Oort, A. B.; Orpen, A. G. *Eur. J. Inorg. Chem.* 1998,10, 1485-1494.

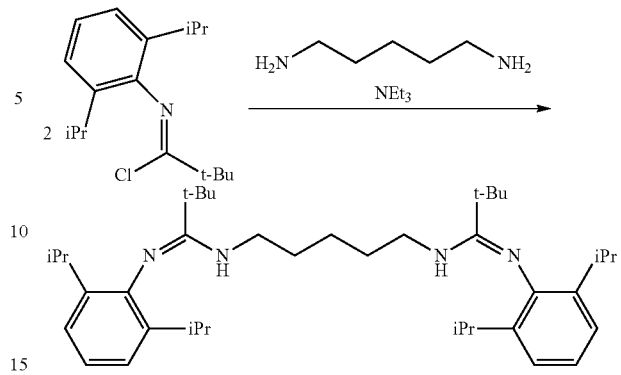

N,N''-(pentane-1,5-diyl)bis(N'-(2,6-diisopropylphenyl)-2,2-dimethylpropanimidamide) is synthesized using the General Synthesis of Amidines procedure (Yield: 0.470 g, 30%). $^1$H NMR (400 MHz, $CDCl_3$) δ 6.97-6.89 (m, 4H), 6.83 (dd, J=8.3, 6.9 Hz, 2H), 4.09-3.92 (m, 2H), 2.92 (hept, J=6.9 Hz, 4H), 2.53-2.42 (m, 4H), 1.27 (s, 19H), 1.13 (dd, J=6.8, 0.7 Hz, 24H), 1.05-0.96 (m, 4H), 0.86-0.78 (m, 2H). $^{13}$C NMR (101 MHz, $CDCl_3$) δ 156.83, 146.37, 137.21, 121.79, 120.78, 77.29, 77.25, 76.98, 76.66, 42.86, 38.46, 30.13, 29.11, 29.07, 28.24, 23.66, 23.06, 22.39.

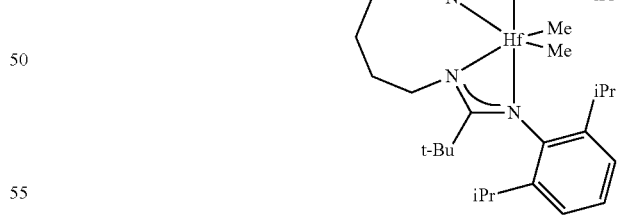

Inventive Procatalyst 1 is prepared by the General Synthesis of Amidinate Complexes procedure (Yield: 0.157 g, 53%). $^1$H NMR (400 MHz, Benzene-$d_6$) δ 7.24-6.79 (m, 9H), 4.13-3.33 (m, 6H), 3.24 (td, J=13.7, 12.8, 6.0 Hz, 2H), 3.11-2.85 (m, OH), 2.03-1.84 (m, 1H), 1.84-1.68 (m, 1H), 1.62 (s, 1H), 1.51-1.08 (m, 32H), 1.08-0.95 (m, 11H), 0.48 (d, J=4.2 Hz, 5H). $^{13}$C NMR (101 MHz, $CDCl_3$) δ 185.07, 182.72, 144.46, 143.41, 142.10, 129.01, 128.20, 125.28, 124.65, 123.74, 122.91, 122.23, 122.04, 121.86, 121.74, 63.04, 52.41, 48.43, 48.06, 41.39, 41.26, 40.81, 34.66, 33.13, 32.10, 31.58, 29.61, 29.45, 29.25, 29.16, 28.52, 28.09, 25.28, 25.23, 24.79, 23.65, 23.34, 22.65, 22.01, 20.70, 14.12.

Synthesis of Inventive Procatalyst 2

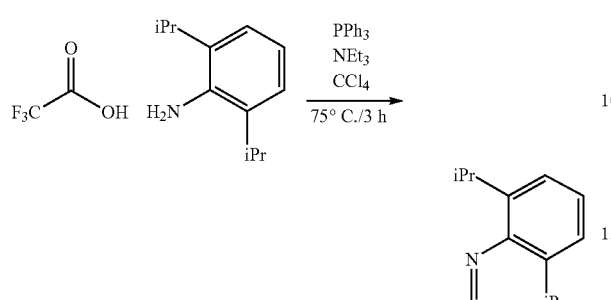

A 250 mL round bottom two neck flask is equipped with a nitrogen inlet and septum and is charged with PPh$_3$ (34.9 g, 133 mmol), NEt$_3$ (7.43 mL, 53.3 mmol) and CCl$_4$ (21.5 mL, 222 mmol). The solution is cooled to 0° C. and stirred for 0.5 h to help dissolve the PPh$_3$. Trifluoroacetic acid (3.40 mL, 44.4 mmol) is added to the cold solution and allowed to stir for 1.5 h. 2,6-Diisopropylaniline (90%, 9.45 g, 53.3 mmol) diluted in CCl$_4$ (21 mL) is added to the viscous white precipitate. The solution is heated to 75° C. for 3 h and becomes a white slurry. All volatiles are removed via rotary evaporation, hexanes are added to the slurry, and the solution is filtered through a fritted filter. The solid is washed multiple times with hexanes to give a yellow solution. All volatiles are removed and the yellow oil is distilled at 80° C./30 mTorr to give a clear oil (11.4 g, 88%). $^1$H NMR (400 MHz, CDCl$_3$) δ 7.24-7.17 (m, 3H), 2.63 (p, J=6.8 Hz, 2H), 1.19 (d, J=6.8 Hz, 12H). $^{19}$F NMR (376 MHz, CDCl$_3$) δ −71.25. $^{13}$C NMR (101 MHz, CDCl$_3$) δ 140.39, 135.87, 126.28, 123.41, 28.58, 22.94.

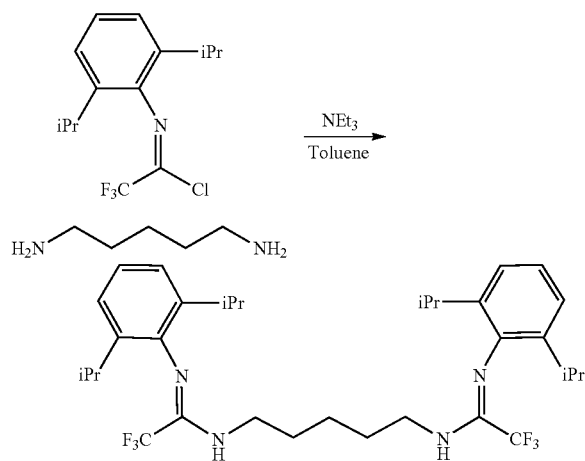

The amidine ligand is prepared by the General Synthesis of Amidines procedure. 0.74 g, 35%. $^1$H NMR (400 MHz, CDCl$_3$) δ 7.07 (d, J=7.5 Hz, 4H), 7.02 (dd, J=7.0, 2.4 Hz, 2H), 4.37 (s, 2H), 3.03 (s, 4H), 2.82 (dt, J=13.6, 6.8 Hz, 4H), 1.81-1.30 (m, 4H), 1.30-1.21 (m, 2H), 1.14 (dd, J=9.3, 7.0 Hz, 24H). $^{19}$F NMR (376 MHz, CDCl$_3$) δ −68.16, −69.67.

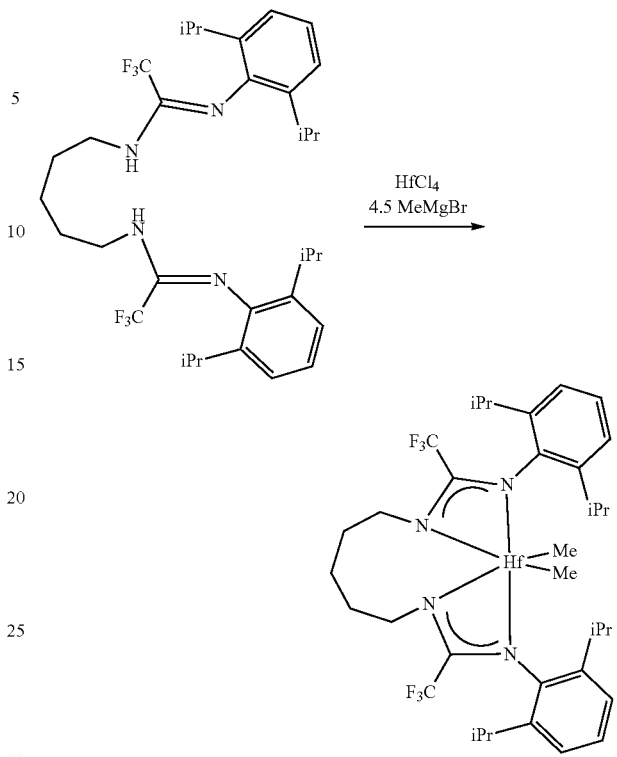

Inventive Procatalyst 2 is prepared by the General Synthesis of Amidinate Complexes procedure. 0.187 g, 46% yield. $^1$H NMR (400 MHz, CDCl$_3$) δ 7.13 (s, 6H), 3.69 (s, 4H), 3.25 (p, J=6.7 Hz, 4H), 1.95-1.69 (m, 6H), 1.23-1.13 (m, 24H), 0.14 (s, 6H). $^{19}$F NMR (376 MHz, CDCl$_3$) δ −62.97. $^{13}$C NMR (101 MHz, CDCl$_3$) δ 162.92 (q, J=28.6 Hz), 142.58, 139.22, 125.58, 123.20, 118.24 (q, J=293.4 Hz), 61.33, 47.00 (q, J=2.3 Hz), 28.61, 28.44, 25.30, 24.33.

X-Ray Crystal Analysis of Inventive Procatalyst 2.

Colorless prism-shaped crystals were transferred to a glass slide containing immersion oil (type NVH; MiTeGen). A single crystal was selected and mounted onto a MiTeGen 150 mm MicroMount. Data were collected on a Bruker SMART APEXII Goniometer equipped with a CCD detector and a Triumph monochrometer at 100K. Data were collected, integrated, scaled and refined using the APEX2 software suite. Non-hydrogen atoms were refined anisotropically. Hydrogen atoms were placed at calculated positions using a riding model. An ORTEP diagram of the Inventive Procatalyst 2 structure can be found in FIG. 1.

Crystal Data and Structure Refinement for Representative Hafnium C5 Bridged Amidine

| | |
|---|---|
| Identification code | HfCF3_Dipp_C5_bisamidinate_0m |
| Empirical formula | C35 H50 F6 Hf N4 |
| Formula weight | 819.28 |
| Temperature | 100(2) K |
| Wavelength | 0.71073 Å |
| Crystal system | Monoclinic |
| Space group | P 21/n |
| Unit cell dimensions | a = 9.9004(2) Å    α = 90°. |
| | b = 16.4552(4) Å    β = 93.9202(10)°. |
| | c = 21.6042(5) Å    γ = 90°. |
| Volume | 3511.37(14) Å$^3$ |
| Z | 4 |
| Density (calculated) | 1.550 Mg/m$^3$ |
| Absorption coefficient | 3.033 mm$^{-1}$ |

-continued

| | |
|---|---|
| F(000) | 1656 |
| Crystal size | 0.318 × 0.304 × 0.237 mm³ |
| Theta range for data collection | 1.557 to 33.303°. |
| Index ranges | −15 <= h <= 15, −17 <= k <= 25, −33 = l <= 32 |
| Reflections collected | 52884 |
| Independent reflections | 13515 [R(int) = 0.0322] |
| Completeness to theta = 25.242° | 100.0% |
| Absorption correction | Semi-empirical from equivalents |
| Max. and min. transmission | 0.53 and 0.46 |
| Refinement method | Full-matrix least-squares on $F^2$ |
| Data/restraints/parameters | 13515/507/453 |
| Goodness-of-fit on $F^2$ | 1.020 |
| Final R indices [I > 2sigma(I)] | R1 = 0.0217, wR2 = 0.0449 |
| R indices (all data) | R1 = 0.0296, wR2 = 0.0475 |
| Extinction coefficient | n/a |
| Largest diff. peak and hole | 0.753 and −0.569 e.Å⁻³ |

Synthesis of Inventive Procatalyst 3

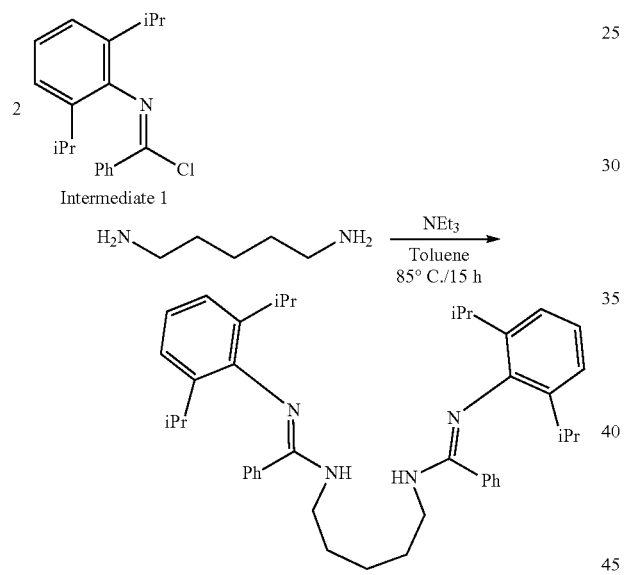

The tethered amidine ligand is prepared by the General Synthesis of Amidines procedure (2.78 g, 64% yield). $^1$H NMR (400 MHz, CDCl$_3$) δ 7.69-6.76 (m, 16H), 4.42-2.41 (m, 4H), 1.68-1.34 (m, 8H), 1.34-1.00 (m, 16H), 1.00-0.53 (m, 10H). The pure product forms multiple isomers complicating the NMR, however the LC-MS of the product confirms the purity and desired mass.

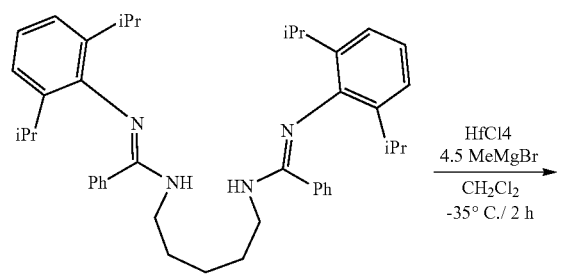

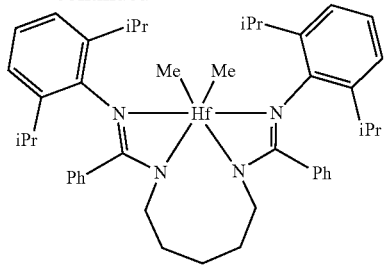

Inventive Procatalyst 3 is prepared by General Synthesis of Amidinate Complexes procedure. 0.187 g, 46% yield. (0.366 g, 86% yield). $^1$H NMR (400 MHz, Benzene-d$_6$) δ 7.21-7.04 (m, 4H), 7.04-6.91 (m, 6H), 6.84 (dtt, J=14.5, 10.1, 5.5 Hz, 6H), 3.72 (dq, J=13.6, 6.8 Hz, 2H), 3.67-3.48 (m, 4H), 3.42 (t, J=7.3 Hz, 2H), 1.69 (s, 2H), 1.55 (s, 2H), 1.37 (d, J=6.7 Hz, 4H), 1.31 (d, J=6.6 Hz, 2H), 1.22 (dd, J=26.1, 6.3 Hz, 6H), 0.99 (d, J=6.8 Hz, 6H), 0.96-0.84 (m, 4H), 0.57 (d, J=10.4 Hz, 4H). $^{13}$C NMR (101 MHz, C$_6$D$_6$) δ 178.86, 178.66, 143.43, 143.42, 141.48, 141.43, 130.83, 130.56, 129.51, 129.21, 128.91, 128.45, 128.15, 127.77, 127.72, 125.38, 125.28, 123.27, 54.71, 53.24, 49.23, 48.15, 32.91, 29.09, 28.12, 28.07, 25.52, 25.44, 23.78, 23.67.

Synthesis of Inventive Procatalyst 4

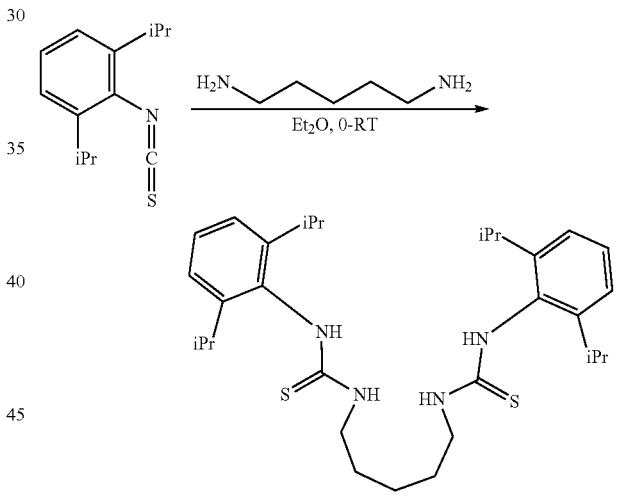

A solution of 2,6-diisopropylphenylisothiocyanate (2.000 g, 1.98 mL, 9.118 mmol, 2.00 eq) in ethyl ether (50 mL) under nitrogen in an oven dried flask is placed in an ice water bath and stirred vigorously (700 rpm) for 30 mins upon which cadaverine (0.466 g, 0.54 mL, 4.559 mmol, 1.00 eq) is added neat. The clear colorless solution instantaneously changes to a white heterogeneous mixture which is allowed to stir for 12 hrs warming gradually to 25° C. The white mixture is then placed in an ice water bath for 30 min following which it is vacuum filtered cold. The white solid is washed with cold ether (3×20 mL) and then dried in vacuo to afford the bisthiourea (1.880 g, 3.476 mmol, 76%). $^1$H NMR (400 MHz, DMSO-d$_6$) δ 7.16 (m, 5H), 7.09 (d, J=7.9 Hz, 3H), 4.18 (m, 4H), 3.38-3.16 (m, 4H), 1.43 (p, J=7.3 Hz, 4H), 1.21 (tt, J=8.3, 6.0 Hz, 2H), 1.05 (dd, J=6.5, 0.9 Hz, 24H). $^{13}$C NMR (101 MHz, DMSO-d$_6$) δ 181.28, 45.11, 43.68, 29.03, 24.29, 22.79.

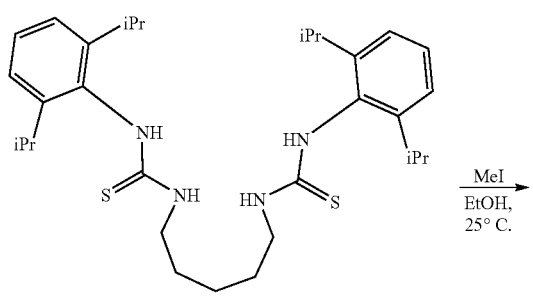

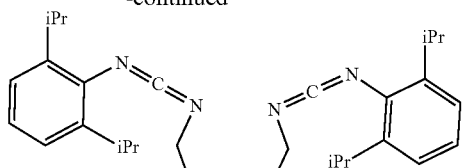

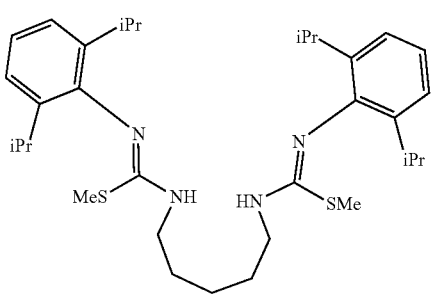

To a solution of the bisthiourea (1.000 g, 1.849 mmol, 1.00 eq) in EtOH (20 mL) is added iodomethane (1.050 g, 0.46 mL, 7.395 mmol, 4.00 eq). The pale yellow solution is allowed to stir (300 rpm) for 12 hrs after which time the clear colorless solution is diluted with an aqueous saturated mixture of $NaHCO_3$ (60 mL), then $CH_2Cl_2$ (20 mL), and then aqueous NaOH (20 mL, 1 N). The biphasic mixture is stirred vigorously (1000 rpm) for 2 min, poured into a separatory funnel, partitioned, the organic layer is washed with an aqueous saturated mixture of $NaHCO_3$ (3×20 mL), residual organics are back extracted from the aqueous layer using $CH_2Cl_2$ (3×20 mL), combined, washed with brine (1×20 mL), dried over solid $Na_2SO_4$, vacuum filtered over a pad of $Na_2SO_4$, and concentrated to afford the bis-isothiourea as a golden yellow oil (1.031 g, 1.812 mmol, 98%). $^1$H NMR (500 MHz, CDCl$_3$) δ 7.13 (d, J=8.0 Hz, 4H), 7.05 (dd, J=8.4, 6.8 Hz, 2H), 4.20 (m, 2H), 3.27 (m, 4H), 2.97 (hept, J=6.9 Hz, 4H), 2.44 (br s, 6H), 1.55 (s, 4H), 1.40-1.27 (m, 2H), 1.22 (d, J=6.9 Hz, 12H), 1.18 (d, J=6.9 Hz, 12H). $^{13}$C NMR (126 MHz, CDCl$_3$) δ 153.06, 144.37, 139.53, 123.10, 123.06, 43.03, 30.11, 28.14, 24.04, 23.53, 23.38, 13.59. ESI-MS: calc'd for $C_{33}H_{53}N_4S_2$[M+H]$^+$=569.3721; found 569.3721.

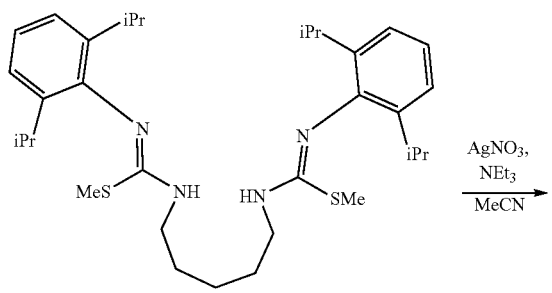

To a solution of the bis-isothiourea (1.5956 g, 2.805 mmol, 1.00 eq) and Et$_3$N (1.192 g, 1.64 mL, 11.781 mmol, 4.20 eq) in acetonitrile (30.0 mL) at 23° C. is added solid AgNO$_3$ (1.906 g, 11.220 mmol, 4.00 eq) all at once. After stirring for 3 hrs the yellow heterogeneous mixture is diluted with hexanes (100 mL), stirred vigorously (1000 rpm) for 5 mins, suction filtered over a pad of CELITE, a diatomaceous earth which is commercially available from Sigma Aldrich Co., LLC, with hexanes, and concentrated to ~5 mL. The mixture is diluted with hexanes (20 mL), and concentrated to ~5 mL. This process is repeated twice more, and then the hexanes mixture is vacuum filtered over a pad of CELITE using hexanes and concentrated in vacuo to afford the biscarbodiimide (1.212 g, 2.564 mmol, 91%) as a clear golden yellow oil. The biscarbodiimide is azeotropically dried using PhMe (4×3 mL) in vacuo prior to use. $^1$H NMR (500 MHz, CDCl$_3$) δ 7.09 (s, 6H), 3.40 (d, J=6.8 Hz, 4H), 3.38-3.30 (m, 4H), 1.75-1.63 (m, 4H), 1.61-1.47 (m, 2H), 1.24 (d, J=6.9 Hz, 21H). $^{13}$C NMR (126 MHz, CDCl$_3$) δ 142.03, 134.34, 132.65, 124.64, 123.10, 46.54, 30.98, 28.89, 24.28, 23.22.

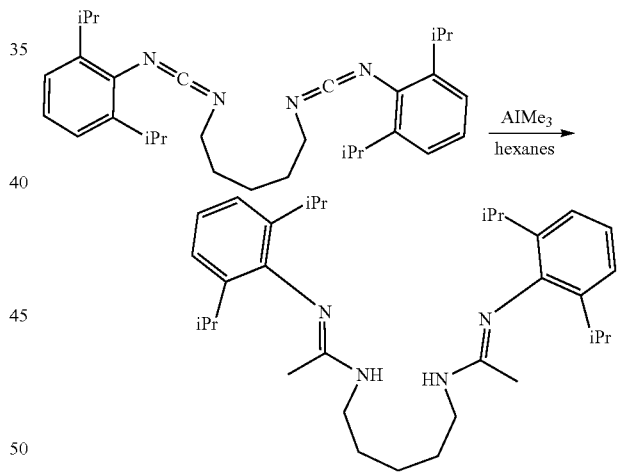

To a vigorously stirring (1000 rpm) solution of AlMe$_3$ (3.70 mL, 7.370 mmol, 8.00 eq, non-titrated 2.0 M in hexanes) at 27° C. in a nitrogen filled glovebox is added a solution of the biscarbodiimide (435.5 mg, 0.9213 mmol, 1.00 eq) in anhydrous de-oxygenated hexanes (12.0 mL) in a slow dropwise fashion over 10 min. After 5 min the clear golden yellow solution is removed from the glovebox and neutralized with an aqueous phosphate buffer (20 mL, pH=10, 0.05 M) under nitrogen, diluted with CH$_2$Cl$_2$ (20 mL), vacuum filtered through a pad of CELITE, the filtrate is poured into a separatory funnel, partitioned, organics are washed with an aqueous phosphate buffer (2×20 mL, pH=10, 0.05 M), residual organics are back extracted from the aqueous using CH$_2$Cl$_2$ (2×20 mL), combined, dried over solid Na$_2$SO$_4$, decanted, and concentrated to afford the bisamidine as a pale yellow solid (419.3 mg, 0.8306 mmol, 90%). The product is identified as a mixture of isomers and tautomers by NMR, and are identified by HRMS.

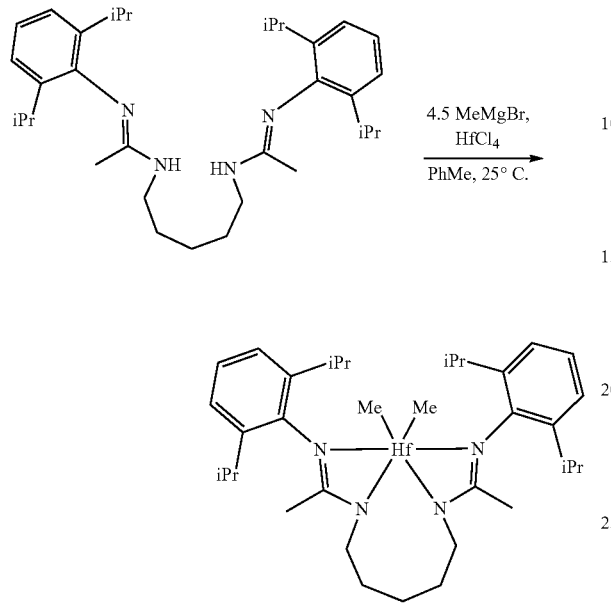

To a stirring (300 rpm) suspension of HfCl₄ (65.0 mg, 0.2031 mmol, 1.00 eq) in anhydrous de-oxgyenated PhMe (1.0 mL) in a nitrogen filled glovebox is added MeMgBr (0.31 mL, 0.9140 mmol, 4.50 eq, non-titrated 3.0 M in Et₂O). After 10 seconds a solution of the bisamidine (102.5 mg, 0.2031 mmol, 1.00 eq) in PhMe (1.5 mL) is added rapidly in a dropwise manner. After 2 hrs the golden yellow mixture is filtered through a 0.45 um submicron PTFE filter, rinsed with PhMe (3×1 mL), and concentrated. The resultant white mixture is suspended in hexanes (3 mL), concentrated, this is repeated 3× more, suspended in anhydrous de-oxgyenated PhMe (3 mL), filtered through a 0.45 um submicron PTFE filter, rinsed with PhMe (3×1 mL), concentrated, the resultant white foam is dissolved in PhMe (1 mL), anhydrous de-oxygenated hexanes (10 mL) is then added slowly without stirring or agitation, and the resultant biphasic layer is placed in the freezer (−35° C.). After 20 hrs the white heterogeneous mixture is filtered through a 0.20 um submicron filter, concentrated, the resultant white foam is dissolved in hexanes (1 mL), anhydrous Me₄Si (10 mL) is added slowly without agitation, and the mixture is placed in the freezer. After 20 hrs the white heterogeneous mixture is filtered through a 0.20 um submicron filter, and concentrated to afford the bisamidinate complex (Inventive Procatalyst 4) as a white solid (45.8 mg, 0.0642 mmol, 32%). ¹H NMR (500 MHz, Benzene-d₆) δ 7.11-7.07 (m, 6H), 3.45 (hept, J=6.8 Hz, 4H), 3.25-3.21 (m, 4H), 1.53-1.49 (m, 2H), 1.45 (s, 6H), 1.39 (m, 6H), 1.23 (d, J=6.8 Hz, 12H), 1.10 (d, J=6.9 Hz, 12H), 0.47 (s, 6H). ¹³C NMR (126 MHz, Benzene-d₆) δ 180.12, 144.05, 141.58, 125.44, 123.29, 55.10, 46.71, 29.64, 27.90, 24.69, 24.20, 13.51.

Synthesis of Inventive Procatalyst 5

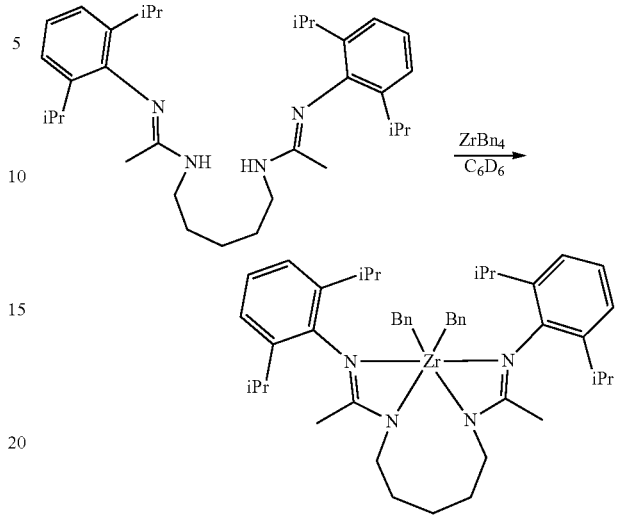

To a solution of the bisamidine (61.2 mg, 0.1212 mmol, 1.00 eq) in C₆D₆ (1.13 mL) in a nitrogen filled glovebox is added a solution of ZrBn₄ (55.3 mg, 0.1212 mmol, 1.00 eq) in C₆D₆ (0.37 mL). After stirring (300 rpm) for 2 hrs the clear golden orange solution changed to an orange heterogeneous mixture. An aliquot was removed and NMR had shown full conversion of starting material to product. The heterogeneous mixture is filtered through a 0.45 μm submicron filter rinsed with C₆D₆ (3×1 mL), and concentrated. The resulting orange mixture is suspended in hexanes (1 mL), then Me₄Si (10 mL) is slowly added without agitation, the orange mixture is placed in the freezer (−35° C.). After 16 hrs the mixture is filtered cold through a 0.20 μm submicron filter, and concentrated to afford the bis-amidinate complex Inventive Procatalyst 5 (41.8 mg, 0.0537 mmol, 44%) as an orange solid. ¹H NMR (400 MHz, Benzene-d₆) δ 7.19-6.99 (m, 15H), 6.80-6.74 (m, 2H), 6.74-6.69 (m, 4H), 3.33 (p, J=6.7 Hz, 4H), 3.05 (dd, J=6.7, 4.4 Hz, 4H), 2.58 (s, 4H), 1.45 (s, 6H), 1.33-1.18 (m, 6H), 1.06 (d, J=3.0 Hz, 12H), 1.05 (d, J=3.0 Hz, 12H). ¹³C NMR (101 MHz, Benzene-d₆) δ 182.50, 148.88, 143.76, 141.55, 125.74, 123.75, 120.58, 80.75, 46.43, 29.65, 28.18, 28.11, 25.14, 23.55, 13.77.

Synthesis of Inventive Procatalyst 6

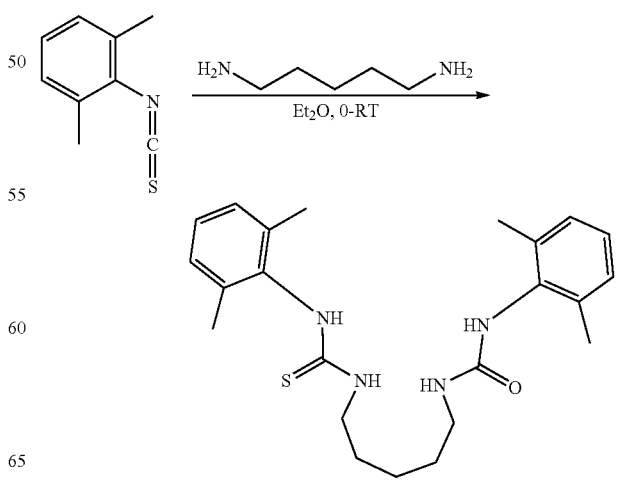

To a vigorously stirring (1000 rpm) solution of 2,6-dimethylphenylisothiocyanate (2.000 g, 1.85 mL, 12.252 mmol, 2.00 eq) in Et$_2$O (65 mL) is added cadaverine (0.626 g, 0.72 mL, 6.126 mmol, 1.00 eq) in slow dropwise fashion over 1 min. The clear colorless solution is allowed to stir vigorously for 12 hrs upon which the white heterogeneous mixture is placed in an ice water bath for 1 hr, suction filtered cold, the white filtered solid is washed with cold Et$_2$O (3×20 mL), and dried in vacuo to afford the bisthiourea as a white powder (2.331 g, 5.438 mmol, 89%). $^1$H NMR (400 MHz, DMSO-d$_6$) δ 7.05 (s, 6H), 3.49-3.20 (m, 4H), 2.09 (s, 12H), 1.45 (s, 4H), 1.20 (s, 2H). $^{13}$C NMR (126 MHz, Acetone-d$_6$) δ 181.31, 137.25, 137.22, 128.31, 44.28, 23.82, 17.40. HRMS (ESI): calc'd C$_{23}$H$_{32}$N$_4$S$_2$ [M+H]$^+$as 429.3; found 429.3.

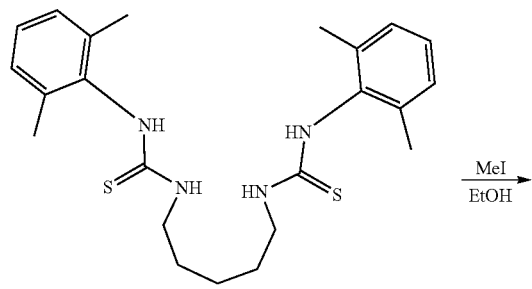

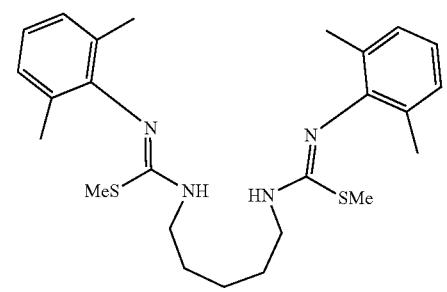

To a solution of the bisthiourea (2.331 g, 5.438 mmol, 1.00 eq) in EtOH—CH$_2$Cl$_2$ (100 mL, 1:1) at 23° C. is added iodomethane (3.087 g, 1.40 mL, 21.752 mmol, 4.00 eq). After stirring (500 rpm) for 12 hrs the clear pale yellow solution is neutralized with a saturated aqueous mixture of NaHCO$_3$ (100 mL), then aqueous NaOH (15 mL, 1 N) is added slowly, the biphasic white heterogeneous mixture is stirred vigorously (1000 rpm) for 2 mins, poured into a separatory funnel, partitioned, organics are washed with saturated aqueous NaHCO$_3$ (3×50 mL), residual organics were extracted from the aqueous layer using CH$_2$Cl$_2$ (2×25 mL), combined, washed with brine (1×50 mL), dried over solid Na$_2$SO$_4$, decanted, and concentrated to afford the bis(methylisothiourea) (2.483 g, 5.438 mmol, 100%). The product is identified by NMR as a mixture of isomers/tautomers. $^1$H NMR (500 MHz, CDCl$_3$) δ 7.00 (d, J=7.5 Hz, 4H), 6.86 (t, J=7.5 Hz, 2H), 4.24 (s, 2H), 3.31 (s, 4H), 2.37 (s, 6H), 2.10 (s, 12H), 1.59 (s, 4H), 1.36 (s, 2H). $^{13}$C NMR (126 MHz, CDCl$_3$) δ 152.52, 146.60, 129.25, 127.89, 122.52, 43.01, 29.90, 24.07, 18.01, 13.66. HRMS (ESI): calc'd C$_{25}$H$_{36}$N$_4$S$_2$[M+H]$^+$as 457.3; found 457.3

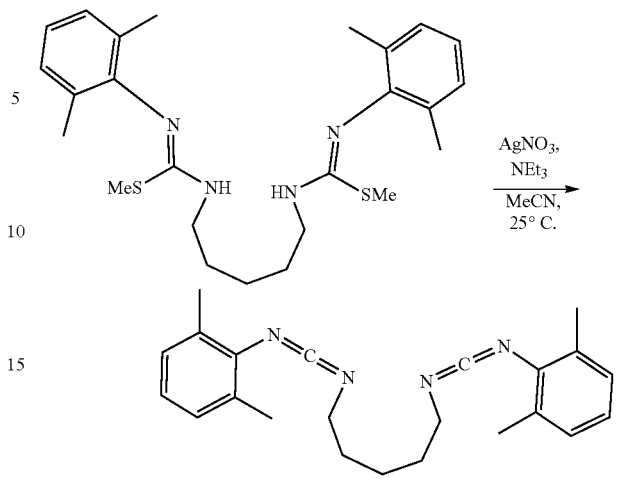

To a stirring (500 rpm) solution of the bis(methylisothiourea) (2.493 g, 5.459 mmol, 1.00 eq) and Et$_3$N (2.320 g, 3.20 mL, 22.928 mmol, 4.20 eq) in non-anhydrous CH$_2$Cl$_2$-acetonitrile (110 mL, 1:1) in a brown jar protected from light is added solid AgNO$_3$ (3.709 g, 21.836 mmol, 4.00 eq) all at once. After 3.5 hrs the golden brown heterogeneous mixture is diluted with hexanes (100 mL), stirred vigorously (1000 rpm) for 2 min, suction filtered through a pad of CELITE, concentrated to ~10 mL, hexanes (50 mL) is added, concentrated to ~10 mL, this process is repeated 3× more, hexanes (50 mL) is added, the mixture is suction filtered through a pad of CELITE, and concentrated to afford the biscarbodiimide as a pale golden yellow oil (1.575 g, 4.370 mmol, 80%). $^1$H NMR (500 MHz, CDCl$_3$) δ 7.01 (dq, J=7.3, 0.7 Hz, 4H), 6.93 (dd, J=8.2, 6.8 Hz, 2H), 3.40 (t, J=6.8 Hz, 4H), 2.34 (br s, 12H), 1.74-1.66 (m, 4H), 1.59-1.51 (m, 2H). $^{13}$C NMR (126 MHz, CDCl$_3$) δ 136.80, 133.75, 132.19, 128.12, 124.11, 46.67, 30.72, 24.27, 18.93. HRMS (ESI): calc'd C$_{23}$H$_{28}$N$_4$ [M+H]$^+$as 361.2314; found 361.2299.

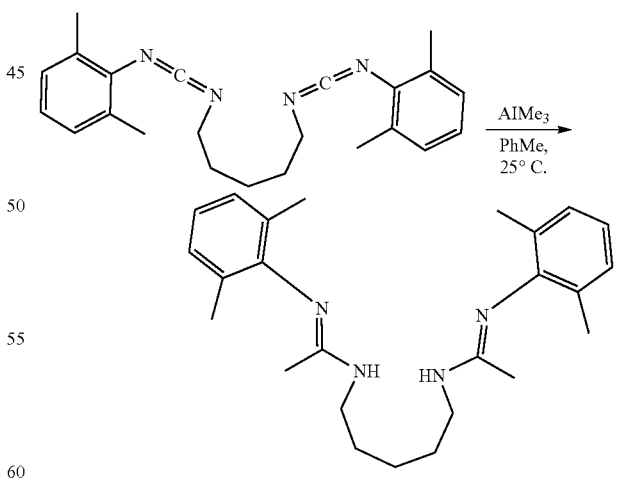

To a vigorously stirring (1000 rpm) solution of AlMe$_3$ (7.0 mL, 13.907 mmol, 8.00 eq, non-titrated 2.0 M in hexanes) is added a solution of the biscarbodiimide (626.7 mg, 1.738 mmol, 1.00 eq) in hexanes (18 mL) in a slow dropwise fashion over 20 mins. After stirring for 5 mins after the complete addition the now clear pale yellow solution is removed from the glovebox, immediately placed under a purging flow of nitrogen, placed in an ice water bath, and then neutralized using an aqueous phosphate buffer (25 mL, pH=10, 0.05 M) added in a slow dropwise fashion. The white heterogeneous mixture is diluted with an aqueous phosphate buffer (75 mL, pH=10, 0.05 M) and $CH_2Cl_2$ (50 mL), suction filtered through a pad of CELITE, poured into a separatory funnel, partitioned, organics are washed with an aqueous phosphate buffer (2×25 mL, pH=10, 0.05 M), residual organics were back extracted from the aqueous layer using $CH_2Cl_2$ (2×25 mL), combined, washed with brine (1×25 mL), dried over solid $Na_2SO_4$, concentrated, and azeotropically dried in vacuo using PhMe (4×5 mL) to afford the bis(methylamidine) as a white solid (613.3 mg, 1.562 mmol, 90%). The product is identified as a mixture of isomers and tautomers by NMR, HRMS, and LCMS. (Note: The chemical shifts listed below are for the major isomer). $^1$H NMR (500 MHz, $CDCl_3$) δ 6.98 (d, J=7.5 Hz, 4H), 6.80 (t, J=7.5 Hz, 2H), 4.21 (br s, 2H), 3.42 (t, J=7.2 Hz, 4H), 2.05 (s, 12H), 1.70 (h, J=7.7 Hz, 4H), 1.55 (s, 6H), 1.51 (t, J=7.7 Hz, 2H). $^{13}$C NMR (126 MHz, $CDCl_3$) δ 148.78, 128.82, 127.62, 121.57, 41.28, 29.35, 24.62, 18.28, 17.55. LCMS: calc'd $C_{25}H_{36}N_4$ [M+H]$^+$ as 393.3; found 393.4. HRMS (ESI): calc'd $C_{25}H_{36}N_4$ [M+H]$^+$ as 393.2974; found 393.3047.

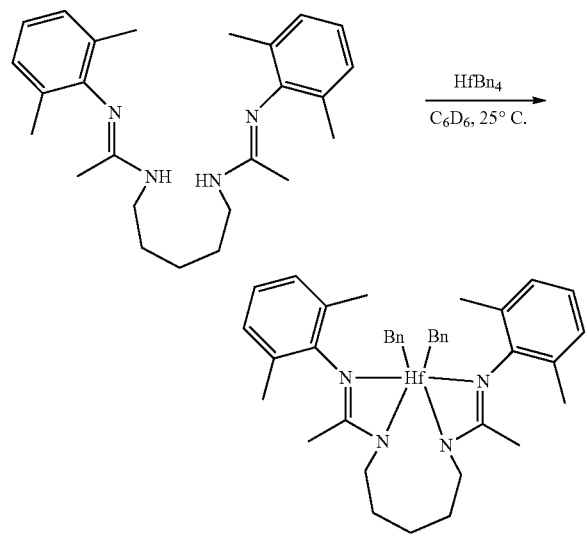

To a stirring (500 rpm) solution of the bis(methylamidine) (150.0 mg, 0.3821 mmol, 1.00 eq) in $C_6D_6$ (3.0 mL) in a nitrogen filled glovebox is added a solution of HfBn$_4$ (207.5 mg, 0.3821 mmol, 1.00 eq) in $C_6D_6$ (1.0 mL) in a slow dropwise fashion instantaneously causing the solution to change to a dark brown/black mixture. After 2 hrs an aliquot is removed and NMR had shown full consumption of the starting amidine. The heterogeneous mixture is filtered through a 0.45 μm submicron filter, rinsed with anhydrous de-oxygenated PhMe and hexanes (3×3 mL, 1:1), concentrated, dissolved in PhMe (1 mL), and hexanes (6 mL) is layered slowly on top of the golden yellow solution. The now pale yellow heterogeneous biphasic mixture is placed in the freezer (−35° C.) for 24 hrs, then filtered cold through a 0.45 μm submicron filter, and concentrated to afford the amidinate complex (Inventive Procatalyst 6) as a pale yellow foam (52.7 mg, 0.0700 mmol, 18%). $^1$H NMR (500 MHz, Benzene-d$_6$) δ 7.16-7.10 (m, 4H), 7.07-7.02 (m, 4H), 7.00-6.85 (m, 7H), 6.77 (tdd, J=6.2, 2.2, 1.2 Hz, 3H), 6.65-6.61 (m, 3H), 3.01 (dd, J=6.9, 4.2 Hz, 4H), 2.26 (s, 4H), 2.08 (s, 12H), 1.28 (s, 6H), 1.22-1.10 (m, 6H). $^{13}$C NMR (126 MHz, Benzene-d$_6$) δ 180.95, 148.72, 144.31, 142.95, 133.79, 128.36, 127.23, 126.66, 124.76, 122.74, 120.42, 82.68, 82.16, 46.46, 29.08, 19.42, 18.76, 12.78.

Synthesis of Inventive Procatalyst 7

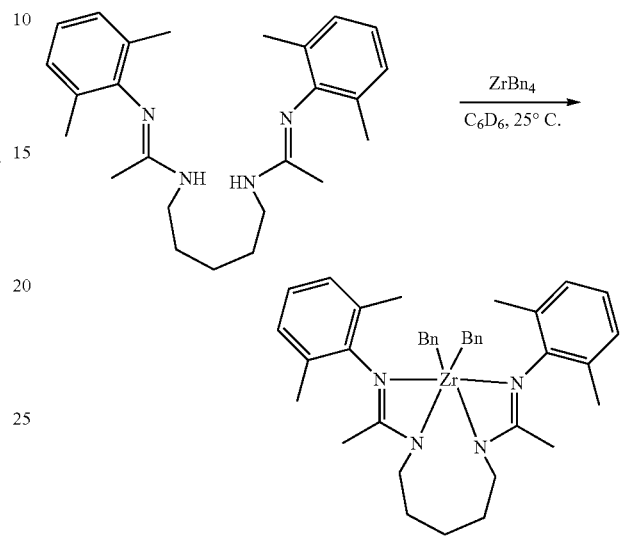

To a stirring (500 rpm) solution of the bis(methylamidine) (150.0 mg, 0.3821 mmol, 1.00 eq) in $C_6D_6$ (3.0 mL) in a nitrogen filled glovebox is added a solution of ZrBn$_4$ (174.1 mg, 0.3821 mmol, 1.00 eq) in $C_6D_6$ (1.0 mL) in a slow dropwise fashion. After 2 hrs an aliquot is removed and NMR had shown full consumption of the starting amidine. The heterogeneous mixture is filtered through a 0.45 um submicron filter, rinsed with anhydrous de-oxygenated PhMe and hexanes (3×3 mL, 1:1), concentrated, dissolved in PhMe (1 mL), and hexanes (6 mL) is layered slowly on top of the golden yellow-orange solution. The now pale yellow-orange heterogeneous biphasic mixture is placed in the freezer (−35° C.) for 24 hrs, then filtered cold through a 0.45 μm submicron filter, and concentrated to afford the amidinate complex (Inventive Procatalyst 7) as a pale yellow-orange foam (63.8 mg, 0.0961 mmol, 25%). $^1$H NMR (500 MHz, Benzene-d$_6$) δ 7.15-7.06 (m, 3H), 7.04-6.87 (m, 12H), 6.83-6.77 (m, 2H), 6.71-6.66 (m, 1H), 6.66-6.61 (m, 3H), 2.92 (m, 4H), 2.61 (s, 4H), 2.08 (s, 12H), 1.30 (s, 6H), 1.20 (m, 6H). $^{13}$C NMR (126 MHz, Benzene-d$_6$) δ 181.25, 147.71, 144.85, 133.45, 129.58, 128.41, 126.13, 124.48, 120.47, 78.29, 46.60, 29.03, 23.16, 19.40, 12.42.

Synthesis of Inventive Procatalyst 8.

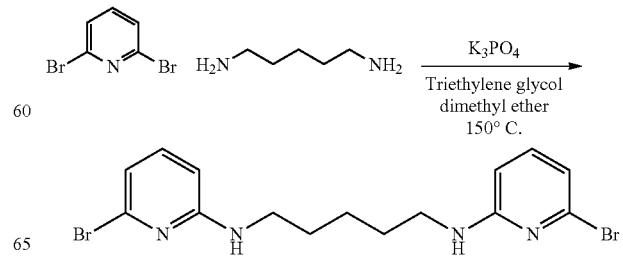

In a 100 mL round bottom flask is added 2,6-dibromopyridine (5.00 g, 21.11 mmol), K₃PO₄ (5.38 g, 25.33 mmol), triethyleneglycol dimethylether (50 mL) and cadaverine (0.99 mL, 8.44 mmol). The reaction is heated to 150° C. for 3 d and the product slowly forms as determined by LC-MS. After 3d the solvent is distilled off (150° C./200 mTorr) and the yellow oil is purified by reverse phase column chromatography using acetonitrile/water. Yield: 75%. $^1$H NMR (400 MHz, CDCl₃) δ 7.28-7.16 (m, 2H), 6.67 (ddd, J=7.4, 1.1, 0.6 Hz, 2H), 6.24 (d, J=8.2 Hz, 2H), 4.71 (s, 2H), 3.20 (t, J=6.6 Hz, 4H), 1.60 (h, J=6.7 Hz, 4H), 1.50-1.38 (m, 2H). $^{13}$C NMR (101 MHz, CDCl₃) δ 158.88, 140.22, 139.48, 115.56, 104.18, 41.96, 28.98, 24.23

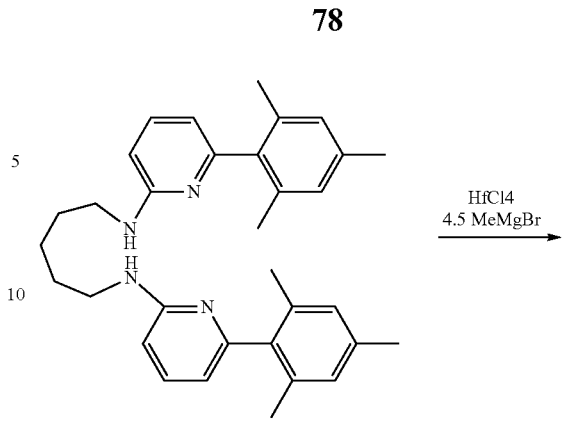

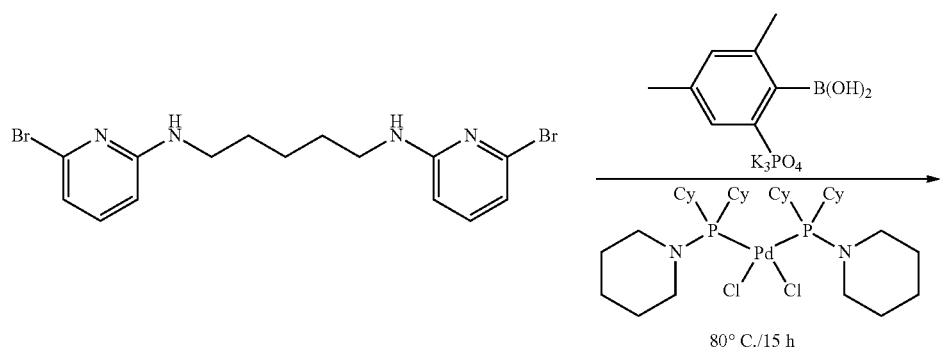

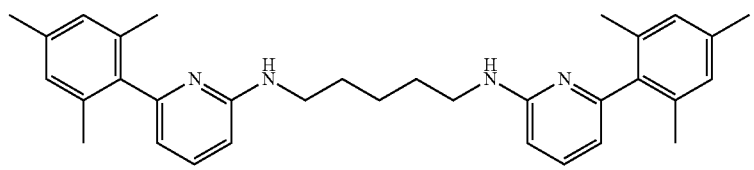

N1,N5-bis(6-bromopyridin-2-yl)pentane-1,5-diamine (0.485 g, 1.17 mmol), mesitylboronic acid (0.576 g, 3.51 mmol), K₃PO₄ (0.746 g, 3.51 mmol), toluene (8 mL), and the Pd-piperidyl catalyst (0.043 g, 0.06 mmol) are added to a 40 mL vial and heated under a nitrogen purge for 15h at 100° C. The reaction is cooled to room temperature and water (10 mL) is added to the solution and the product is extracted with EtOAc. The organic layer is collected and dried and the crude product is purified by column chromatography. Yield: 11%. $^1$H NMR (400 MHz, CDCl₃) δ 7.48 (t, J=7.8 Hz, 2H), 6.92 (d, J=15.9 Hz, 6H), 6.49 (d, J=7.2 Hz, 2H), 6.30 (d, J=8.3 Hz, 2H), 4.65 (s, 2H), 3.23 (q, J=6.6 Hz, 4H), 2.33 (s, 3H), 2.30 (s, 6H), 2.08 (s, 12H), 1.87 (s, 6H), 1.66 (p, J=7.2 Hz, 4H), 1.58-1.43 (m, 2H). $^{13}$C NMR (101 MHz, CDCl₃) δ 158.76, 158.43, 138.23, 137.71, 136.89, 135.97, 135.58, 135.47, 128.16, 113.56, 103.20, 42.38, 29.38, 24.53, 21.10, 21.06, 20.08, 19.79.

-continued

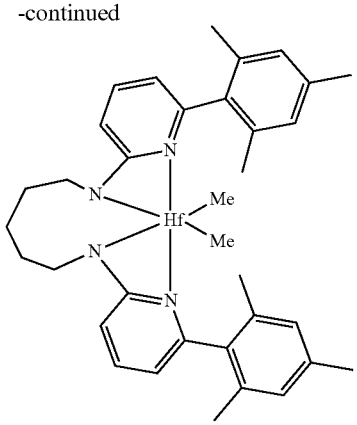

Inventive Procatalyst 8 is prepared by the General Procedure for metallation of [4,2] pyridine-amidine ligands. Yield: 40%. $^1$H NMR (400 MHz, Benzene-d6) δ 7.00-6.92 (m, 2H), 6.66 (s, 4H), 5.91 (dd, J=7.3, 0.9 Hz, 2H), 5.72 (d, J=8.5 Hz, 2H), 3.29-3.09 (m, 4H), 2.05 (s, 6H), 1.97 (s, 12H), 1.64 (p, J=6.1 Hz, 2H), 1.37 (q, J=10.6, 9.1 Hz, 4H), 0.08 (d, J=1.0 Hz, 6H). $^{13}$C NMR (101 MHz, C$_6$D$_6$) δ 169.56, 156.37, 141.31, 137.01, 135.99, 135.40, 127.88, 110.22, 101.05, 57.29, 46.27, 26.97, 23.18, 20.73, 19.45.

Synthesis of Inventive Procatalyst 9

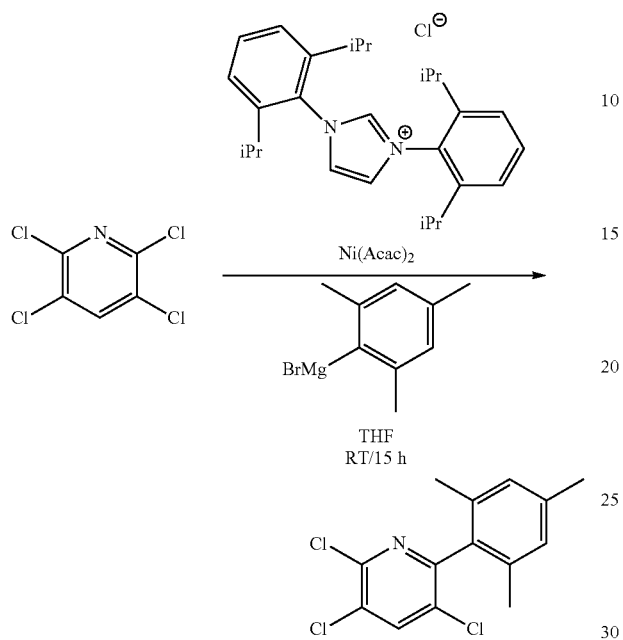

A 250 mL flask is charged with tetrachloropyridine (4.60 g, 21.2 mmol), Ni(AcAc)$_2$ (0.163 g, 0.64 mmol), and N,N-bis-(2,6-disisopropylphenyl) imidazolium chloride (0.270 g, 0.64 mmol). The flask is purged with nitrogen and anhydrous THF (100 mL) is added. A 1 M THF solution of the mesityl-Grignard (21.6 mL, 21.6 mmol) is added dropwise at room temperature. The reaction is allowed to stir for 15 h and all volatiles are removed by rotary evaporation. Ethyl acetate and 1 N HCl are added and the organic layer is extracted. All volatiles are removed and the crude product is purified by column chromatography (90:10 hexanes:EtOAc). Yield 4.51 g, 71%. $^1$H NMR (400 MHz, CDCl$_3$) δ 8.05-7.77 (s, 1H), 6.93 (s, 2H), 2.32 (s, 3H), 1.99 (s, 6H). $^{13}$C NMR (101 MHz, CDCl$_3$) δ 156.37, 146.77, 138.99, 138.71, 135.52, 132.96, 130.72, 129.16, 128.35, 21.19, 19.53.

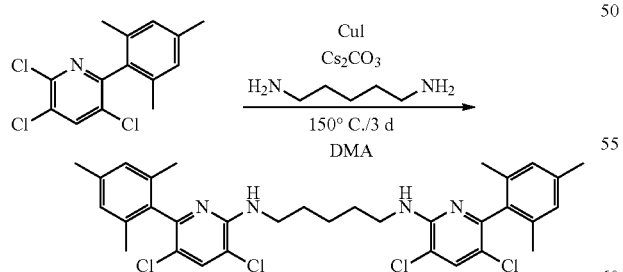

A 40 mL vial is charged with 2,3,5-trichloro-6-mesitylpyridine (0.440 g, 1.46 mmol), Cs$_2$CO$_3$ (0.954 g, 2.93 mmol), CuI (0.558 g, 2.93 mmol) and cadaverine,(0.075 g, 0.73 mmol) then purged with nitrogen. Anhydrous DMA is degassed, then 12 mL are added to the vial and the reaction mixture is heated at 150° C. for 3 d. DMA is distilled off under vacuum, NH$_4$OH and CH$_2$Cl$_2$ were added, and the organic layer is collected. All volatiles are removed and the crude product is purified by column chromatography to the give the product (90:10 Hexanes:EtOAc). Yield 0.280 g, 61%. $^1$H NMR (400 MHz, CDCl$_3$) δ 7.54 (s, 2H), 6.93 (s, 4H), 4.94 (t, J=5.5 Hz, 2H), 3.40 (q, J=6.5 Hz, 4H), 2.34 (s, 6H), 2.03 (s, 12H), 1.59 (dt, J=14.7, 6.9 Hz, 4H), 1.47-1.35 (m, 2H). $^{13}$C NMR (101 MHz, CDCl$_3$) δ 153.58, 152.37, 137.62, 136.16, 135.65, 135.36, 128.07, 117.64, 113.59, 41.40, 29.45, 24.24, 21.22, 19.50.

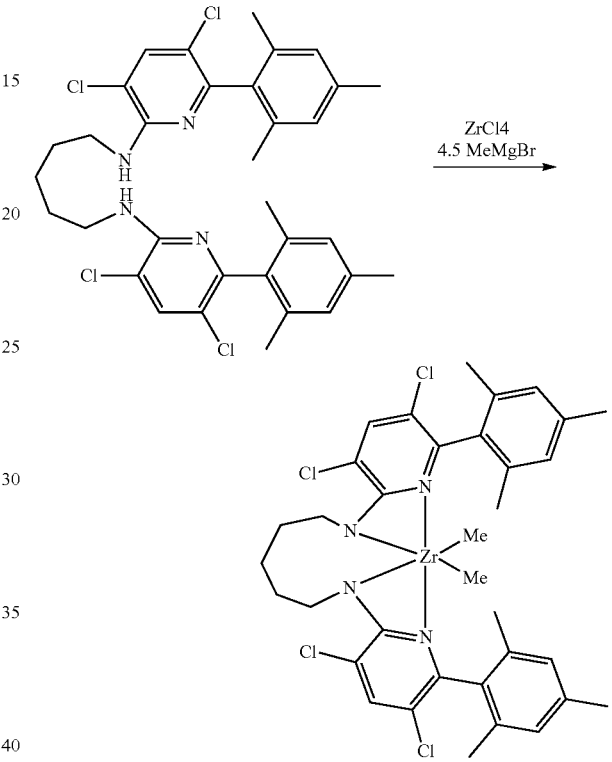

Inventive Procatalyst 9 is prepared by the General Procedure for metallation of [4,2] pyridine-amidine ligands. Yield: 53%. $^1$H NMR (400 MHz, Benzene-d6) δ 7.03 (d, J=0.5 Hz, 2H), 6.61 (s, 4H), 3.78-3.62 (m, 4H), 1.99 (s, 6H), 1.92 (s, 12H), 1.69-1.55 (m, 2H), 1.52-1.40 (m, 4H), 0.29 (s, 6H). $^{13}$C NMR (101 MHz, C$_6$D$_6$) δ 163.98, 152.79, 143.28, 138.18, 135.50, 132.07, 128.14, 114.50, 111.16, 55.45, 46.81, 30.75, 21.65, 20.72, 19.08.

Synthesis of Inventive Procatalyst 10

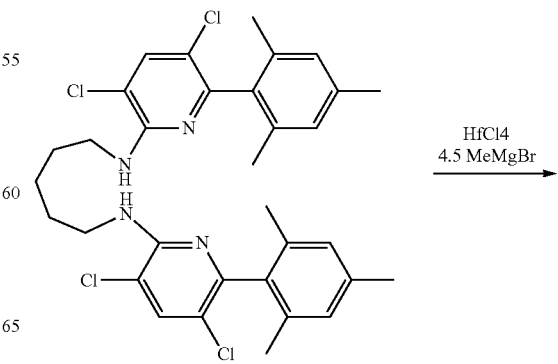

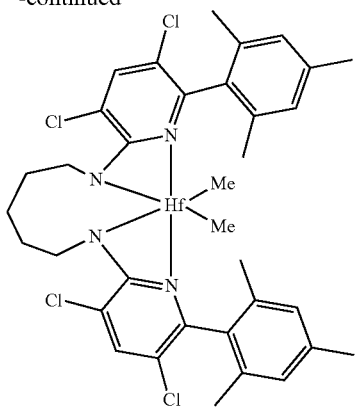

Inventive Procatalyst 10 is prepared by the General Procedure for metallation of [4,2] pyridine-amidine ligands. Yield: 54%. $^1$H NMR (400 MHz, Benzene-d6) δ 7.04-7.00 (m, 2H), 6.62 (s, 4H), 3.87-3.71 (m, 4H), 1.99 (s, 6H), 1.91 (s, 12H), 1.66-1.58 (m, 2H), 1.45 (q, J=10.9, 8.6 Hz, 4H), 0.02 (s, 6H). $^{13}$C NMR (101 MHz, C$_6$D$_6$) δ 163.28, 153.01, 143.68, 138.67, 135.95, 132.30, 128.53, 115.21, 112.79, 62.24, 46.53, 31.13, 21.80, 21.10, 19.48.

Synthesis of Inventive Procatalyst 11

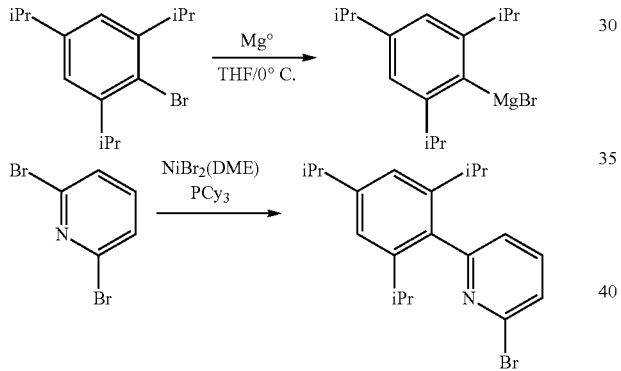

Following the procedure reported in Kempe, R. *Eur. J. Inorg. Chem.* 2004, 3297, a 250 mL round bottom flask is charged with magnesium turnings (0.330 g, 13.6 mmol) and anhydrous THF (30 mL). 2,4,6-Triisopropyl-bromobenzene (3.50 g, 12.4 mmol) and few crystals of I$_2$ are then added and the resulting suspension is stirred at 0° C. After 2 h, the cooled reaction mixture is stirred at 50° C. for 12 h. The reaction mixture is filtered inside a glove box and the filtrate is directly used in the next step.

2,6-Dibromopyridine (2.78 g, 11.7 mmol), dioxane (35 mL), tricyclohexylphosphine (0.069 g, 0.25 mmol) and [NiBr$_2$(DME)] (0.038 g, 0.12 mmol) are added together in a 110 mL jar inside the glove box and the 2,4,6-triisopropyl-Grignard is then added to the stirred suspension resulting in a beige precipitate. The reaction mixture is warmed to 50° C. and stirred for 72 h. The jar is removed from the glove box and water and CHCl$_3$ are added and the resulting suspension transferred to a separatory funnel. The organic phase is collected and the aqueous phase washed with CHCl$_3$ and extracted. The combined organic phases are washed with a saturated sodium chloride solution and dried with Na$_2$SO$_4$. The solvent is removed to afford a white solid which is washed with heptane to give the pure product. $^1$H NMR (400 MHz, CDCl$_3$) δ 7.57 (t, J=7.7 Hz, 1H), 7.49-7.40 (m, 1H), 7.23 (d, 1H), 7.04 (s, 2H), 2.90 (hept, J=6.8 Hz, 1H), 2.46 (hept, J=6.8 Hz, 2H), 1.25 (d, 6H), 1.11 (dd, J=17.9, 6.8 Hz, 12H). $^{13}$C NMR (101 MHz, CDCl$_3$) δ 161.32, 149.27, 146.12, 141.46, 137.85, 134.88, 125.87, 123.92, 120.74, 34.44, 31.86, 30.40, 29.00, 24.14, 24.04, 23.83, 22.67, 14.07.

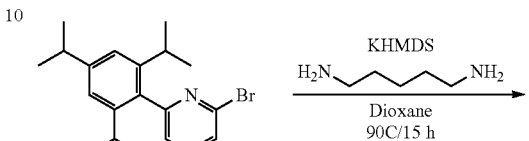

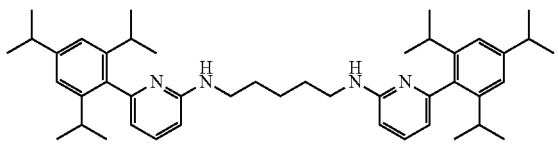

Inside a glove box, a 4U mL vial is charged with 2-bromo-6-(2,4,6-triisopropylphenyl)pyridine (1.60 g, 4.45 mmol), cadaverine (0.227 g, 2.23 mmol), KHMDS (1.78 g, 8.90 mmol), and dioxane (16 mL). The reaction is heated to 90° C. for 15 h and is taken out of the glove box and slowly quenched with water. The organic layer is extracted, and all volatiles are removed. The crude product is purified by column chromatography (90:10 hexanes:EtOAc). $^1$H NMR (400 MHz, CDCl$_3$) δ 7.51-7.42 (m, 2H), 7.06 (s, 4H), 6.57 (d, J=7.2 Hz, 2H), 6.31 (d, J=8.3 Hz, 2H), 4.70 (t, J=5.6 Hz, 2H), 3.22 (q, J=6.7 Hz, 4H), 2.94 (hept, J=6.8 Hz, 2H), 2.68 (h, J=6.8 Hz, 4H), 1.67 (dt, J=14.7, 7.3 Hz, 4H), 1.58-1.45 (m, 2H), 1.30 (dd, J=7.0, 3.4 Hz, 12H), 1.17 (d, J=6.8 Hz, 12H), 1.13 (d, J=6.9 Hz, 12H). $^{13}$C NMR (101 MHz, CDCl$_3$) δ 158.51, 158.43, 148.17, 146.06, 137.08, 136.91, 120.60, 114.14, 103.16, 42.30, 34.42, 31.60, 30.19, 29.38, 24.51, 24.14, 24.06, 22.66.

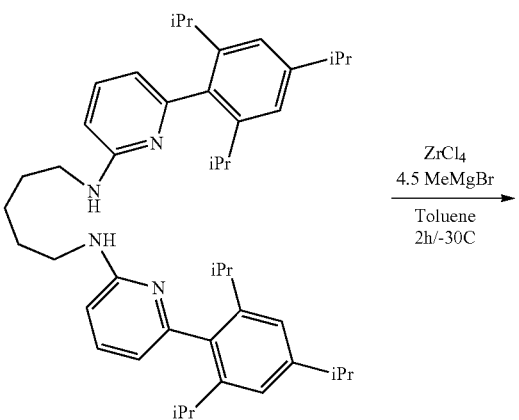

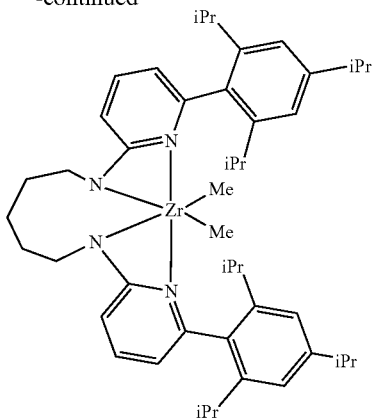

Inventive Procatalyst 11 is prepared by the General Procedure for metallation of [4,2] pyridine-amidine ligands. Yield: 55%. $^1$H NMR (400 MHz, Benzene-d6) δ 7.07 (s, 4H), 6.94 (dd, J=8.5, 7.3 Hz, 2H), 6.13 (d, J=7.3 Hz, 2H), 5.75 (d, J=8.6 Hz, 2H), 3.05 (s, 4H), 2.88 (p, J=6.7 Hz, 4H), 2.78 (dt, J=13.8, 6.8 Hz, 2H), 1.54 (m, 6H), 1.21 (d, J=6.9 Hz, 12H), 1.17 (d, J=6.8 Hz, 12H), 1.09 (d, J=6.7 Hz, 12H), 0.25 (s, 6H). $^{13}$C NMR (101 MHz, C$_6$D$_6$) δ 169.39, 156.13, 148.76, 146.24, 140.19, 134.61, 120.29, 112.74, 100.59, 51.67, 47.94, 34.40, 30.44, 26.21, 26.17, 23.95, 22.94.

Synthesis of Inventive Procatalyst 12

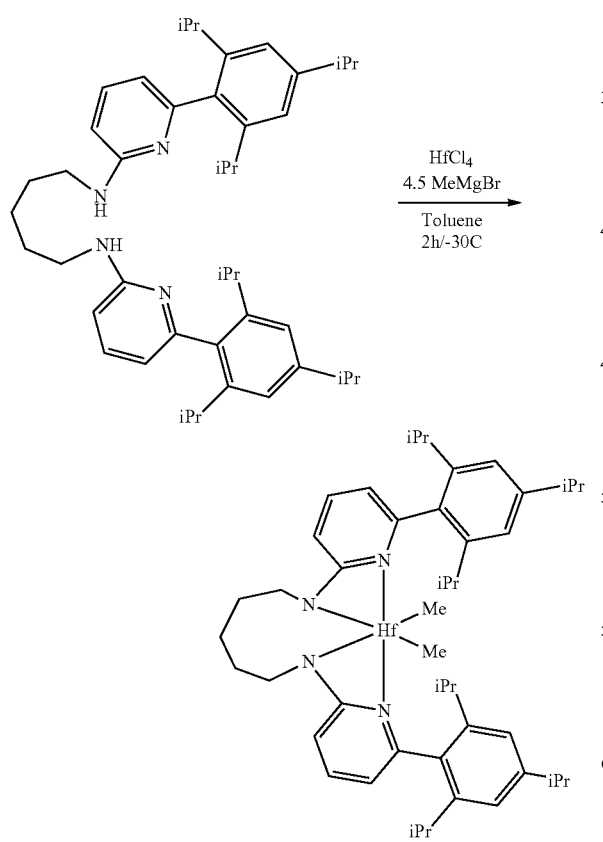

Inventive Procatalyst 12 is prepared by the General Procedure for metallation of [4,2] pyridine-amidine ligands. Yield: 52%. $^1$H NMR (400 MHz, Benzene-d6) δ 7.08 (s, 4H), 6.91 (dd, J=8.6, 7.3 Hz, 2H), 6.11 (d, J=7.2 Hz, 2H), 5.70 (d, J=8.6 Hz, 2H), 3.23-3.15 (m, 4H), 2.86 (dq, J=13.9, 7.0 Hz, 4H), 2.81-2.71 (m, 2H), 1.58 (m, 2H), 1.48-1.35 (m, 4H), 1.19 (dd, J=11.2, 6.8 Hz, 24H), 1.10 (d, J=6.7 Hz, 12H), 0.06 (s, 6H). $^{13}$C NMR (101 MHz, C$_6$D$_6$) δ 168.48, 155.99, 148.79, 146.26, 140.14, 134.50, 120.33, 112.75, 101.10, 59.90, 46.69, 34.36, 30.42, 26.13, 26.04, 23.91, 22.95.

Synthesis of Inventive Procatalyst 13

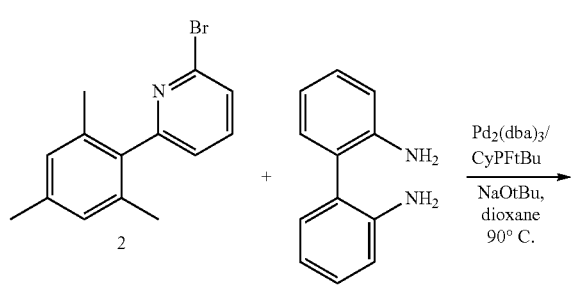

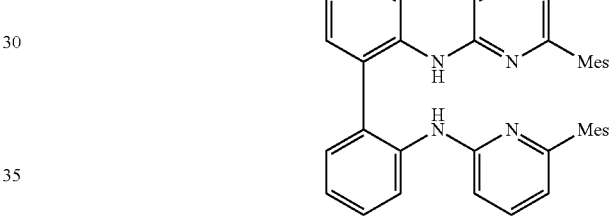

In the glovebox, 2-bromo-6-mesityl pyridine (0.3564 g, 1.290 mmol), 2,2'-aminobiphenyl (0.1179 g, 0.6452 mmol), Pd$_2$dba$_3$ (2 mol %), CyPF-t-Bu (Josiphos, 4 mol %) and NaO-t-Bu (0.2507 g, 2.611 mmol) were weighed into a 20 mL vial. Dioxane (10 mL) was added, and the reaction mixture was heated to 90° C. for 2 d.

After this time, the reaction was cooled to room temperature and poured over dichloromethane (10 mL). The organic layer was then extracted with saturated sodium bicarbonate solution (2×10 mL). The organic extract was then separated and dried over MgSO$_4$. The suspension was filtered, and the solvents were removed in vacuo to yield a brown solid. The mixture was purified by flash column chromatography (4:1 hexanes:ethyl acetate) to yield a fluffy yellow solid (0.2006 g, 55%).

$^1$H NMR (400 MHz, CDCl$_3$) δ 7.79 (d, J=8.2 Hz, 2H), 7.35 (dt, J=15.3, 7.5 Hz, 4H), 7.27-7.20 (m, 2H), 7.07 (t, J=7.5 Hz, 2H), 6.80 (d, J=8.4 Hz, 2H), 6.54 (d, J=7.3 Hz, 2H), 6.41 (s, 2H), 2.31 (s, 6H), 2.00 (s, 12H). $^{13}$C NMR (101 MHz, CDCl$_3$) δ 158.65, 155.15, 138.76, 137.67, 137.15, 135.53, 131.56, 129.05, 128.94, 128.09, 122.53, 119.18, 115.59, 106.06, 20.95, 19.96.

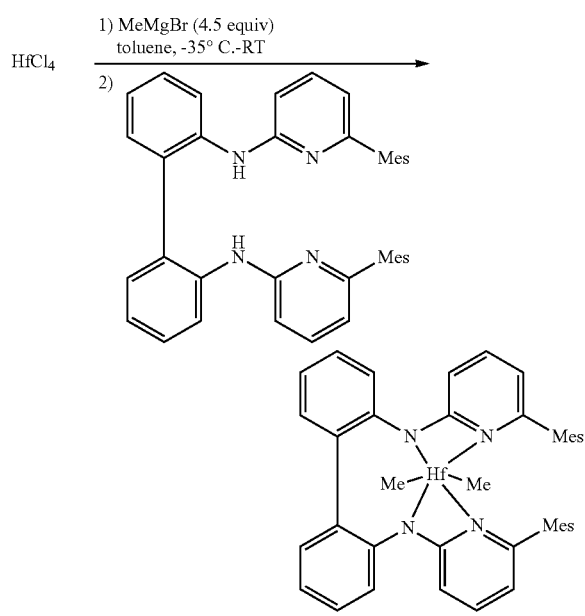

In the glovebox, HfCl$_4$ (0.0379 g, 0.1183 mmol) was weighed into a 20 mL vial and suspended in 2 mL toluene. The suspension was then cooled to −35° C. in the freezer for 30 min. Separately, the [4,2] biphenyl pyridine amine ligand (0.0661 g, 0.1150 g) was weighed into a 20 mL vial and dissolved in 4 mL toluene. This solution was then cooled to −35° C. in the freezer for 30 min. MeMgBr (3M, 0.32 mL, 0.5325 mmol) was added to the suspension of HfCl$_4$, and the mixture was stirred for 2 min. After this time, the cooled solution of the ligand was added, and the reaction was allowed to warm to room temperature and stir for 3 h. The toluene was then removed in vacuo, and the remaining solids were suspended in 10 mL dichloromethane. The brown suspension was filtered, leaving a yellow solution. The dichloromethane was removed in vacuo to yield a yellow solid (0.060 g, 55%). $^1$H NMR (400 MHz, C$_6$D$_6$) δ 7.41 (dd, J=7.7, 1.6 Hz, 2H), 7.31 (dd, J=8.0, 1.2 Hz, 2H), 6.92 (td, J=7.5, 1.3 Hz, 2H), 6.85-6.72 (m, 4H), 6.65 (d, J=8.2 Hz, 4H), 6.32-6.23 (m, 2H), 5.97 (dd, J=7.4, 0.9 Hz, 2H), 2.09 (d, J=5.9 Hz, 16H), 1.78 (s, 6H), −0.03 (s, 6H). $^{13}$C NMR (126 MHz, C$_6$D$_6$) δ 166.29, 156.61, 145.10, 141.18, 137.18, 135.91, 135.75, 135.48, 132.93, 123.50, 121.97, 119.96, 113.49, 104.51, 58.27, 20.67, 19.99.

Polymerization Examples

Batch Reactor Polymerization Procedure

The batch reactor polymerizations were conducted in a 2 L PARR batch reactor. The reactor is heated by an electrical heating mantle, and is cooled by an internal serpentine cooling coil containing cooling water. Both the reactor and the heating/cooling system are controlled and monitored by a CAMILE TG process computer. The bottom of the reactor is fitted with a dump valve, which empties the reactor contents into a stainless steel dump pot, which is prefilled with a catalyst kill solution (typically 5 mL of a IRGAFOS/IRGANOX/toluene mixture). The dump pot is vented to a 30 gal. blow-down tank, with both the pot and the tank purged with nitrogen. All solvents used for polymerization or catalyst makeup are run through solvent purification columns to remove any impurities that may affect polymerization. The 1-octene and ISOPAR-E were passed through 2 columns, the first containing A2 alumina, the second containing Q5. (ISOPAR E is an isoparaffin fluid, typically containing less than 1 ppm benzene and less than 1 ppm sulfur, which is commercially available from ExxonMobil Chemical Company.) The ethylene was passed through 2 columns, the first containing A204 alumina and 4 Å mol sieves, the second containing Q5 reactant. The N$_2$, used for transfers, was passed through a single column containing A204 alumna, 4 Å mol sieves and Q5.

The reactor is loaded first from the shot tank that may contain ISOPAR-E solvent and/or 1-octene, depending on desired reactor load. The shot tank is filled to the load set points by use of a lab scale to which the shot tank is mounted. After liquid feed addition, the reactor is heated up to the polymerization temperature set point. If ethylene is used, it is added to the reactor when at reaction temperature to maintain reaction pressure set point. Ethylene addition amounts are monitored by a micro-motion flow meter.

The catalyst and activators were mixed with the appropriate amount of purified toluene to achieve a desired molarity solution. The catalyst and activators were handled in an inert glove box, drawn into a syringe and pressure transferred into the catalyst shot tank. This was followed by 3 rinses of toluene, 5 mL each. Immediately after catalyst addition the run timer begins. If ethylene was used, it was then added by the CAMILE to maintain reaction pressure set point in the reactor. These polymerizations were run for 10 min., then the agitator was stopped and the bottom dump valve opened to empty reactor contents to the dump pot. The dump pot contents are poured into trays placed in a lab hood where the solvent is evaporated off overnight. The trays containing the remaining polymer are then transferred to a vacuum oven, where they are heated up to 140° C. under vacuum to remove any remaining solvent. After the trays cool to ambient temperature, the polymers are weighed for yield/efficiencies, and submitted for polymer testing.

Polymer examples 8-21 were prepared following the batch reactor process using the following conditions: 120° C.: 280 psig ethylene, 300 g 1-octene, 609 g ISOPAR E, 10 umol MMAO-3A, 1.2 eq. of bis(hydrogenated tallow alkyl)methylammonium tetrakis(pentafluorophenyl)borate to catalyst. Conditions at 150° C.: 331 psig ethylene, 300 g 1-octene, 546 g ISOPAR E, 10 umol MMAO-3A, 1.2 eq. of bis(hydrogenated tallow alkyl)methylammonium tetrakis (pentafluorophenyl)borate to catalyst. All reactions were run for 10 minutes. All polymerizations were performed with bis(hydrogenated tallow alkyl)methylammonium tetrakis (pentafluorophenyl)borate as the activator and MMAO as the scavenger. The data for Polymer Examples 8-21 are reported in Table 2.

General Procedure for PPR Screening Experiments

Polyolefin catalysis screening was performed in a Freeslate (formerly Symyx) high throughput Parallel Polymerization Reactor (PPR) system. The PPR system was comprised of an array of 48 single cell (6×8 matrix) reactors in an inert atmosphere glovebox. Each cell was equipped with a glass insert with an internal working liquid volume of approximately 5 mL. Each cell had independent controls for pressure and was continuously stirred at 800 rpm. Catalyst, ligand, and metal precursor solutions, unless otherwise noted, were prepared in toluene. All liquids (i.e. solvent, 1-octene, chain shuttling agent solutions, and catalyst solutions) were added via robotic syringes. Gaseous reagents (i.e. ethylene) were added via a gas injection port. Prior to each run, the reactors were heated to 80° C., purged with ethylene, and vented.

A portion of ISOPAR-E was added, the reactors were heated to the run temperature, and then pressured to the appropriate psig with ethylene. Toluene solutions of reagents were then added in the following order: 1-octene with 500 nmol of scavenger MMAO-3A, chain shuttling agent, activator (bis(hydrogenated tallow alkyl)methylammonium tetrakis(pentafluorophenyl)borate, tris(pentafluorophenyl)borane, etc), then catalyst.

Each liquid addition was chased with a small amount of ISOPAR-E so that after the final addition, a total reaction volume of 5 mL reached. Upon addition of the catalyst, the PPR software began monitoring the pressure of each cell. The desired pressure (150 psig within approximately 2-6 psi) was maintained by the supplemental addition of ethylene gas by opening the valve at the set point minus 1 psi and closing it when the pressure reached 2 psi higher. All drops in pressure were cumulatively recorded as "Uptake" or "Conversion" of the ethylene for the duration of the run or until the uptake or conversion requested value was reached, whichever occurred first. Each reaction was then quenched by addition of 10% carbon monoxide in argon for 4 minutes at 40-50 psi higher than the reactor pressure. Shorter "Quench Times" indicate a more active catalyst. In order to prevent the formation of too much polymer in any given cell, the reaction was quenched upon reaching a predetermined uptake level (50 psig for 120° C. runs). After all the reactors were quenched they were allowed to cool to 70° C. They were then vented, purged for 5 minutes with nitrogen to remove carbon monoxide, and the tubes removed. The polymer samples were then dried in a centrifugal evaporator at 70° C. for 12 hours, weighed to determine polymer yield and submitted for IR (1-octene incorporation) and GPC (molecular weight) analysis. Polymer Examples 1-7 were prepared according to the PPR screening process using the following conditions: 120° C., 150 psig, 838 µL 1-octene, 500 nmol MMAO-3A, 100 nmol catalyst, 150 nmol bis(hydrogenated tallow alkyl)methylammonium tetrakis(pentafluorophenyl)borate, 5 mL total liquid volume. All polymerizations were performed with bis(hydrogenated tallow alkyl)methylammonium tetrakis(pentafluorophenyl)borate as the activator and MMAO as the scavenger. The data for Polymer Examples 1-7 are reported in Table 2.

Test Methods

Test methods include the following:
(i) Catalyst Efficiency (Efficiency)
(ii) The catalyst efficiency is calculated by dividing the number of grams of the polyolefin copolymer prepared by the total number of grams of metal M of ingredient (a) employed (i.e., metal M of the at least one metal-ligand complex of Formula (I)) (i.e., catalyst efficiency=g polyolefin copolymer prepared/g metal M of metal-ligand complex(es) of Formula (I) employed).

SymRAD HT-GPC Analysis

The molecular weight data was determined by analysis on a hybrid Symyx/Dow built Robot-Assisted Dilution High-Temperature Gel Permeation Chromatographer (Sym-RAD-GPC). The polymer samples were dissolved by heating for 120 minutes at 160° C. in 1,2,4-trichlorobenzene (TCB) at a concentration of 10 mg/mL stabilized by 300 ppm of butylated hydroxyl toluene (BHT). Each sample was then diluted to 1 mg/mL immediately before the injection of a 250 µL aliquot of the sample. The GPC was equipped with two Polymer Labs PLgel 10 µm MIXED-B columns (300× 10 mm) at a flow rate of 2.0 mL/minute at 160° C. Sample detection was performed using a PolyChar IR4 detector in concentration mode. A conventional calibration of narrow polystyrene (PS) standards was utilized with apparent units adjusted to homo-polyethylene (PE) using known Mark-Houwink coefficients for PS and PE in TCB at this temperature.

Differential Scanning Calorimetry (DSC) Analysis

Melt temperature (Tm), glass transition temperature (Tg), crystallization temperature (Tc) and Heat of Melt may be measured by differential scanning calorimetry (DSC Q2000, TA Instruments, Inc.) using a Heat-Cool-Heat temperature profile. Open-pan DSC samples of 3-6 mg of polymer are first heated from room temperature to setpoint at 10° C. per min. Traces are analyzed individually using TA Universal Analysis software or TA Instruments TRIOS software.

1-Octene Incorporation IR Analysis

HT-GPC analysis preceded the IR analysis since the diluted GPC solutions were used for the IR depositions. A 56-well HT silicon wafer was utilized for deposition and analysis of 1-octene incorporation of the samples. Samples were heated to 160° C. for 210 minutes, then deposited while being heated using a Tecan MiniPrep 75 deposition station. The 1,2,4-trichlorobenzene was evaporated off the deposited wells of the wafer at 160° C. under nitrogen purge and 1-Octene analysis was performed on the HT silicon wafer using a NEXUS 670 FT-IR. Octene incorporation is determined based on the integration of $CH_3$ vs. $CH_2$ stretching frequencies. This measurement is calibrated with ethylene 1-octene copolymer standards for which the 1-octene content is verified by NMR analysis.

TABLE 1

PPR Polymerization Data

| Polymer Example No. | Pro-catalyst | $M_w$ (g/mol) | PDI | Yield (mg) | Mol % Octene | Reaction Temperature (C. °) |
|---|---|---|---|---|---|---|
| 1 | C1 | 327,000 | 16.0 | 35.5 | 2.2 | 120 |
| 2 | C2 | 27,000 | 2.5 | 57.6 | 1.3 | 120 |
| 3 | 1 | 555,000 | 9.8 | 43.5 | 3.2 | 120 |
| 4 | 2 | 329,000 | 3.3 | 35.7 | 2.6 | 120 |
| 5 | 3 | 396,000 | 4.1 | 71.1 | 0.7 | 120 |
| 6 | 3 | 339,000 | 3.4 | 62.7 | 0.6 | 120 |
| 7 | 3 | 240,000 | 4.5 | 26.9 | 1.5 | 120 |

TABLE 2

Batch Reactor Polymerization Data

| Polymer Example No. | Pro-catalyst | $M_w$ (g/mol) | PDI | Efficiency (g poly/g Metal) | Mol % Octene | Reaction Temperature (C. °) |
|---|---|---|---|---|---|---|
| 8 | 8 | 444,000 | 3.1 | 412,000 | 1.1 | 120 |
| 9 | 8 | 280,000 | 4.7 | 182,000 | 1.3 | 150 |
| 10 | 9 | 931,000 | 3.6 | 611,000 | 1.5 | 120 |
| 11 | 9 | 656,000 | 4.1 | 420,000 | 1.8 | 150 |
| 12 | 9 | 195,000 | 10.9 | 29,000 | 1.3 | 190 |
| 13 | 10 | 679,000 | 18.0 | 144,000 | 6.9 | 120 |
| 14 | 10 | 476,000 | 12.8 | 178,000 | 5.0 | 150 |
| 15 | 11 | 596,000 | 9.3 | 600,000 | 1.6 | 120 |
| 16 | 11 | 361,000 | 13.0 | 239,000 | 0.9 | 150 |
| 17 | 12 | 900,000 | 4.6 | 345,000 | 0.9 | 120 |
| 18 | 12 | 548,000 | 5.8 | 79,000 | 1.0 | 150 |
| 19 | 13 | 37,000 | 5.5 | 11,000 | 3.7 | 120 |
| 20 | 13 | 49,000 | 10.5 | 26,000 | 3.1 | 150 |
| 21 | 13 | 38,000 | 8.2 | 49,000 | 2.9 | 190 |

The chain transfer capability of the Inventive Procatalyst 3 and Comparative Procatalyst 2 was determined. Chain transfer to a potential chain shuttling agent is necessary for a catalyst to participate in a chain shuttling polymerization process. A catalyst's chain shuttling ability is initially evaluated by running a campaign in which the level of a chain transfer agent (CTA) is varied to observe the depression in molecular weight indicative of chain transfer. The molecular weight of polymer generated by catalysts with good chain shuttling potential will be more sensitive to the addition of CTA than the polymer molecular weight generated by poorer shuttling catalysts. The Mayo equation (Equation 1) describes how a chain transfer agent decreases the number average chain length ($\overline{X}_n$) from the native number average chain length ($\overline{X}_{n0}$) where no chain transfer agent is present. Equation 2 defines a chain transfer constant, Ca, as the ratio of chain transfer and propagation rate constants. By assuming that the vast majority of chain propagation occurs through ethylene insertion and not comonomer incorporation, Equation 3 describes the expected $M_n$ of a polymerization. $M_{no}$ is the native molecular weight of the catalyst in the absence of chain shuttling agent and $M_n$ is the molecular weight that is observed with chain transfer agent ($M_n = M_{no}$ with no chain shuttling agent). Equation 3 ignores the contribution of chain growth from comonomer incorporation, thus it is only applicable for poor incorporating catalysts.

$$\frac{1}{\overline{X}_n} = \frac{1}{\overline{X}_{n_0}} + \frac{k_{tr}[\text{chain transfer agent}]}{k_p[\text{monomer}]} \quad \text{Equation 1}$$

$$Ca = \frac{k_{tr}}{k_p} \quad \text{Equation 2}$$

$$\frac{1}{Mn} = \frac{1}{Mn_0} + Ca\frac{[CSA]}{[\text{ethylene}] \times 28} \quad \text{Equation 3}$$

To determine the chain transfer rates for Procatalyst 3, a PPR (parallel pressure reactor) campaign was run using 0, 50, and 200 equivalents (relative to catalyst loading) of $ZnEt_2$ with all reactions employing 1.5 equivalents of bis(hydrogenated tallow alkyl)methylammonium tetrakis(pentafluorophenyl)borate as the activator. The PPR campaign was conducted at 120° C. with 150 psi of ethylene, 838 µL of 1-octene, and a total liquid injection volume of 5 mL to give an ethylene liquid phase concentration of 0.39 M. The $M_n$ for each run was calculated using Equation 3 with the values of Ca and $M_{no}$ fit using the Microsoft Excel Solver to minimize the squared deviations between the fitted and experimental molecular weight data for all the runs with a particular catalyst. Plots of $M_n$ versus [CTA] for procatalyst 3 and Comparative Procatalyst 2 are shown in FIGS. 2 and 3 including a line showing the expected dependence of $M_n$ on [CSA] from the best fit value for Ca. The higher chain transfer constant for procatalyst 3 versus Comparative Procatalyst 2 implies that procatalyst 3 may be a better chain shuttler than Comparative Procatalyst 2. The decrease in polymer polydispersity (PDI or Mw/Mn or MWD) as the CSA concentration increases is indication that procatalyst 3 may undergo reversible chain transfer with dialkyl zinc species (i.e., chain shuttling) as opposed to irreversible chain transfer. These experiments were run in order to evaluate chain transfer performance.

Table 3 provides the polymerization results with varying levels of diethylzinc (DEZ) as a chain transfer agent in a high throughput reactors (PPR) using the following conditions: 120° C., 150 psig, 838 µL 1-octene, 500 nmol MMAO-3A, 5 mL total liquid volume.

TABLE 3

Chain transfer data (PPR).

| Catalyst | Catalyst Loading (µM) | DEZ Loading (µM) | Polymer Yield (mg) | Mw | PDI |
| --- | --- | --- | --- | --- | --- |
| C2 | 6 | 0 | 23 | 462,000 | 7.3 |
| C2 | 6 | 0 | 23 | 415,000 | 7.5 |
| C2 | 4 | 200 | 32 | 18,000 | 1.9 |
| C2 | 4 | 200 | 25 | 35,000 | 1.8 |
| C2 | 6 | 300 | 52 | 36,000 | 1.7 |
| C2 | 6 | 300 | 47 | 35,000 | 1.7 |
| C2 | 4 | 800 | 43 | 13,000 | 1.6 |
| C2 | 4 | 800 | 47 | 15,000 | 1.7 |
| C2 | 6 | 1200 | 57 | 11,000 | 1.6 |
| C2 | 6 | 1200 | 37 | 8,000 | 1.7 |
| 3 | 25 | 0 | 56 | 228,000 | 3.7 |
| 3 | 25 | 0 | 57 | 256,000 | 4.5 |
| 3 | 35 | 0 | 58 | 225,000 | 4.0 |
| 3 | 35 | 0 | 65 | 216,000 | 3.5 |
| 3 | 25 | 1250 | 51 | 13,000 | 3.3 |
| 3 | 25 | 1250 | 51 | 14,000 | 3.4 |
| 3 | 35 | 1750 | 57 | 9,000 | 3.0 |
| 3 | 35 | 1750 | 57 | 8,000 | 2.5 |
| 3 | 25 | 5000 | 52 | 4,000 | 4.0 |
| 3 | 25 | 5000 | 50 | 4,000 | 4.2 |
| 3 | 35 | 7000 | 66 | 2,000 | 3.2 |
| 3 | 35 | 7000 | 61 | 2,000 | 2.7 |

Table 4 provides the polymerization results with varying levels of diethylzinc (DEZ) as a chain transfer agent in a batch reactor using the following conditions: 150° C.: 12 g ethylene, 57 g 1-octene, 528 g, ISOPAR-E, 1.2 eq. bis(hydrogenated tallow alkyl)methylammonium tetrakis(pentafluorophenyl)borate activator to catalyst, 10 µmol MMAO-3A. Conditions at 120° C.: 11 g ethylene, 56 g 1-octene, 555 g, ISOPAR-E, 1.2 eq. bis(hydrogenated tallow alkyl)methylammonium tetrakis(pentafluorophenyl)borate activator to catalyst, 10 µmol MMAO-3A.

TABLE 4

Chain Transfer Data (batch reactor).

| Catalyst | Temp (° C.) | Catalyst Loading (µmol) | DEZ loading (µmol) | Polymer Yield (g) | Mw | PDI |
| --- | --- | --- | --- | --- | --- | --- |
| Inv. 9 | 150 | 1.75 | 0 | 9.5 | 388,000 | 8.5 |
| Inv. 9 | 150 | 2.50 | 542 | 11.1 | 91,000 | 10.1 |
| Inv. 9 | 150 | 3.00 | 2169 | 7.5 | 20,000 | 10.6 |
| Inv. 10 | 150 | 2.50 | 0 | 16.4 | 332,000 | 10.6 |
| Inv. 10 | 150 | 3.50 | 542 | 9.3 | 117,000 | 18.0 |
| Inv. 10 | 150 | 8.00 | 2169 | 7.5 | 17,000 | 9.6 |
| Inv. 12 | 120 | 1.00 | 0 | 12.7 | 506,000 | 5.1 |
| Inv. 12 | 120 | 1.75 | 542 | 12.5 | 334,000 | 46.3 |
| Inv. 12 | 120 | 1.75 | 2169 | 9.6 | 99,000 | 42.0 |
| Inv. 12 | 150 | 1.25 | 0 | 7.0 | 289,000 | 8.5 |
| Inv. 12 | 150 | 1.75 | 542 | 5.0 | 188,000 | 28.8 |
| Inv. 12 | 150 | 2.00 | 2169 | 4.4 | 71,000 | 18.6 |

Table 5 provides the best fit for chain transfer constant (Ca) values using the Mayo equation.

TABLE 5

Chain transfer constants.

| Catalyst | Temp (° C.) | Ca |
| --- | --- | --- |
| Comp. 2 | 120 | 1.8 |
| Inv. 3 | 120 | 2.0 |
| Inv. 9 | 150 | 0.95 |
| Inv. 10 | 150 | 1.3 |
| Inv. 12 | 120 | 1.1 |
| Inv. 12 | 150 | 1.3 |

The present invention may be embodied in other forms without departing from the spirit and the essential attributes thereof, and, accordingly, reference should be made to the appended claims, rather than to the foregoing specification, as indicating the scope of the invention.

The invention claimed is:

1. An olefin polymerization catalyst system comprising:
a procatalyst component comprising a metal-ligand complex of Formula (I):

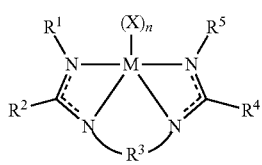
(I)

where:
M is titanium, zirconium, or hafnium;
each X is independently a monodentate or polydentate ligand that is neutral, monoanionic, or dianionic, wherein n is an integer, and wherein X and n are chosen in such a way that the metal-ligand complex of Formula (I) is overall neutral;
$R^1$ and $R^5$ are independently a $(C_6-C_{40})$aryl or substituted $(C_6-C_{40})$aryl group;
each $R^2$ and $R^4$ independently is selected from a group consisting of $(C_1-C_{40})$hydrocarbyls and substituted $(C_1-C_{40})$hydrocarbyls;
$R^3$ is selected from the group consisting of a $(C_3-C_{40})$ hydrocarbylene, substituted $(C_3-C_{40})$hydrocarbylene, $[(C+Si)_3-(C+Si)_{40}]$ organosilylene, substituted $[(C+Si)_3-(C+Si)_{40}]$ organosilylene, $[(C+Ge)_3-(C+Ge)_{40}]$ organogermylene, and substituted $[(C+Ge)_3-(C+Ge)_{40}]$ organogermylene such that there are at least three atoms in the shortest $R^3$ chain connecting the bridged N atoms of Formula (I);
each N independently is nitrogen; and
optionally, two or more $R^{1-5}$ groups each independently can combine together to form mono-aza ring structures, with such ring structures having from 5 to 16 atoms in the ring excluding any hydrogen atoms.

2. The olefin polymerization catalyst system according to claim 1, wherein each X independently is Me, Bn, or Cl.

3. The olefin polymerization catalyst system according to claim 1, wherein $R^3$ is an optionally substituted 5 atom bridge such that 5 atoms define the shortest chain connecting the bridged N atoms of Formula (I).

4. The olefin polymerization catalyst system according to claim 1, wherein $R^3$ is an optionally substituted 5 atom bridge such that 5 atoms define the shortest chain connecting the bridged N atoms of Formula (I) and $R^1$ and $R^5$ are each independently a $(C_6-C_{40})$aryl or substituted $(C_6-C_{40})$aryl group.

5. The olefin polymerization catalyst system according to claim 1, wherein $R^2$ and $R^4$ are each independently a methyl group.

6. The olefin polymerization catalyst system according to claim 1, wherein $R^2$ and $R^4$ are methyl groups, $R^3$ is a 5 atom bridge such that 5 atoms define the shortest chain connecting the bridged N atoms of Formula (I) and $R^1$ and $R^5$ is a $(C_6-C_{40})$aryl or substituted $(C_6-C_{40})$aryl group.

7. The olefin polymerization catalyst system according to claim 1, wherein said metal-ligand complex of Formula (I) is selected from the group consisting of the compounds represented by the following structures

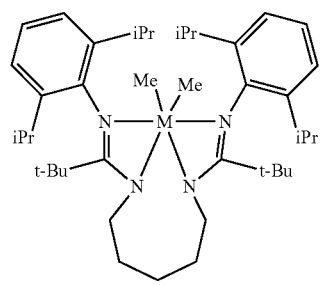

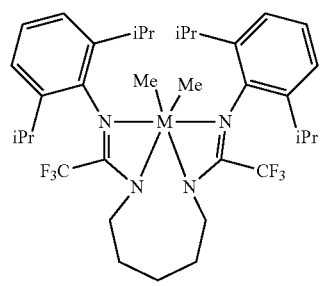

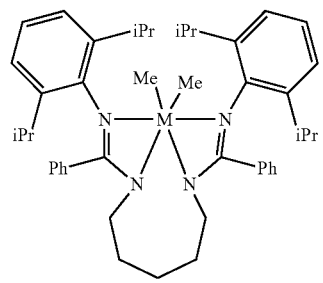

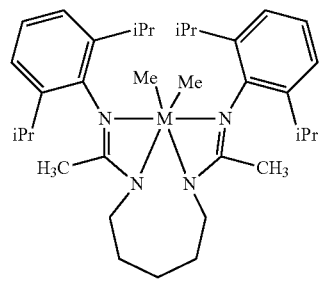

-continued

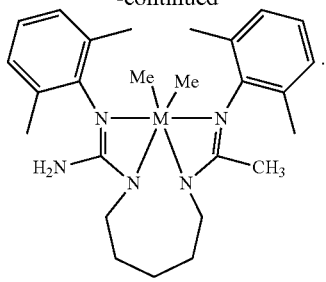

8. The olefin polymerization catalyst system according to claim 1 comprising a pro-catalyst of structure (II)

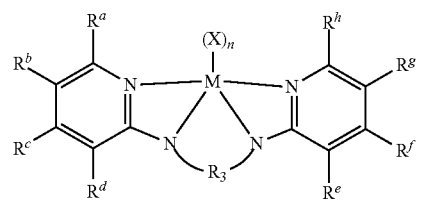

(II)

wherein $R^a$-$R^h$ are hydrocarbyl, substituted hydrocarbyl, heterohydrocarbyl, substituted heterohydrocarbyl, aryl, heteroaryl, alkyl, substituted alkyl, perfluoro alkyl, organosilyl, halogen or hydrogen groups.

9. The olefin polymerization catalyst system according to claim 8 wherein $R^a$ and $R^h$ are aryl and substituted aryl groups.

10. The olefin polymerization catalyst system according to claim 1, wherein said metal-ligand complex of Formula (I) is selected from the group consisting of

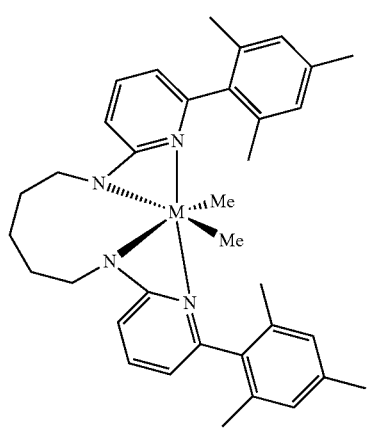

-continued

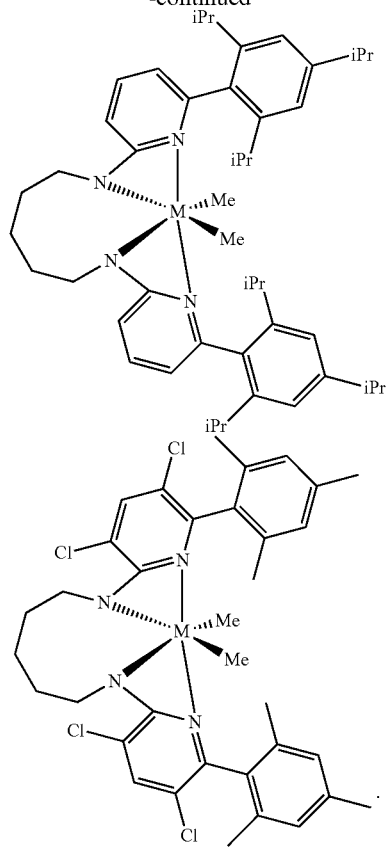

11. The olefin polymerization catalyst system according to claim 1 wherein M is zirconium or hafnium.

12. An olefin-based polymer comprising the polymerization reaction of one or more olefin monomers in the presence of the one or more olefin polymerization catalyst systems according to claim 1.

13. An olefin-based polymer comprising the polymerized reaction product of one or more olefin monomers in the presence of the one or more olefin polymerization catalyst systems according to claim 1 and one or more olefin polymerization catalysts.

14. The olefin-based polymer according to claim 12 wherein at least one of the olefin monomers is ethylene.

15. The olefin-based polymer according to claim 12 wherein one or more of the olefin monomers is selected from the group consisting of linear alpha-olefins having from 3 to 12 carbons, branched alpha-olefins having from 5 to 16 carbons, and combinations thereof.

16. A process for polymerizing one or more olefin-based polymers comprising the steps of polymerizing one or more olefin monomers in the presence of the one or more olefin polymerization catalyst systems according to claim 1.

17. The process for polymerizing one or more olefin-based polymers according to claim 16 wherein the polymerizing further occurs in the presence of an activator selected from MMAO, bis(hydrogenated tallow alkyl)methylammonium tetrakis(pentafluorophenyl)borate, or tris(pentafluorophenyl)borane.

18. The process for polymerizing one or more olefin-based polymers according to claim 16 wherein the polymerizing further occurs in the presence of a chain transfer agent.

19. The process for polymerizing one or more olefin-based polymers according to claim 18 wherein the chain transfer agent is dialkylzinc, trialkylaluminum, or hydrogen.

* * * * *